(12) United States Patent
Zhamu et al.

(10) Patent No.: US 10,276,856 B2
(45) Date of Patent: Apr. 30, 2019

(54) CONTINUOUS PROCESS FOR PRODUCING ELECTRODES AND ALKALI METAL BATTERIES HAVING ULTRA-HIGH ENERGY DENSITIES

(71) Applicant: Nanotek Instruments, Inc., Dayton, OH (US)

(72) Inventors: Aruna Zhamu, Springboro, OH (US); Bor Z Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 434 days.

(21) Appl. No.: 14/756,754

(22) Filed: Oct. 8, 2015

(65) Prior Publication Data

US 2017/0104204 A1 Apr. 13, 2017

(51) Int. Cl.
| | |
|---|---|
| H01M 10/052 | (2010.01) |
| H01M 4/04 | (2006.01) |
| H01M 10/0525 | (2010.01) |
| H01M 10/054 | (2010.01) |
| H01M 10/058 | (2010.01) |
| H01M 4/80 | (2006.01) |
| H01M 10/0565 | (2010.01) |
| H01M 4/139 | (2010.01) |

(52) U.S. Cl.
CPC ......... *H01M 4/0416* (2013.01); *H01M 4/139* (2013.01); *H01M 10/052* (2013.01); *H01M 10/054* (2013.01); *H01M 10/058* (2013.01)

(58) Field of Classification Search
CPC .... H01M 4/04; H01M 4/0416; H01M 10/052; H01M 10/0525; H01M 10/054; H01M 10/058; H01M 10/0585; H01M 10/0565; H01M 10/0567; H01M 10/0569; H01M 4/80; H01M 4/808
See application file for complete search history.

(56) References Cited

U.S. PATENT DOCUMENTS

| 6,306,215 B1 | 10/2001 | Larkin | |
|---|---|---|---|
| 6,664,006 B1 * | 12/2003 | Munshi | H01M 4/13 29/623.1 |

(Continued)

OTHER PUBLICATIONS

Chen, Z. et al. "Three-dimensional flexible and conductive interconnected graphene networks grown by chemical vapor deposition," Nat. Mater. 10, 424-428 (2011).

(Continued)

*Primary Examiner* — Karie O'Neill Apicella

(57) ABSTRACT

A process for producing an electrode for an alkali metal battery, comprising: (a) Continuously feeding an electrically conductive porous layer to an anode or cathode material impregnation zone, wherein the conductive porous layer has two opposed porous surfaces and contain interconnected conductive pathways and at least 70% by volume of pores; (b) Impregnating a wet anode or cathode active material mixture into the porous layer from at least one of the two porous surfaces to form an anode or cathode electrode, wherein the wet anode or cathode active material mixture contains an anode or cathode active material and an optional conductive additive mixed with a liquid electrolyte; and (c) Supplying at least a protective film to cover the at least one porous surface to form the electrode.

24 Claims, 20 Drawing Sheets

(56) References Cited

U.S. PATENT DOCUMENTS

| | | | |
|---|---|---|---|
| 7,759,008 B2* | 7/2010 | Barker | C01B 25/455 |
| | | | 429/209 |
| 2002/0101350 A1 | 8/2002 | Endo | |
| 2004/0159964 A1 | 8/2004 | Lavoie | |
| 2013/0040196 A1* | 2/2013 | Hosoe | H01G 11/28 |
| | | | 429/211 |

OTHER PUBLICATIONS

International Search Report for PCT/US16/53457 dated Dec. 9, 2016.

PCT/US16/53457 International Search Report and Written Opinion dated Dec. 9, 2016, 8 pages.

* cited by examiner

Graphene foam; 100 μm

Carbon foam

Cu foam

Stainless steel foam

CONTINUOUS PROCESS FOR PRODUCING ELECTRODES AND ALKALI METAL BATTERIES HAVING ULTRA-HIGH ENERGY DENSITIES

FIELD OF THE INVENTION

The present invention relates generally to the field of lithium batteries, sodium batteries, and potassium batteries, including primary (non-rechargeable) and secondary (rechargeable) alkali metal batteries and alkali ion batteries.

BACKGROUND OF THE INVENTION

Historically, today's most favorite rechargeable energy storage devices—lithium-ion batteries—actually evolved from rechargeable "lithium metal batteries" using lithium (Li) metal or Li alloy as the anode and a Li intercalation compound as the cathode. Li metal is an ideal anode material due to its light weight (the lightest metal), high electronegativity (−3.04 V vs. the standard hydrogen electrode), and high theoretical capacity (3,860 mAh/g). Based on these outstanding properties, lithium metal batteries were proposed 40 years ago as an ideal system for high energy-density applications. During the mid-1980s, several prototypes of rechargeable Li metal batteries were developed. A notable example was a battery composed of a Li metal anode and a molybdenum sulfide cathode, developed by MOLI Energy, Inc. (Canada). This and several other batteries from different manufacturers were abandoned due to a series of safety problems caused by sharply uneven Li growth (formation of Li dendrites) as the metal was re-plated during each subsequent recharge cycle. As the number of cycles increases, these dendritic or tree-like Li structures could eventually traverse the separator to reach the cathode, causing internal short-circuiting.

To overcome these safety issues, several alternative approaches were proposed in which either the electrolyte or the anode was modified. One approach involved replacing Li metal by graphite (another Li insertion material) as the anode. The operation of such a battery involves shuttling Li ions between two Li insertion compounds, hence the name "Li-ion battery." Presumably because of the presence of Li in its ionic rather than metallic state, Li-ion batteries are inherently safer than Li-metal batteries.

Lithium ion battery is a prime candidate energy storage device for electric vehicle (EV), renewable energy storage, and smart grid applications. The past two decades have witnessed a continuous improvement in Li-ion batteries in terms of energy density, rate capability, and safety, and somehow the significantly higher energy density Li metal batteries have been largely overlooked. However, the use of graphite-based anodes in Li-ion batteries has several significant drawbacks: low specific capacity (theoretical capacity of 372 mAh/g as opposed to 3,860 mAh/g for Li metal), long Li intercalation time (e.g. low solid-state diffusion coefficients of Li in and out of graphite and inorganic oxide particles) requiring long recharge times (e.g. 7 hours for electric vehicle batteries), inability to deliver high pulse power (power density<<1 kW/kg), and necessity to use pre-lithiated cathodes (e.g. lithium cobalt oxide), thereby limiting the choice of available cathode materials. Further, these commonly used cathodes have a relatively low specific capacity (typically <200 mAh/g). These factors have contributed to the two major shortcomings of today's Li-ion batteries—low gravimetric and volumetric energy densities (typically 150-220 Wh/kg and 450-600 Wh/L) and low power densities (typically <0.5 kW/kg and <1.0 kW/L), all based on the total battery cell weight or volume.

The emerging EV and renewable energy industries demand the availability of rechargeable batteries with a significantly higher gravimetric energy density (e.g. demanding >>250 Wh/kg and, preferably, >>300 Wh/kg) and higher power density (shorter recharge times) than what the current Li ion battery technology can provide. Furthermore, the microelectronics industry is in need of a battery having a significantly larger volumetric energy density (>650 Wh/L, preferably >750 Wh/L) since consumers demand to have smaller-volume and more compact portable devices (e.g. smart phones and tablets) that store more energy. These requirements have triggered considerable research efforts on the development of electrode materials with a higher specific capacity, excellent rate capability, and good cycle stability for lithium ion batteries.

Several elements from Group III, IV, and V in the periodic table can form alloys with Li at certain desired voltages. Therefore, various anode materials based on such elements and some metal oxides have been proposed for lithium ion batteries. Among these, silicon has been recognized as one of the next-generation anode materials for high-energy lithium ion batteries since it has a nearly 10 times higher theoretical gravimetric capacity than graphite 3,590 mAh/g based on $Li_{3.75}Si$ vs. 372 mAh/g for $LiC_6$) and ~3 times larger volumetric capacities. However, the dramatic volume changes (up to 380%) of Si during lithium ion alloying and de-alloying (cell charge and discharge) often led to severe and rapid battery performance deterioration. The performance fade is mainly due to the volume change-induced pulverization of Si and the inability of the binder/conductive additive to maintain the electrical contact between the pulverized Si particles and the current collector. In addition, the intrinsic low electric conductivity of silicon is another challenge that needs to be addressed.

Although several high-capacity anode active materials have been found (e.g., Si), there has been no corresponding high-capacity cathode material available. Current cathode active materials commonly used in Li-ion batteries have the following serious drawbacks:

(1) The practical capacity achievable with current cathode materials (e.g. lithium iron phosphate and lithium transition metal oxides) has been limited to the range of 150-250 mAh/g and, in most cases, less than 200 mAh/g.

(2) The insertion and extraction of lithium in and out of these commonly used cathodes rely upon extremely slow solid-state diffusion of Li in solid particles having very low diffusion coefficients (typically $10^{-8}$ to $10^{-14}$ $cm^2/s$), leading to a very low power density (another long-standing problem of today's lithium-ion batteries).

(3) The current cathode materials are electrically and thermally insulating, not capable of effectively and efficiently transporting electrons and heat. The low electrical conductivity means high internal resistance and the necessity to add a large amount of conductive additives, effectively reducing the proportion of electrochemically active material in the cathode that already has a low capacity. The low thermal conductivity also implies a higher tendency to undergo thermal runaway, a major safety issue in lithium battery industry.

As a totally distinct class of energy storage device, sodium batteries have been considered an attractive alternative to lithium batteries since sodium is abundant and the production of sodium is significantly more environmentally benign compared to the production of lithium. In addition, the high cost of lithium is a major issue and Na batteries potentially can be of significantly lower cost.

There are at least two types of batteries that operate on bouncing sodium ions ($Na^+$) back and forth between an anode and a cathode: the sodium metal battery having Na metal or alloy as the anode active material and the sodium-ion battery having a Na intercalation compound as the anode active material. Sodium ion batteries using a hard carbon-based anode active material (a Na intercalation compound) and a sodium transition metal phosphate as a cathode have been described by several research groups; e.g. J. Barker, et al. "Sodium Ion Batteries," U.S. Pat. No. 7,759,008 (Jul. 20, 2010).

However, these sodium-based devices exhibit even lower specific energies and rate capabilities than Li-ion batteries. The anode active materials for Na intercalation and the cathode active materials for Na intercalation have lower Na storage capacities as compared with their Li storage capacities. For instance, hard carbon particles are capable of storing Li ions up to 300-360 mAh/g, but the same materials can store Na ions up to 150-250 mAh/g and less than 100 mAh/g for K ion storage.

Instead of hard carbon or other carbonaceous intercalation compound, sodium metal may be used as the anode active material in a sodium metal cell. However, the use of metallic sodium as the anode active material is normally considered undesirable and dangerous due to the dendrite formation, interface aging, and electrolyte incompatibility problems.

Low-capacity anode or cathode active materials are not the only problem that the alkali metal-ion battery industry faces. There are serious design and manufacturing issues that the lithium-ion battery industry does not seem to be aware of, or has largely ignored. For instance, despite the high gravimetric capacities at the electrode level (based on the anode or cathode active material weight alone) as frequently claimed in open literature and patent documents, these electrodes unfortunately fail to provide batteries with high capacities at the battery cell or pack level (based on the total battery cell weight or pack weight). This is due to the notion that, in these reports, the actual active material mass loadings of the electrodes are too low. In most cases, the active material mass loadings of the anode (areal density) is significantly lower than 15 $mg/cm^2$ and mostly <8 $mg/cm^2$ (areal density=the amount of active materials per electrode cross-sectional area along the electrode thickness direction). The cathode active material amount is typically 1.5-2.5 times higher than the anode active material. As a result, the weight proportion of the anode active material (e.g. graphite or carbon) in a lithium-ion battery is typically from 12% to 17%, and that of the cathode active material (e.g. $LiMn_2O_4$) from 17% to 35% (mostly <30%). The weight fraction of the cathode and anode active materials combined is typically from 30% to 45% of the cell weight The low active material mass loading is primarily due to the inability to obtain thicker electrodes (thicker than 100-200 μm) using the conventional slurry coating procedure. This is not a trivial task as one might think, and in reality the electrode thickness is not a design parameter that can be arbitrarily and freely varied for the purpose of optimizing the cell performance. Contrarily, thicker samples tend to become extremely brittle or of poor structural integrity and would also require the use of large amounts of binder resin. The low areal densities and low volume densities (related to thin electrodes and poor packing density) result in a relatively low volumetric capacity and low volumetric energy density of the battery cells. Sodium-ion batteries and potassium-ion batteries have similar problems.

With the growing demand for more compact and portable energy storage systems, there is keen interest to increase the utilization of the volume of the batteries. Novel electrode materials and designs that enable high volumetric capacities and high mass loadings are essential to achieving improved cell volumetric capacities and energy densities for alkali metal batteries.

Therefore, there is clear and urgent need for alkali metal batteries that have high active material mass loading (high areal density), active materials with high apparent density (high tap density), high electrode thickness without significantly decreasing the electron and ion transport rates (e.g. without a high electron transport resistance or long lithium or sodium ion diffusion path), high volumetric capacity, and high volumetric energy density.

SUMMARY OF THE INVENTION

The present invention provides a process for producing an alkali metal battery having a high active material mass loading, exceptionally low overhead weight and volume (relative to the active material mass and volume), high volumetric capacity, and unprecedentedly high volumetric energy density and power density. This alkali metal battery can be a primary battery (non-rechargeable) or a secondary battery (rechargeable), including a rechargeable alkali metal battery (having a lithium, sodium, or potassium metal anode) and an alkali metal-ion battery (e.g. having a first lithium or sodium intercalation compound as an anode active material and a second lithium or sodium intercalation or absorbing compound, having a much higher electrochemical potential than the first one, as a cathode active material). The electrochemical potential of the cathode active material is higher than that of the anode active material by at least 1.0 volt, preferably at least 1.5 volts, further preferably at least 2.0 volts, more preferably at least 3.0 volts, even more preferably at least 3.5 volts, and most preferably at least 4.0 volts.

In one embodiment, the invention provides a process for producing an alkali metal-ion battery wherein the alkali metal is selected from Li, Na, K, Cs, or a combination thereof; the process comprising:

(A) Continuously feeding an electrically conductive porous layer to a cathode material impregnation zone, wherein the conductive porous layer has two opposed porous surfaces and contain interconnected conductive pathways and at least 70% by volume of pores (preferably >80%, more preferably >90%, and most preferably >95%);

(B) Impregnating a wet cathode active material mixture into the electrically conductive porous layer from at least one of the two porous surfaces to form a cathode electrode, wherein the wet cathode active material mixture contains a cathode active material and an optional conductive additive mixed with a first liquid electrolyte (although a binder resin can be optionally added, but this is undesirable);

(C) Continuously feeding an electrically conductive porous layer to an anode material impregnation zone, wherein the conductive porous layer has two opposed porous surfaces and contain interconnected conductive pathways and at least 70% (preferably >80%) by volume of pores;

(D) Impregnating a wet anode active material mixture into the electrically conductive porous layer from at least one of the two porous surfaces to form an anode electrode, wherein the wet anode active material mixture contains an anode active material and an optional conductive additive mixed with a second liquid electrolyte; and (E) Stacking the anode electrode, a porous separator, and the cathode electrode to form the alkali metal battery, wherein the anode electrode and/or the cathode electrode has a thickness no less than 100 μm; the anode active material has a material mass loading no less than 20 mg/cm² in the anode electrode; and/or the cathode active material has a material mass loading no less than 15 mg/cm² for an organic or polymer material or no less than 30 mg/cm² for an inorganic and non-polymer material in the cathode electrode.

In some embodiments, step (A) and step (B) include delivering, continuously or intermittently on demand, the wet cathode active material mixture to the at least one porous surface through spraying, printing, coating, casting, conveyor film delivery, and/or roller surface delivery. In some embodiments, step (C) and step (D) include delivering, continuously or intermittently on demand, the wet anode active material mixture to the at least one porous surface through spraying, printing, coating, casting, conveyor film delivery, and/or roller surface delivery.

The cathode electrode thickness or the anode electrode thickness is preferably >200 μm, further preferably >300 μm, more preferably >400 μm; further more preferably >500 μm, still more preferably >600 μm, or even >1,000 μm; no theoretical limitation on the thickness of the presently invented electrode. It may be noted that, in step (E), a plurality of cathode electrode layers (e.g. those prepared in steps (A) and (B)) can be combined and consolidated into one single cathode electrode to make a significantly thicker cathode electrode, if so desired. Similarly, if necessary, several anode electrode layers (e.g. as those prepared by steps (C) and (D)) can be combined and consolidated into one single anode electrode layer to make a significantly thicker anode electrode.

The invention also provides a process for producing an alkali metal-ion battery wherein the anode active material is alkali metal or alloy (metal or alloy of Li, Na, K, Cs, or a combination thereof). In a preferred embodiment, the process comprises:

(A) Continuously feeding an electrically conductive porous layer to a cathode material impregnation zone, wherein the conductive porous layer has two opposed porous surfaces and contain interconnected conductive pathways and at least 70% (preferably >80% and more preferably >90%) by volume of pores;

(B) Impregnating a wet cathode active material mixture into the electrically conductive porous layer from at least one of the two porous surfaces to form a cathode electrode, wherein the wet cathode active material mixture contains a cathode active material and an optional conductive additive mixed with a first liquid electrolyte;

(C) Continuously introducing an anode electrode having an anode current collector that has two opposed primary surfaces wherein at least one of the two primary surfaces is deposited with a layer of alkali metal or alkali metal alloy having at least 50% by weight of an alkali metal element in said alloy (preferably >70%, further preferably >80%, and most preferably >90% by weight of an alkali metal element, such as Li, Na, and/or K); and (D) Stacking the anode electrode, a porous separator, and the cathode electrode to form the alkali metal battery, wherein the cathode electrode has a thickness no less than 100 μm (preferably >200 μm, further preferably >300 μm, more preferably >400 μm; further more preferably >500 μm, 600 μm, or even >1,000 μm); the cathode active material has a material mass loading no less than 15 mg/cm² for an organic or polymer material or no less than 30 mg/cm² for an inorganic and non-polymer material in the cathode electrode.

In some embodiments, step (A) and step (B) include delivering, continuously or intermittently on demand, the wet cathode active material mixture to the at least one porous surface through spraying, printing, coating, casting, conveyor film delivery, and/or roller surface delivery. The anode electrode of this alkali metal-ion battery is basically composed of a solid current collector (e.g. Cu foil) coated with a thin film of Li, Na, Li metal alloy, or Na metal alloy, etc.

In some embodiments wherein the alkali metal battery is a lithium-ion battery, the anode active material may be selected from the group consisting of: (a) Particles of natural graphite, artificial graphite, meso-carbon microbeads (MCMB), and carbon; (b) Silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe), and cadmium (Cd); (c) Alloys or intermetallic compounds of Si, Ge, Sn, Pb, Sb, Bi, Zn, Al, or Cd with other elements, wherein said alloys or compounds are stoichiometric or non-stoichiometric; (d) Oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites; (e) Pre-lithiated versions thereof; and (f) Pre-lithiated graphene sheets; and combinations thereof.

There is no restriction on the types of anode active materials or cathode active materials that can be used in practicing the instant invention. However, preferably, the anode active material absorbs lithium ions at an electrochemical potential of less than 1.0 volt (preferably less than 0.7 volts) above the Li/Li$^+$ (i.e. relative to Li→Li$^+$+e$^-$ as the standard potential) when the battery is charged. The anode active material for Na-ion or K-ion battery can be similarly chosen.

In a preferred embodiment, the anode active material is a pre-sodiated or pre-potassiated version of graphene sheets selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof. The starting graphitic material for producing any one of the above graphene materials may be selected from natural graphite, artificial graphite, mesophase carbon, meso-phase pitch, meso-carbon micro-bead, soft carbon, hard carbon, coke, carbon fiber, carbon nano-fiber, carbon nano-tube, or a combination thereof. Graphene materials are also a good conductive additive for both the anode and cathode active materials of an alkali metal battery.

In some embodiments, the alkali metal battery is a sodium-ion battery and the anode active material contains an alkali intercalation compound selected from petroleum coke, carbon black, amorphous carbon, activated carbon, hard carbon, soft carbon, templated carbon, hollow carbon nanowires, hollow carbon sphere, titanates, $NaTi_2(PO_4)_3$, $Na_2Ti_3O_7$, $Na_2C_8H_4O_4$, $Na_2TP$, $Na_xTiO_2$ (x=0.2 to 1.0), $Na_2C_8H_4O_4$, carboxylate based materials, $C_8H_4Na_2O_4$, $C_8H_6O_4$, $C_8H_5NaO_4$, $C_8Na_2F_4O_4$, $C_{10}H_2Na_4O_8$, $C_{14}H_4O_6$, $C_{14}H_4Na_4O_8$, or a combination thereof.

In some embodiments, the alkali metal battery is a sodium-ion battery or potassium-ion battery and the anode active material contains an alkali intercalation compound selected from the following groups of materials: (a) Sodium- or potassium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (b) Sodium- or potassium-containing alloys or intermetallic compounds of Si, Ge, Sn, Pb, Sb, Bi, Zn, Al, Ti, Co, Ni, Mn, Cd, and their mixtures; (c) Sodium- or potassium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof; (d) Sodium or potassium salts; and (e) Graphene sheets pre-loaded with sodium ions or potassium ions.

In some embodiments, the cathode active material contains a lithium intercalation compound or lithium absorbing compound selected from the group consisting of lithium cobalt oxide, doped lithium cobalt oxide, lithium nickel oxide, doped lithium nickel oxide, lithium manganese oxide, doped lithium manganese oxide, lithium vanadium oxide, doped lithium vanadium oxide, lithium mixed-metal oxides, lithium iron phosphate, lithium vanadium phosphate, lithium manganese phosphate, lithium mixed-metal phosphates, metal sulfides, lithium polysulfide, sulfur, and combinations thereof.

In some embodiments, the cathode active material contains a sodium intercalation compound or a potassium intercalation compound selected from $NaFePO_4$, $Na_{(1-x)}K_xPO_4$, $KFePO_4$, $Na_{0.7}FePO_4$, $Na_{1.5}VOPO_4F_{0.5}$, $Na_3V_2(PO_4)_3$, $Na_3V_2(PO_4)_2F_3$, $Na_2FePO_4F$, $NaFeF_3$, $NaVPO_4F$, $KVPO_4F$, $Na_3V_2(PO_4)_2F_3$, $Na_{1.5}VOPO_4F_{0.5}$, $Na_3V_2(PO_4)_3$, $NaV_6O_{15}$, $Na_xVO_2$, $Na_{0.33}V_2O_5$, $Na_xCoO_2$, $Na_{2/3}[Ni_{1/3}Mn_{2/3}]O_2$, $Na_x(Fe_{1/2}Mn_{1/2})O_2$, $Na_xMnO_2$, $\lambda\text{-}MnO_2$, $Na_xK_{(1-x)}MnO_2$, $Na_{0.44}MnO_2$, $Na_{0.44}MnO_2/C$, $Na_4Mn_9O_{18}$, $NaFe_2Mn(PO_4)_3$, $Na_2Ti_3O_7$, $Ni_{1/3}Mn_{1/3}Co_{1/3}O_2$, $Cu_{0.56}Ni_{0.44}HCF$, $NiHCF$, $Na_xMnO_2$, $NaCrO_2$, $KCrO_2$, $Na_3Ti_2(PO_4)_3$, $NiCo_2O_4$, $Ni_3S_2/FeS_2$, $Sb_2O_4$, $Na_4Fe(CN)_6/C$, $NaV_{1-x}Cr_xPO_4F$, $Se_zS_y$ (y/z=0.01 to 100), Se, sodium polysulfide, sulfur, Alluaudites, or a combination thereof, wherein x is from 0.1 to 1.0.

There is no theoretical limitation on the thickness of electrically conductive porous layers. They may each have a thickness from 50 μm to 2,000 μm (or thicker), preferably from 100 μm to 800 μm, further preferably from 200 μm to 600 μm. These desired thickness ranges facilitate the infiltration of the wet anode active mixture (liquid electrolyte, anode active material, and optional conductive additive) or wet cathode active mixture (liquid electrolyte, cathode active material, and optional conductive additive) during the consolidation step.

The electrically conductive porous layers may be selected from metal foam, metal web or screen, perforated metal sheet-based 3-D structure, metal fiber mat, metal nanowire mat, conductive polymer nano-fiber mat, conductive polymer foam, conductive polymer-coated fiber foam, carbon foam, graphite foam, carbon aerogel, carbon xerogel, graphene foam, graphene oxide foam, reduced graphene oxide foam, carbon fiber foam, graphite fiber foam, exfoliated graphite foam, or a combination thereof. These multiple electrically conductive porous layers, when consolidated (compressed) together, make a good current collector at the anode or the cathode. No separate or additional current collector is required or needed.

The pore volume (e.g. >80%) of the electrically conductive porous layers is a critically important requirement to ensure a large proportion of active materials accommodated in the current collector. Based on this criterion, conventional paper or textiles made of natural and/or synthetic fibers do not meet this requirement since they do not have a sufficient amount of properly sized pores (e.g. the anode active materials or cathode active materials could not infiltrate into the pores of these paper or textile structures).

The pore sizes in the electrically conductive porous layers are preferably in the range from 10 nm to 100 μm, more preferably from 100 nm to 50 μm, further preferably from 500 nm to 20 μm, and even more preferably from 1 μm to 10 μm, and most preferably from 1 μm to 5 μm. These pore size ranges are designed to accommodate anode active materials (such as graphite micron particles or Si nano particles) and cathode active materials (such as lithium cobalt oxide or lithium iron phosphate), having a primary or secondary particle size typically from 10 nm to 20 μm in diameter, and most typically from 50 nm to 10 μm, further typically from 100 nm to 5 μm, and most typically from 200 nm to 3 μm.

More significantly, however, since all active material particles in a pore (e.g. with pore size of 5 μm) are, on average, within a distance of 2.5 μm from a pore wall (electron-conducting pathway) in the electrically conductive porous layers structure, electrons can be readily collected from the anode active material particle and alkali metal ions (e.g. lithium ions) do not have to undergo a long-distance solid-state diffusion. This is in contrast to the notion that some electrons in the conventional thick electrode of prior art lithium-ion battery (e.g. wherein Si particle layer>100 μm in thickness is coated onto a surface of a solid Cu foil current collector 10 μm thick) must travel at least 50 μm through conductive additive particles to get collected by a current collector. These conductive additive particles are typically not in good electronic contact with one another (e.g. interrupted by a non-conductive binder resin), leading to a large internal resistance and reduced ability to deliver a higher power.

In general, the first liquid electrolyte and the second liquid electrolyte are identical in a battery, but they can be different in composition. The liquid electrolytes can be an aqueous liquid, organic liquid, ionic liquid (ionic salt having a melting temperature lower than 100° C., preferably lower than room temperature, 25° C.), or a mixture of an ionic liquid and an organic liquid at a ratio from 1/100 to 100/1. The organic liquid is desirable, but the ionic liquid is preferred. A gel electrolyte can also be used provided the electrolyte has some mobility to enable infiltration of wet anode or cathode materials.

In a preferred embodiment, the consolidated anode and/or cathode electrodes have a thickness no less than 200 μm; the electrically conductive porous layers have at least 85% by volume of pores; the anode active material has a mass loading no less than 25 mg/cm$^2$ and/or occupies at least 25% by weight or by volume of the entire battery cell; the cathode active material has a mass loading no less than 20 mg/cm$^2$ for an organic or polymer material or no less than 40 mg/cm$^2$ for an inorganic and non-polymer material in the cathode and/or occupies at least 40% by weight or by volume of the entire battery cell.

In another preferred embodiment, the consolidated anode and/or cathode electrodes have a thickness no less than 300 μm; the electrically conductive porous layers have at least 90% by volume of pores; the anode active material has a mass loading no less than 30 mg/cm$^2$ and/or occupies at least 30% by weight or by volume of the entire battery cell, and/or the cathode active material has a mass loading no less than 25 mg/cm$^2$ for an organic or polymer material or no less than 50 mg/cm$^2$ for an inorganic and non-polymer material in said cathode and/or occupies at least 50% by weight or by volume of the entire battery cell.

More preferably, the consolidated anode and/or cathode electrodes have a thickness no less than 400 μm; the electrically conductive porous layers have at least 95% by volume of pores, and/or said anode active material has a mass loading no less than 35 mg/cm$^2$ and/or occupies at least 35% by weight or by volume of the entire battery cell, and/or the cathode active material has a mass loading no less than 30 mg/cm$^2$ for an organic or polymer material or no less than 55 mg/cm$^2$ for an inorganic and non-polymer material in the cathode and/or occupies at least 55% by weight or by volume of the entire battery cell.

The aforementioned requirements on electrode thickness, porosity levels, the anode active material areal mass loading or mass fraction relative to the entire battery cell, or the cathode active material areal mass loading or mass fraction relative to the entire battery cell have not been possible with conventional lithium batteries using the conventional process of slurry coating and drying.

In some embodiments, the anode active material is a pre-lithiated version of graphene sheets selected from pristine graphene, graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, a physically or chemically activated or etched version thereof, or a combination thereof. Surprisingly, without pre-lithiation, the resulting lithium battery cell does not exhibit a satisfactory cycle life (i.e. capacity decays rapidly).

Preferably, the volume ratio of the anode active material-to-liquid electrolyte in the wet anode active material mixture is from 1/5 to 20/1 (preferably from 1/3 to 5/1) and/or the volume ratio of cathode active material-to-the liquid electrolyte in the wet cathode active material mixture is from 1/5 to 20/1 (preferably from 1/3 to 5/1).

In some embodiments, the cathode active material in this alkali metal battery contains an alkali metal intercalation compound or alkali metal-absorbing compound selected from an inorganic material, an organic or polymeric material, a metal oxide/phosphate/sulfide, or a combination thereof. For example, the metal oxide/phosphate/sulfide may be selected from a lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphate, transition metal sulfide, or a combination thereof. The inorganic material is selected from sulfur, sulfur compound, lithium polysulfide, transition metal dichalcogenide, a transition metal trichalcogenide, or a combination thereof. In particular, the inorganic material is selected from TiS$_2$, TaS$_2$, MoS$_2$, NbSe$_3$, MnO$_2$, CoO$_2$, an iron oxide, a vanadium oxide, or a combination thereof. These will be further discussed later.

In some embodiments, the cathode active material contains an alkali metal intercalation compound selected from a metal carbide, metal nitride, metal boride, metal dichalcogenide, or a combination thereof. In some embodiments, the cathode active material contains an alkali metal intercalation compound selected from an oxide, dichalcogenide, trichalcogenide, sulfide, selenide, or telluride of niobium, zirconium, molybdenum, hafnium, tantalum, tungsten, titanium, vanadium, chromium, cobalt, manganese, iron, or nickel in a nanowire, nano-disc, nano-ribbon, or nano platelet form.

Preferably, the cathode active material contains a lithium intercalation compound selected from nano discs, nano platelets, nano-coating, or nano sheets of an inorganic material selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof; wherein these discs, platelets, or sheets have a thickness less than 100 nm.

In some embodiments, the cathode active material in this alkali metal battery is an organic material or polymeric material selected from Poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, Quino(triazene), redox-active organic material, Tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ([(NPS$_2$)$_3$]n), lithiated 1,4,5,8-naphthalenetetraol formaldehyde polymer, Hexaazatrinaphtylene (HATN), Hexaazatriphenylene hexacarbonitrile (HAT(CN)$_6$), 5-Benzylidene hydantoin, Isatine lithium salt, Pyromellitic diimide lithium salt, tetrahydroxy-p-benzoquinone derivatives (THQLi$_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, Li$_4$C$_6$O$_6$, Li$_2$C$_6$O$_6$, Li$_6$C$_6$O$_6$, or a combination thereof.

The thioether polymer is selected from Poly[methanetetryl-tetra(thiomethylene)] (PMTTM), Poly(2,4-dithiopentanylene) (PDTP), a polymer containing Poly(ethene-1,1,2,2-tetrathiol) (PETT) as a main-chain thioether polymers, a side-chain thioether polymer having a main-chain consisting of conjugating aromatic moieties, and having a thioether side chain as a pendant, Poly(2-phenyl-1,3-dithiolane) (PPDT), Poly(1,4-di(1,3-dithiolan-2-yl)benzene) (PDDTB), poly(tetrahydrobenzodithiophene) (PTHBDT), poly[1,2,4,5-tetrakis(propylthio)benzene] (PTKPTB, or poly[3,4(ethylenedithio)thiophene] (PEDTT).

In a preferred embodiment, the cathode active material is an organic material containing a phthalocyanine compound selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

DESCRIPTION OF THE PREFERRED EMBODIMENTS

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

This invention is directed at a process for producing an alkali metal battery exhibiting an exceptionally high volumetric energy density that has never been previously achieved for the same type of alkali metal battery. This alkali metal battery can be a primary battery, but is preferably a secondary battery selected from a lithium-ion battery or a lithium metal secondary battery (e.g. using lithium metal as an anode active material), a sodium-ion battery, a sodium metal battery, a potassium-ion battery, or a potassium metal battery. The battery is based on an aqueous electrolyte, a non-aqueous or organic electrolyte, a gel electrolyte, an ionic liquid electrolyte, or a mixture of organic and ionic liquid. The final shape of an alkali metal battery can be cylindrical, square, button-like, etc. The present invention is not limited to any battery shape or configuration.

For convenience, we will use selected materials, such as lithium iron phosphate (LFP), vanadium oxide ($V_xO_y$), lithium nickel manganese cobalt oxide (NMC), dilithium rhodizonate ($Li_2C_6O_6$), and copper phthalocyanine (CuPc) as illustrative examples of the cathode active material, and graphite, SnO, $Co_3O_4$, and Si particles as examples of the anode active material. For sodium batteries, we will use selected materials, such as NaFePO$_4$ and λ-MnO$_2$ particles, as illustrative examples of the cathode active material, and hard carbon and NaTi$_2$(PO$_4$)$_3$ particles as examples of the anode active material of a Na-ion cell. Similar approaches are applicable to K-ion batteries. Nickel foam, graphite foam, graphene foam, and stainless steel fiber webs are used as examples of conductive porous layers as intended current collectors. These should not be construed as limiting the scope of the invention.

Figure 1A:
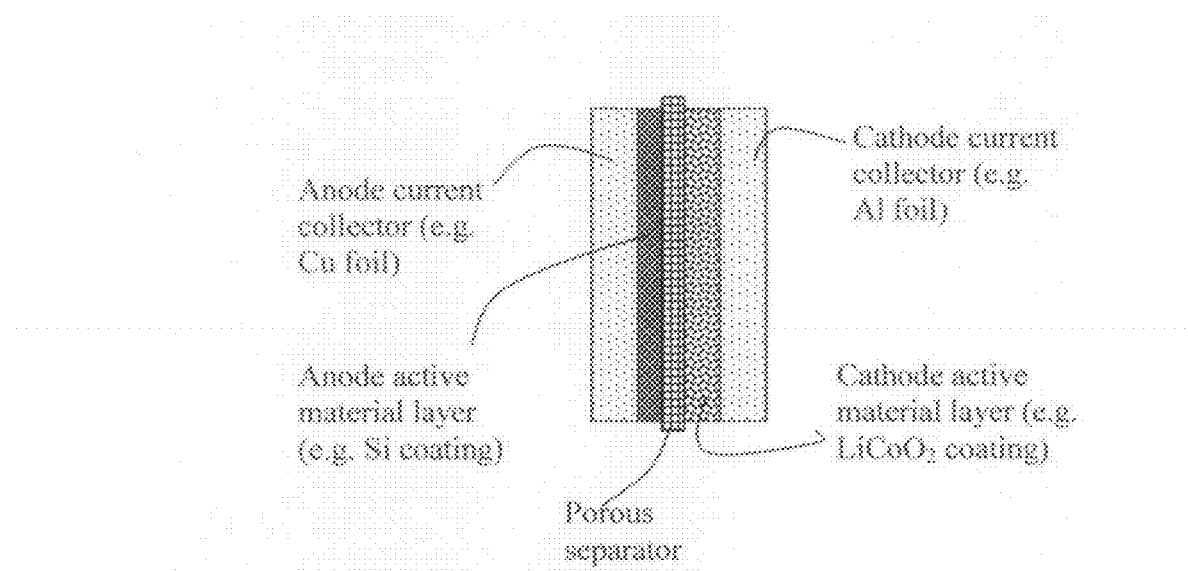
FIG. 1(A) schematic of a prior art lithium-ion battery cell (as an example of an alkali metal battery) composed of an anode current collector, an anode electrode (e g thin Si coating layer), a porous separator, a cathode electrode (e.g. sulfur layer), and a cathode current collector.
Figure 1B:
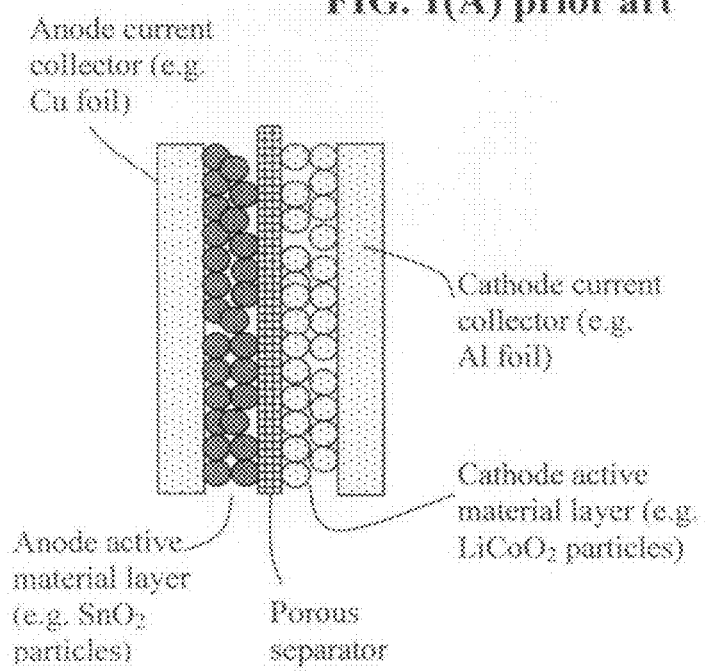
FIG. 1(B) schematic of a prior art lithium-ion battery, wherein the electrode layer is composed of discrete particles of an active material (e.g. graphite or tin oxide particles in the anode layer or LiCoO$_2$ in the cathode layer).

As illustrated in FIGS. 1(A) and 1(B), a lithium-ion battery cell is typically composed of an anode current collector (e.g. Cu foil), an anode electrode (anode active material layer), a porous separator and/or an electrolyte component, a cathode electrode (cathode active material layer), and a cathode current collector (e.g. Al foil). In a more commonly used cell configuration (FIG. 1(B)), the anode layer is composed of particles of an anode active material (e.g. graphite or Si), a conductive additive (e.g. carbon black particles), and a resin binder (e.g. SBR or PVDF). The cathode layer is composed of particles of a cathode active material (e.g. LFP particles), a conductive additive (e.g. carbon black particles), and a resin binder (e.g. PVDF). Both the anode and the cathode layers are typically up to 100-200 μm thick to give rise to a presumably sufficient amount of current per unit electrode area. This thickness range is considered an industry-accepted constraint under which a battery designer normally works under. This thickness constraint is due to several reasons: (a) the existing battery electrode coating machines are not equipped to coat excessively thin or excessively thick electrode layers; (b) a thinner layer is preferred based on the consideration of reduced lithium ion diffusion path lengths; but, too thin a layer (e.g. <100 μm) does not contain a sufficient amount of an active lithium storage material (hence, insufficient current output); (c) thicker electrodes are prone to delaminate or crack upon drying or handling after roll-coating; and (d) all non-active material layers in a battery cell (e.g. current collectors and separator) must be kept to a minimum in order to obtain a minimum overhead weight and a maximum lithium storage capability and, hence, a maximized energy density (Wk/kg or Wh/L of cell).

In a less commonly used cell configuration, as illustrated in FIG. 1(A), either the anode active material (e.g. Si) or the cathode active material (e.g. lithium transition metal oxide) is deposited in a thin film form directly onto a current collector, such as a sheet of copper foil or Al foil. However, such a thin film structure with an extremely small thickness-direction dimension (typically much smaller than 500 nm, often necessarily thinner than 100 nm) implies that only a small amount of active material can be incorporated in an electrode (given the same electrode or current collector surface area), providing a low total lithium storage capacity and low lithium storage capacity per unit electrode surface area. Such a thin film must have a thickness less than 100 nm to be more resistant to cycling-induced cracking (for the anode) or to facilitate a full utilization of the cathode active material. Such a constraint further diminishes the total lithium storage capacity and the lithium storage capacity per unit electrode surface area. Such a thin-film battery has very limited scope of application.

On the anode side, a Si layer thicker than 100 nm has been found to exhibit poor cracking resistance during battery charge/discharge cycles. It takes but a few cycles to get fragmented. On the cathode side, a sputtered layer of lithium metal oxide thicker than 100 nm does not allow lithium ions to fully penetrate and reach full body of the cathode layer, resulting in a poor cathode active material utilization rate. A desirable electrode thickness is at least 100 μm, with individual active material coating or particle having a dimension desirably less than 100 nm. Thus, these thin-film electrodes (with a thickness<100 nm) directly deposited on a current collector fall short of the required thickness by three (3) orders of magnitude. As a further problem, all of the cathode active materials are not conductive to both electrons and lithium ions. A large layer thickness implies an excessively high internal resistance and a poor active material utilization rate.

In other words, there are several conflicting factors that must be considered concurrently when it comes to the design and selection of a cathode or anode active material in terms of material type, size, electrode layer thickness, and active material mass loading. Thus far, there has been no effective solution offered by any prior art teaching to these often conflicting problems. We have solved these challenging issues, which have troubled battery designers and electro-chemists alike for more than 30 years, by developing a new process of producing lithium batteries as herein disclosed.

The prior art lithium battery cell is typically made by a process that includes the following steps: (a) The first step includes mixing particles of the anode active material (e.g. Si nano particles or meso-carbon micro-beads, MCMBs), a conductive filler (e.g. graphite flakes), a resin binder (e.g. PVDF) in a solvent (e.g. NMP) to form an anode slurry. On a separate basis, particles of the cathode active material (e.g. LFP particles), a conductive filler (e.g. acetylene black), a resin binder (e.g. PVDF) are mixed and dispersed in a solvent (e.g. NMP) to form a cathode slurry. (b) The second step includes coating the anode slurry onto one or both primary surfaces of an anode current collector (e.g. Cu foil), drying the coated layer by vaporizing the solvent (e.g. NMP) to form a dried anode electrode coated on Cu foil. Similarly, the cathode slurry is coated and dried to form a dried cathode electrode coated on Al foil. Slurry coating is normally done in a roll-to-roll manner in a real manufacturing situation; (c) The third step includes laminating an anode/Cu foil sheet, a porous separator layer, and a cathode/Al foil sheet together to form a 3-layer or 5-layer assembly, which is cut and slit into desired sizes and stacked to form a rectangular structure (as an example of shape) or rolled into a cylindrical cell structure. (d) The rectangular or cylindrical laminated structure is then encased in an aluminum-plastic laminated envelope or steel casing. (e) A liquid electrolyte is then injected into the laminated structure to make a lithium battery cell.

There are several serious problems associated with the conventional process and the resulting lithium-ion battery cell or sodium-ion cell:

1) It is very difficult to produce an electrode layer (anode layer or cathode layer) that is thicker than 200 μm (100 μm on each side of a solid current collector, such as Al foil). There are several reasons why this is the case. An electrode of 100-200 μm in thickness typically requires a heating zone of 30-50 meters long in a slurry coating facility, which is too time consuming, too energy intensive, and not cost-effective. For some electrode active materials, such as metal oxide particles, it has not been possible to produce an electrode of good structural integrity that is thicker than 100 μm in a real manufacturing environment on a continuous basis. The resulting electrodes are very fragile and brittle. Thicker electrodes have a high tendency to delaminate and crack.

2) With a conventional process, as depicted in FIG. 1(A), the actual mass loadings of the electrodes and the apparent densities for the active materials are too low to achieve a gravimetric energy density of >200 Wh/kg. In most cases, the anode active material mass loading of the electrodes (areal density) is significantly lower than 25 mg/cm$^2$ and the apparent volume density or tap density of the active material is typically less than 1.2 g/cm$^3$ even for relatively large particles of graphite. The cathode active material mass loading of the electrodes (areal density) is significantly lower than 45 mg/cm$^2$ for lithium metal oxide-type inorganic materials and lower than 15 mg/cm$^2$ for organic or polymer materials. In addition, there are so many other non-active materials (e.g. conductive additive and resin binder) that add additional weights and volumes to the electrode without contributing to the cell capacity. These low areal densities and low volume densities result in relatively low gravimetric energy density and low volumetric energy density.

3) The conventional process requires dispersing electrode active materials (anode active material or cathode active material) in a liquid solvent (e.g. NMP) to make a slurry and, upon coating on a current collector surface, the liquid solvent has to be removed to dry the electrode layer. Once the anode and cathode layers, along with a separator layer, are laminated together and packaged in a housing to make a supercapacitor cell, one then injects a liquid electrolyte into the cell. In actuality, one makes the two electrodes wet, then makes the electrodes dry, and finally makes them wet again. Such a wet-dry-wet process does not sound like a good process at all.

4) Current lithium-ion batteries still suffer from a relatively low gravimetric energy density and low volumetric energy density. Commercially available lithium-ion batteries exhibit a gravimetric energy density of approximately 150-220 Wh/kg and a volumetric energy density of 450-600 Wh/L.

In literature, the energy density data reported based on either the active material weight alone or the electrode weight cannot directly translate into the energy densities of a practical battery cell or device. The "overhead weight" or weights of other device components (binder, conductive additive, current collectors, separator, electrolyte, and packaging) must also be taken into account. The convention production process results in the weight proportion of the anode active material (e.g. graphite or carbon) in a lithium-ion battery being typically from 12% to 17%, and that of the cathode active material (e.g. LiMn$_2$O$_4$) from 20% to 35%.

The present invention provides a process for producing an electrode of an alkali metal battery cell having a high electrode thickness, high active material mass loading, low overhead weight and volume, high volumetric capacitance, and high volumetric energy density. In addition, the manufacturing costs of the alkali metal batteries produced by the presently invented process are significantly lower than those by conventional processes.

Figure 1C:
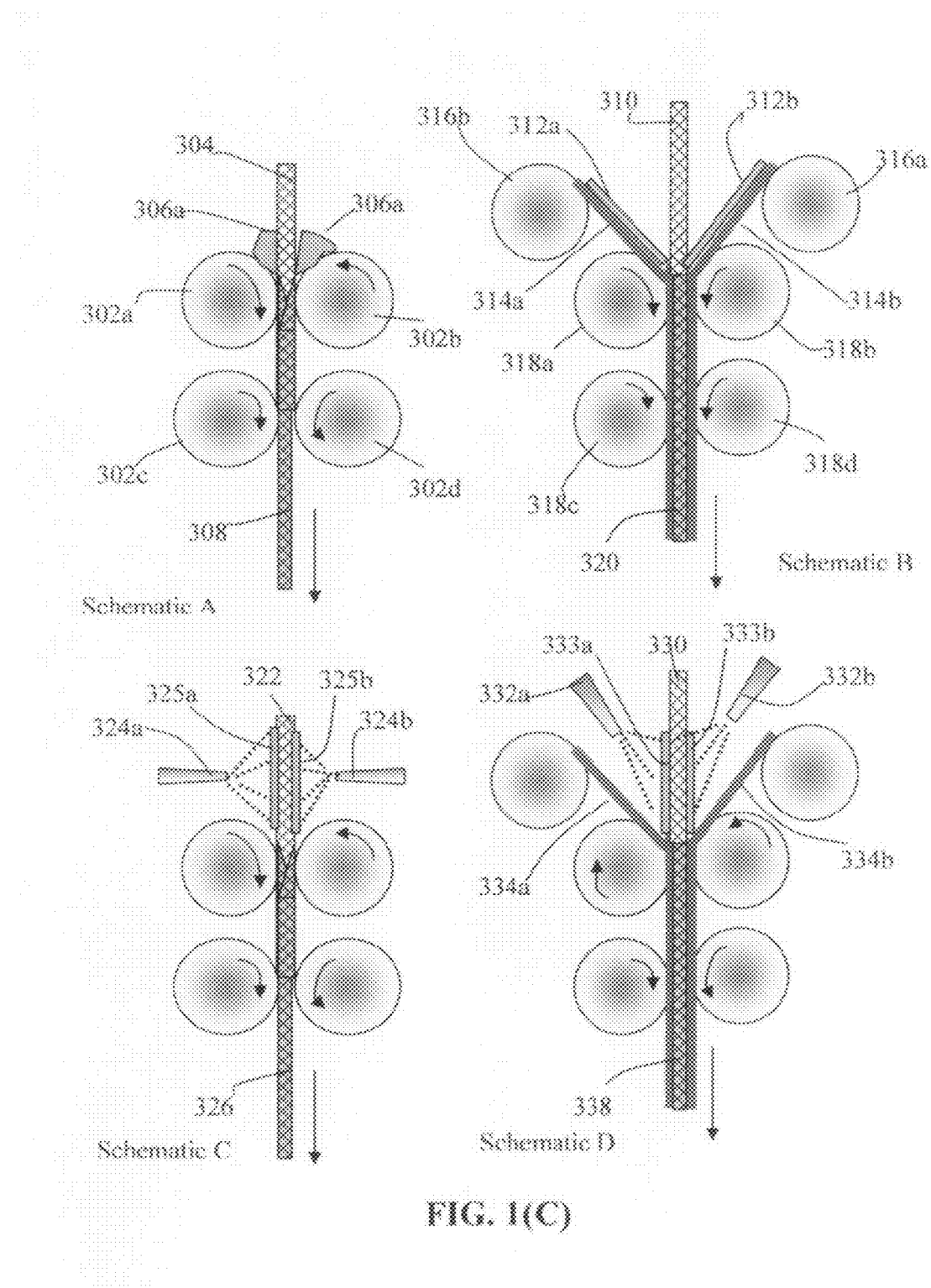
FIG. 1(C) Four examples that schematically illustrate the presently invented process for producing an electrode (anode or cathode) of an alkali metal battery.
Figure 1D:
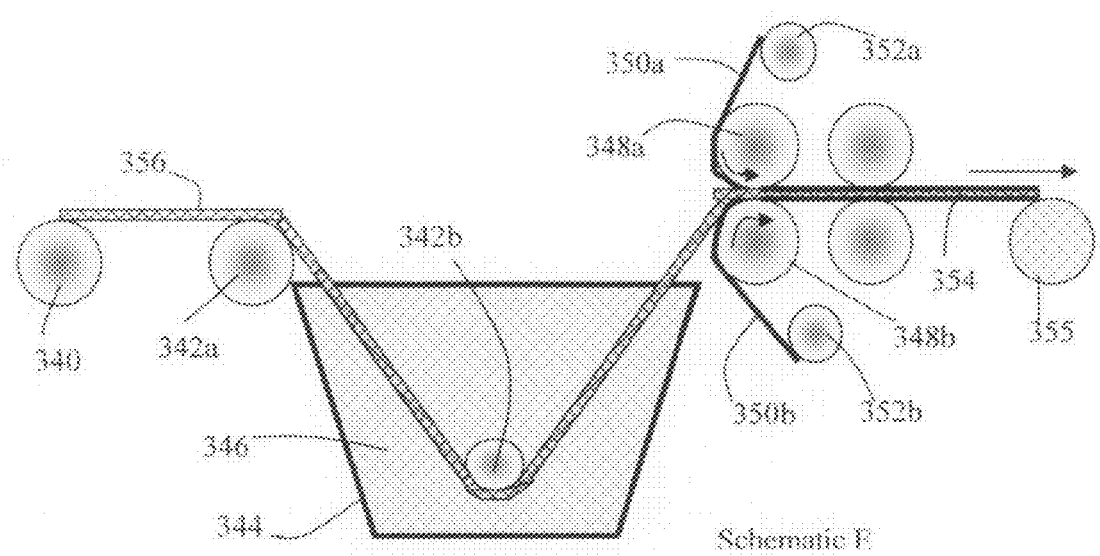
FIG. 1(D) Another example to schematically illustrate the presently invented process to produce an electrode (anode or cathode).

In one embodiment of the present invention, as illustrated in FIGS. 1(C) and 1(D), the invented process comprises continuously feeding an electrically conductive porous layer (e.g. 304, 310, 322, or 330), from a feeder roller (not shown), into an active material impregnation zone where a wet active material mixture (e.g. slurry, suspension, or gel-like mass, such as 306a, 306b, 312a, 312b) of an electrode active material and an optional conductive additive is delivered to at least a porous surface of the porous layer (e.g. 304 or 310 in Schematic A and schematic B, respectively, of FIG. 1(C)).

Using Schematic A as an example, the wet active material mixture (306a, 306b) is forced to impregnate into the porous layer from both sides using one or two pairs of rollers (302a, 302b, 302c, and 302d) to form an impregnated active electrode 308 (an anode or cathode). The conductive porous layer contains interconnected conductive pathways and at least 70% by volume (preferably >80%) of pores.

In Schematic B, two feeder rollers 316a, 316b are used to continuously pay out two protective films 314a, 314b that support wet active material mixture layers 312a, 312b. These wet active material mixture layers 312a, 312b can be delivered to the protective (supporting) films 314a, 314b using a broad array of procedures (e.g. printing, spraying, casting, coating, etc., which are well known in the art). As the conductive porous layer 110 moves though the gaps between two sets of rollers (318a, 318b, 318c, 318d), the wet active mixture material is impregnated into the pores of the porous layer 310 to form an active material electrode 320 (an anode or cathode electrode layer) covered by two protective films 314a, 314b.

Using Schematic C as another example, two spraying devices 324a, 324b were used to dispense the wet active material mixture (325a, 325b) to the two opposed porous surfaces of the conductive porous layer 322. The wet active material mixture is forced to impregnate into the porous layer from both sides using one or two pairs of rollers to form an impregnated active electrode 326 (an anode or cathode). Similarly, in Schematic D, two spraying devices 332a, 332b were used to dispense the wet active material mixture (333a, 333b) to the two opposed porous surfaces of the conductive porous layer 330. The wet active material mixture is forced to impregnate into the porous layer from both sides using one or two pairs of rollers to form an impregnated active electrode 338 (an anode or cathode).

The resulting electrode layer (anode or cathode electrode), after consolidation, has a thickness no less than 100 μm (preferably >200 μm, further preferably >300 μm, more preferably >400 μm; further more preferably >500 μm, 600 μm, or even >1,000 μm; no theoretical limitation on this anode thickness. Consolidation is accomplished with the application of a compressive stress (from rollers) to force the wet active material mixture ingredients to infiltrate into the pores of the conductive porous layer. The conductive porous layer is also compressed together to form a current collector that essentially extends over the thickness of the entire electrode.

Another example, as illustrated in Schematic E of FIG. 1(D), the electrode production process begins by continuously feeding a conductive porous layer 356 from a feeder roller 340. The porous layer 356 is directed by a roller 342 to get immersed into a wet active material mixture mass 346 (slurry, suspension, gel, etc.) in a container 344. The active material mixture begins to impregnate into pores of the porous layer 356 as it travels toward roller 342b and emerges from the container to feed into the gap between two rollers 348a, 348b. Two protective films 350a, 350b are concurrently fed from two respective rollers 352a, 352b to cover the impregnated porous layer 354, which may be continuously collected on a rotating drum (a winding roller 355). The process is applicable to both the anode and the cathode electrodes.

Figure 1E:
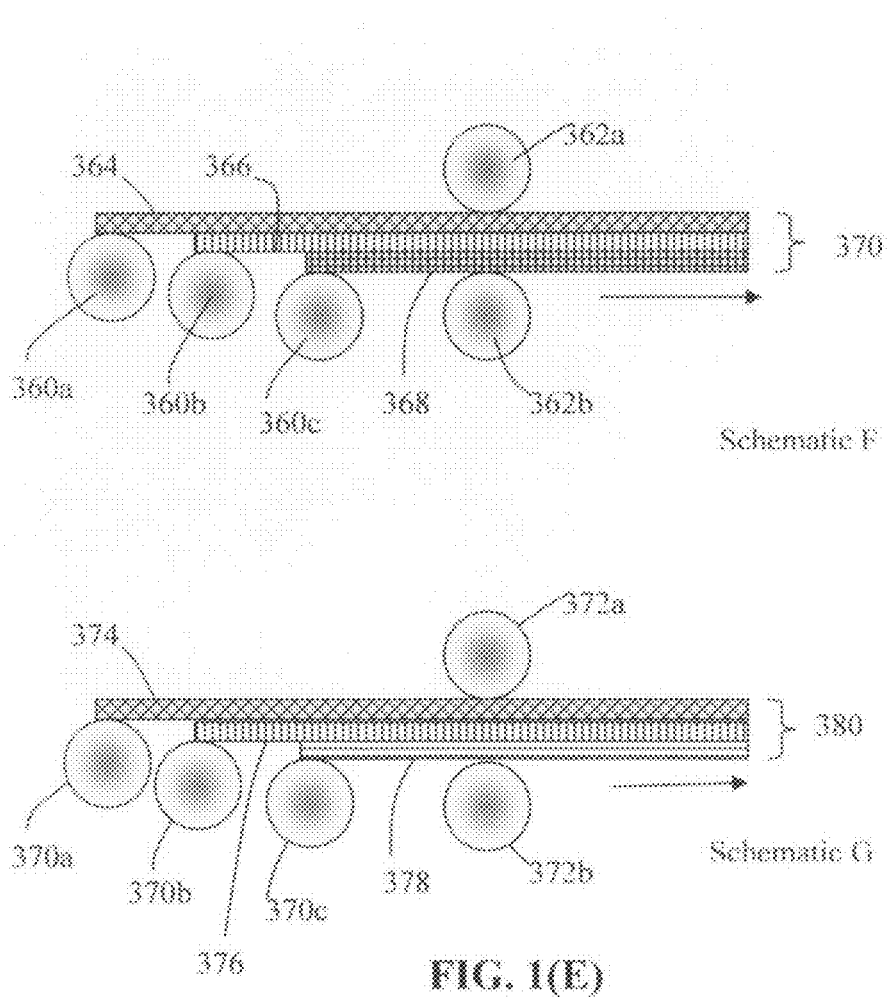
FIG. 1(E) Schematic of a presently invented process for continuously producing an alkali metal-ion battery by combining and laminating an anode electrode, separator, and cathode electrode (illustrated in Schematic F), and that for continuously producing an alkali metal battery laminate in an automated manner (Schematic G); the latter battery comprising an anode current collector containing a layer of an alkali metal (e.g. lithium metal) or alkali metal alloy (e.g. lithium metal alloy) deposited thereon, a porous separator, and a cathode electrode.
Figure 2:
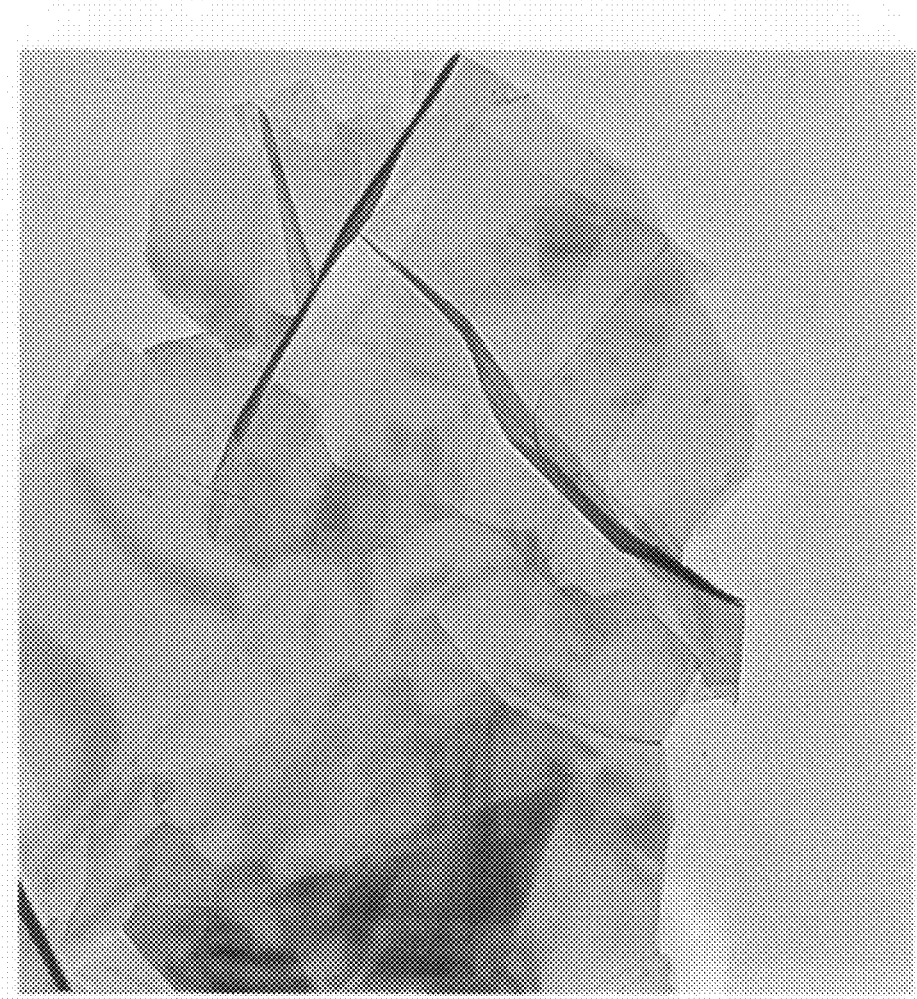
FIG. 2 An electron microscopic image of graphene sheets.
Figure 3A:
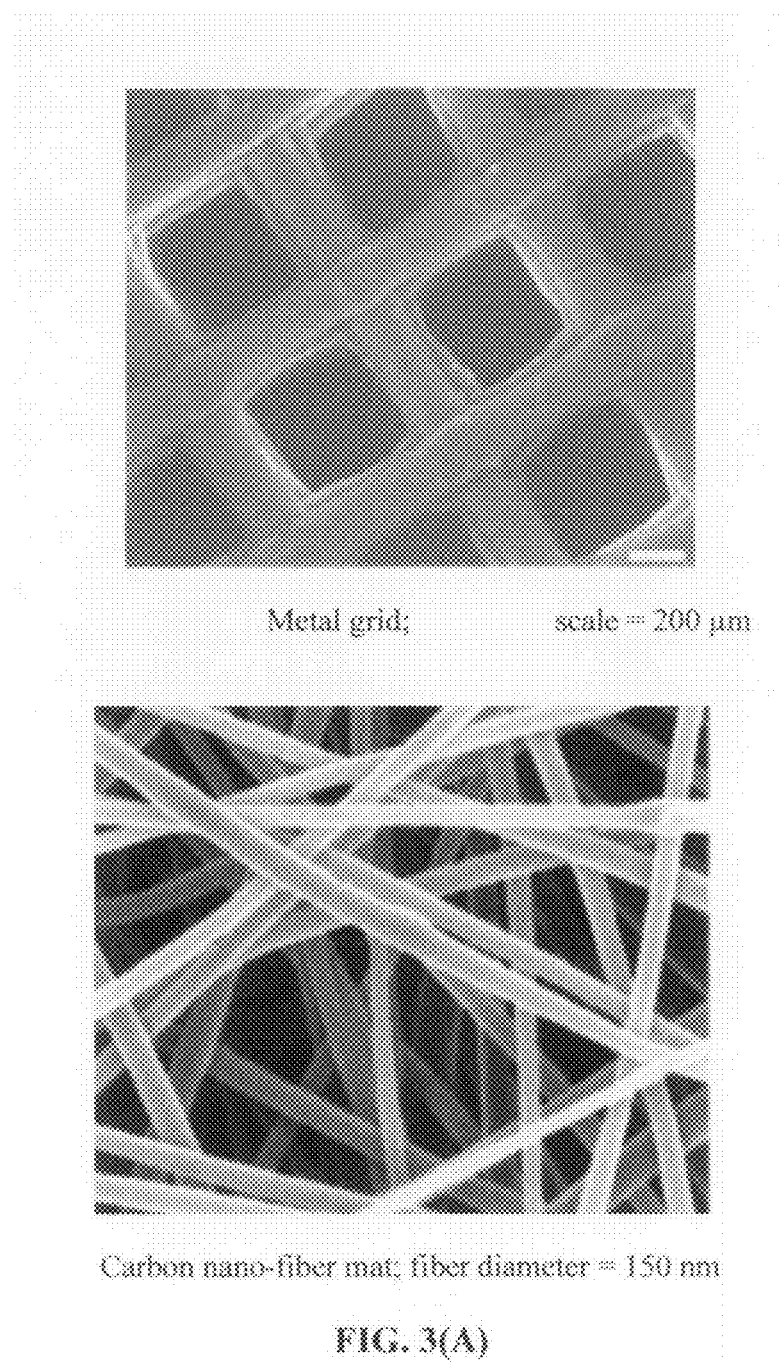
FIG. 3(A) Examples of conductive porous layers: metal grid/mesh and carbon nano-fiber mat.
Figure 3B:
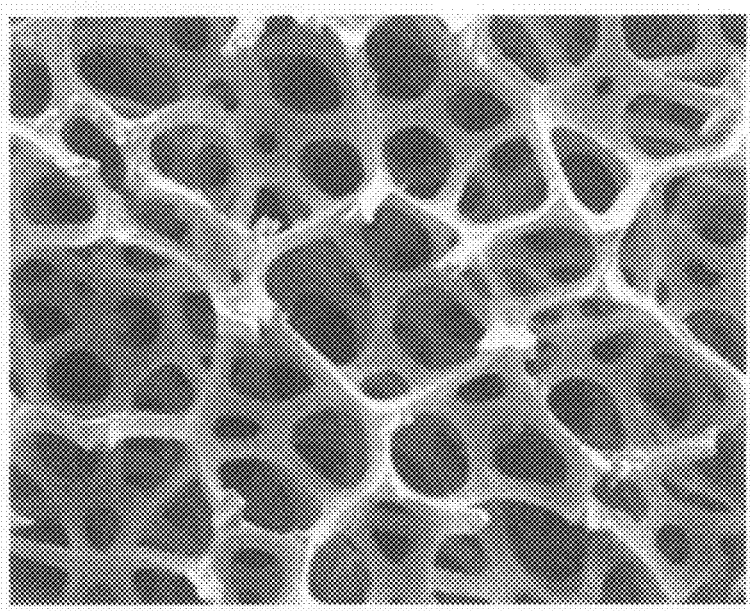
FIG. 3(B) Examples of conductive porous layers: graphene foam and carbon foam.
Figure 3B:
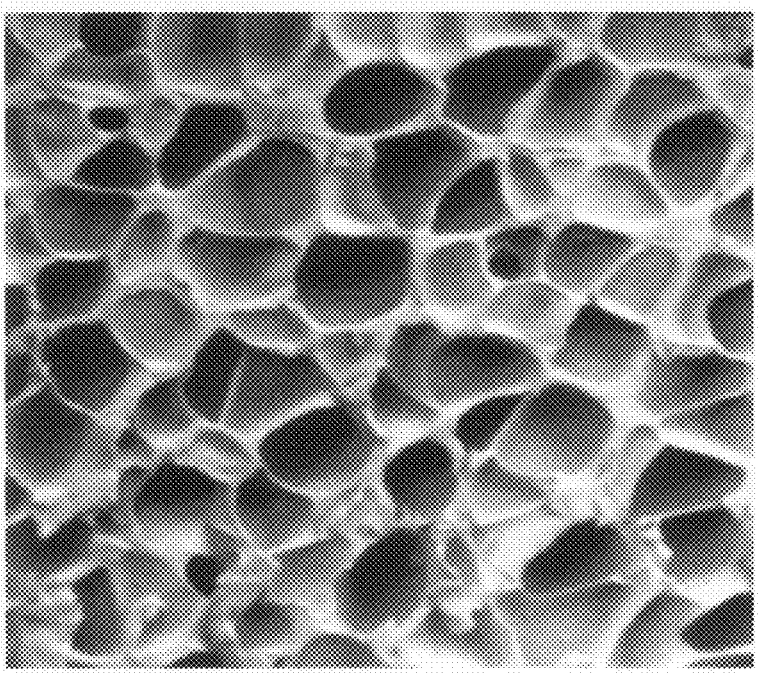
Figure 3C:
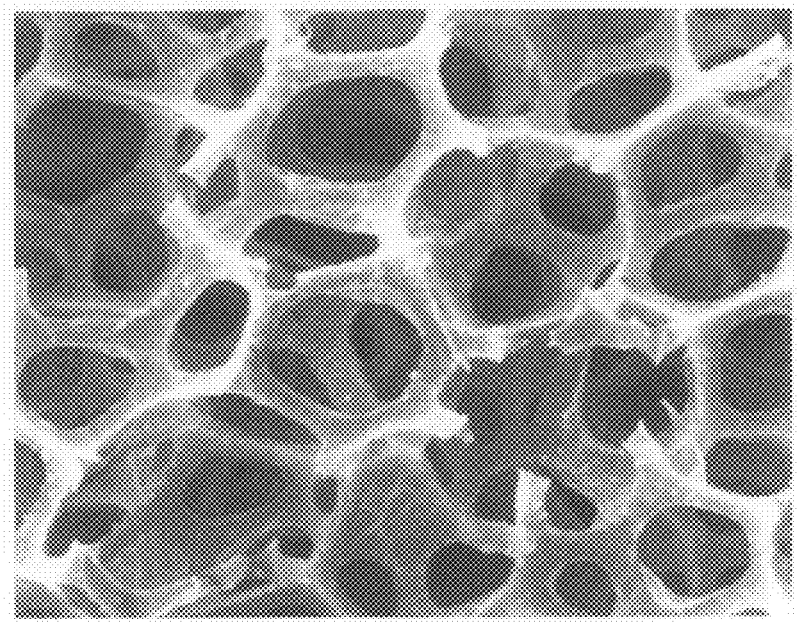
FIG. 3(C) Examples of conductive porous layers: graphite foam and Ni foam.
Figure 3C:
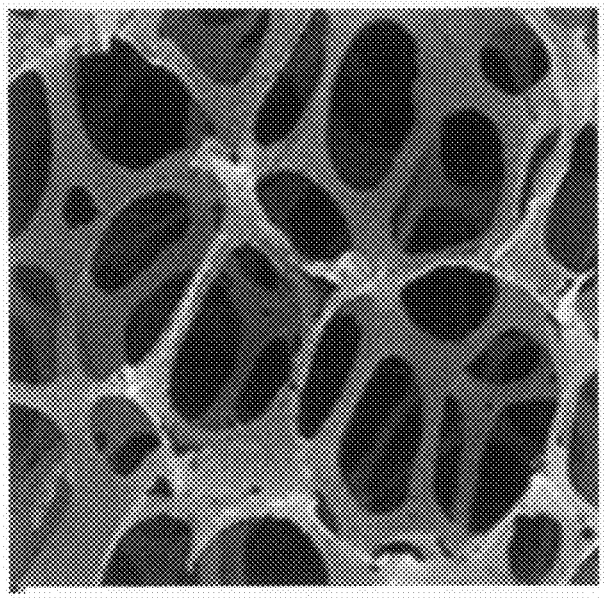
Figure 3D:
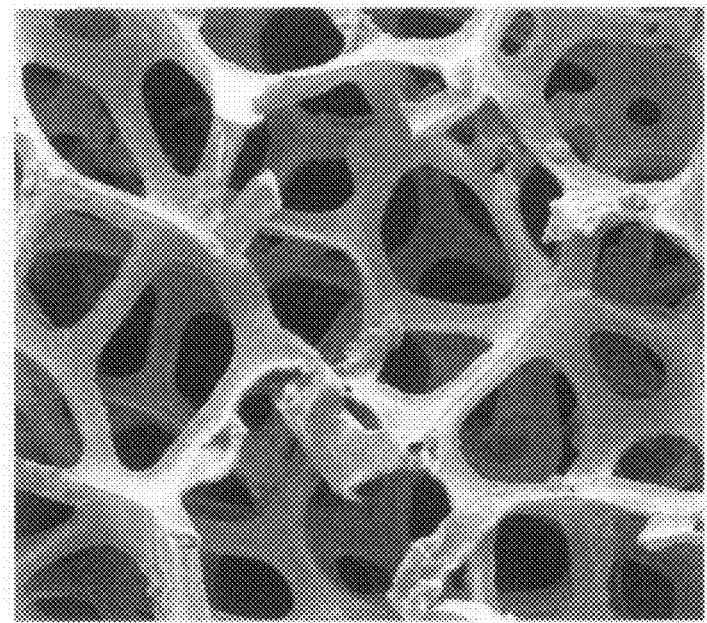
FIG. 3(D) Examples of conductive porous layers: Cu foam and stainless steel foam.
Figure 3D:
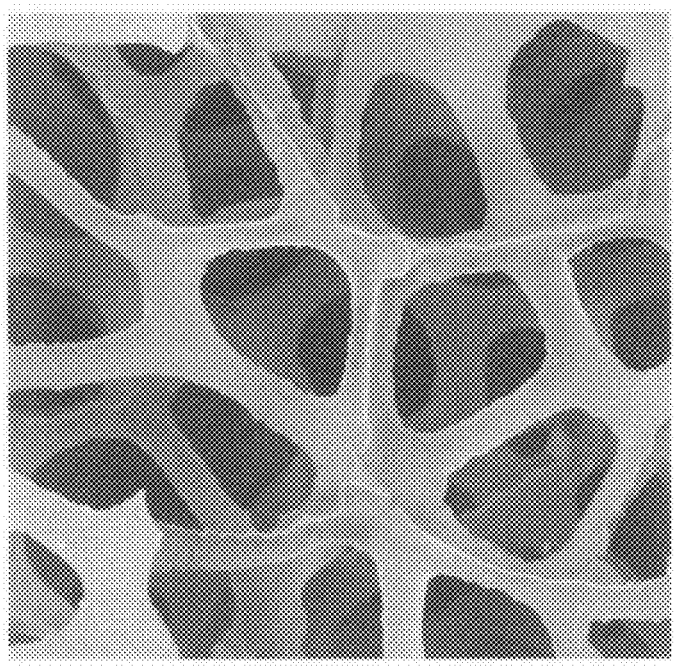

As illustrated in Schematic F of FIG. 1(E), at least one anode electrode 364 (e.g. produced by the presently invented process), a porous separator 366, and at least one cathode electrode 368 (e.g. produced by the presently invented process), may be unwound from rollers 360a, 360b, and 360c, respectively, laminated and consolidated together by moving through a pair of rollers 362*a*, 362*b* to form an alkali metal ion battery assembly 370. Such a battery assembly 370 can be slit and cut into any desired shape and dimensions and sealed in a protective housing. It may be noted that a plurality of impregnated anode layers can be stacked and compacted into one single anode electrode. Similarly, a plurality of impregnated cathode layers can be stacked and compacted into one single cathode electrode.

Alternatively, as illustrated in Schematic G of FIG. 1(E), an anode electrode 378 (e.g. a Cu foil coated with Li or Na metal on two surfaces), a porous separator 376, and a cathode electrode 374 (e.g. produced by the presently invented process), may be unwound from rollers 370*c*, 370*b*, and 370*a*, respectively, laminated and consolidated together by moving through a pair of rollers 362*a*, 362*b* to form an alkali metal battery assembly 380. Such a battery assembly 380 can be slit and cut into any desired shape and dimensions and sealed in a protective housing.

The above are but several examples to illustrate how the presently invented alkali metal electrodes and alkali metal batteries can be made continuously, in an automated manner. These examples should not be used to limit the scope of the instant invention.

The electrically conductive porous layers may be selected from metal foam, metal web or screen, perforated metal sheet-based structure, metal fiber mat, metal nanowire mat, conductive polymer nano-fiber mat, conductive polymer foam, conductive polymer-coated fiber foam, carbon foam, graphite foam, carbon aerogel, carbon xerogel, graphene foam, graphene oxide foam, reduced graphene oxide foam, carbon fiber foam, graphite fiber foam, exfoliated graphite foam, or a combination thereof. The porous layers must be made of an electrically conductive material, such as a carbon, graphite, metal, metal-coated fiber, conductive polymer, or conductive polymer-coated fiber, which is in a form of highly porous mat, screen/grid, non-woven, foam, etc. Examples of conductive porous layers are presented in FIG. 3(A), FIG. 3(B), FIG. 3(C), and FIG. 3(D). The porosity level must be at least 70% by volume, preferably greater than 80%, further preferably greater than 90%, and most preferably greater than 95% by volume. The backbone or foam walls form a network of electron-conducting pathways.

Preferably, substantially all of the pores in the original conductive porous layers are filled with the electrode (anode or cathode) active material, optional conductive additive, and liquid electrolyte (no binder resin needed). Since there are great amounts of pores (80-99%) relative to the pore walls or conductive pathways (1-20%), very little space is wasted ("being wasted" means not being occupied by the electrode active material and electrolyte), resulting in high amounts of electrode active material-electrolyte zones (high active material loading mass).

In such battery electrode configurations (FIG. 1(C)-(E)), the electrons only have to travel a short distance (half of the pore size, on average; e.g. a few micrometers) before they are collected by the current collector (pore walls) since pore walls are present everywhere throughout the entire current collector (also the entire anode layer). These pore walls form a 3-D network of interconnected electron-transporting pathways with minimal resistance. Additionally, in each anode electrode or cathode electrode layer, all electrode active material particles are pre-dispersed in a liquid electrolyte (no wettability issue), eliminating the existence of dry pockets commonly present in an electrode prepared by the conventional process of wet coating, drying, packing, and electrolyte injection. Thus, the presently invented process produces a totally unexpected advantage over the conventional battery cell production process.

In a preferred embodiment, the anode active material is a prelithiated or pre-sodiated version of graphene sheets selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof. The starting graphitic material for producing any one of the above graphene materials may be selected from natural graphite, artificial graphite, mesophase carbon, meso-phase pitch, meso-carbon micro-bead, soft carbon, hard carbon, coke, carbon fiber, carbon nano-fiber, carbon nano-tube, or a combination thereof. Graphene materials are also a good conductive additive for both the anode and cathode active materials of an alkali metal battery.

The constituent graphene planes of a graphite crystallite in a natural or artificial graphite particle can be exfoliated and extracted or isolated to obtain individual graphene sheets of hexagonal carbon atoms, which are single-atom thick, provided the inter-planar van der Waals forces can be overcome. An isolated, individual graphene plane of carbon atoms is commonly referred to as single-layer graphene. A stack of multiple graphene planes bonded through van der Waals forces in the thickness direction with an inter-graphene plane spacing of approximately 0.3354 nm is commonly referred to as a multi-layer graphene. A multi-layer graphene platelet has up to 300 layers of graphene planes (<100 nm in thickness), but more typically up to 30 graphene planes (<10 nm in thickness), even more typically up to 20 graphene planes (<7 nm in thickness), and most typically up to 10 graphene planes (commonly referred to as few-layer graphene in scientific community). Single-layer graphene and multi-layer graphene sheets are collectively called "nano graphene platelets" (NGPs). Graphene sheets/platelets (collectively, NGPs) are a new class of carbon nano material (a 2-D nano carbon) that is distinct from the 0-D fullerene, the 1-D CNT or CNF, and the 3-D graphite. For the purpose of defining the claims and as is commonly understood in the art, a graphene material (isolated graphene sheets) is not (and does not include) a carbon nanotube (CNT) or a carbon nano-fiber (CNF).

Figure 4A:
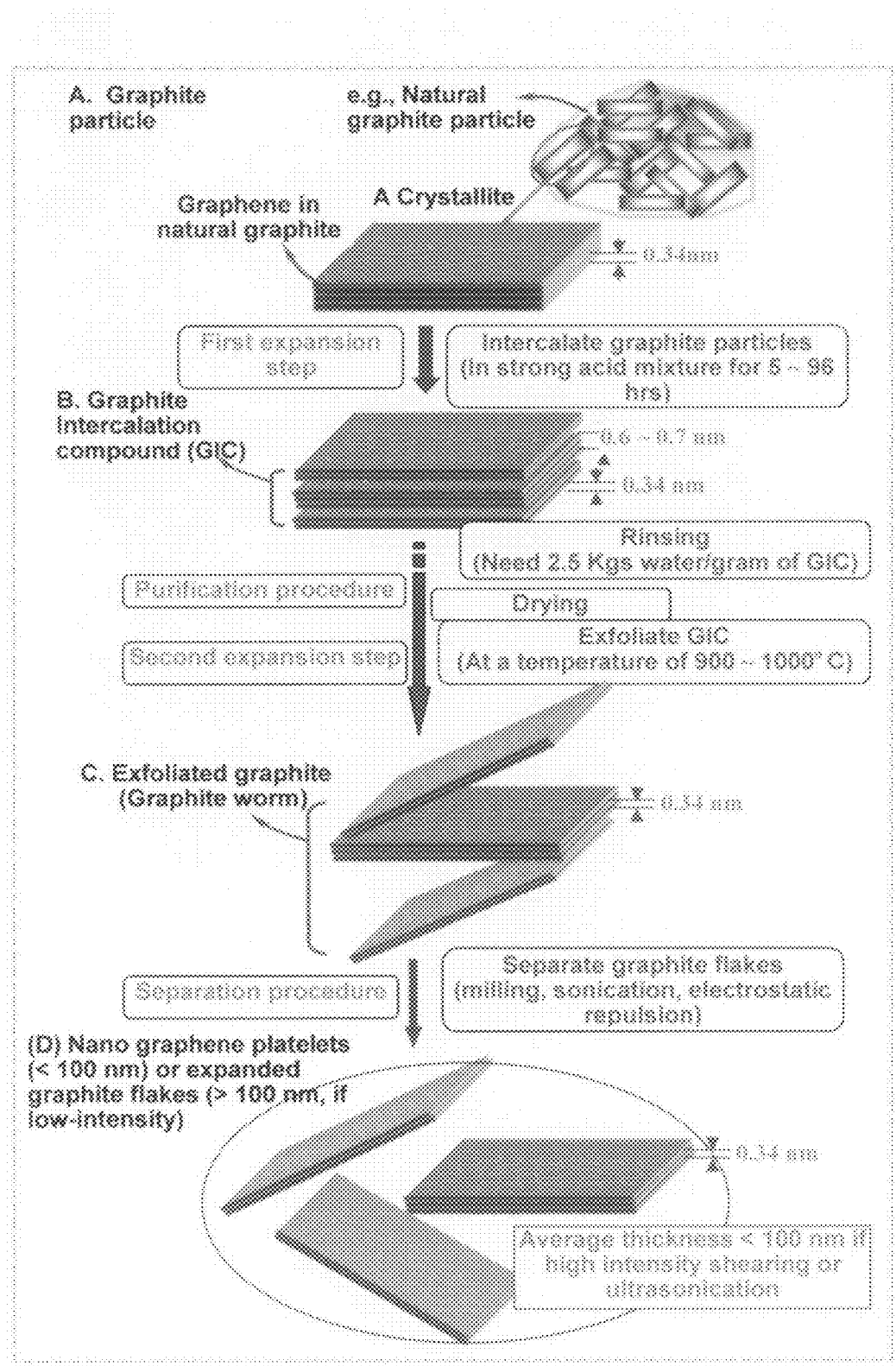
FIG. 4(A) Schematic of a commonly used process for producing exfoliated graphite, expanded graphite flakes (thickness>100 nm), and graphene sheets (thickness<100 nm, more typically <10 nm, and can be as thin as 0.34 nm).
Figure 4:
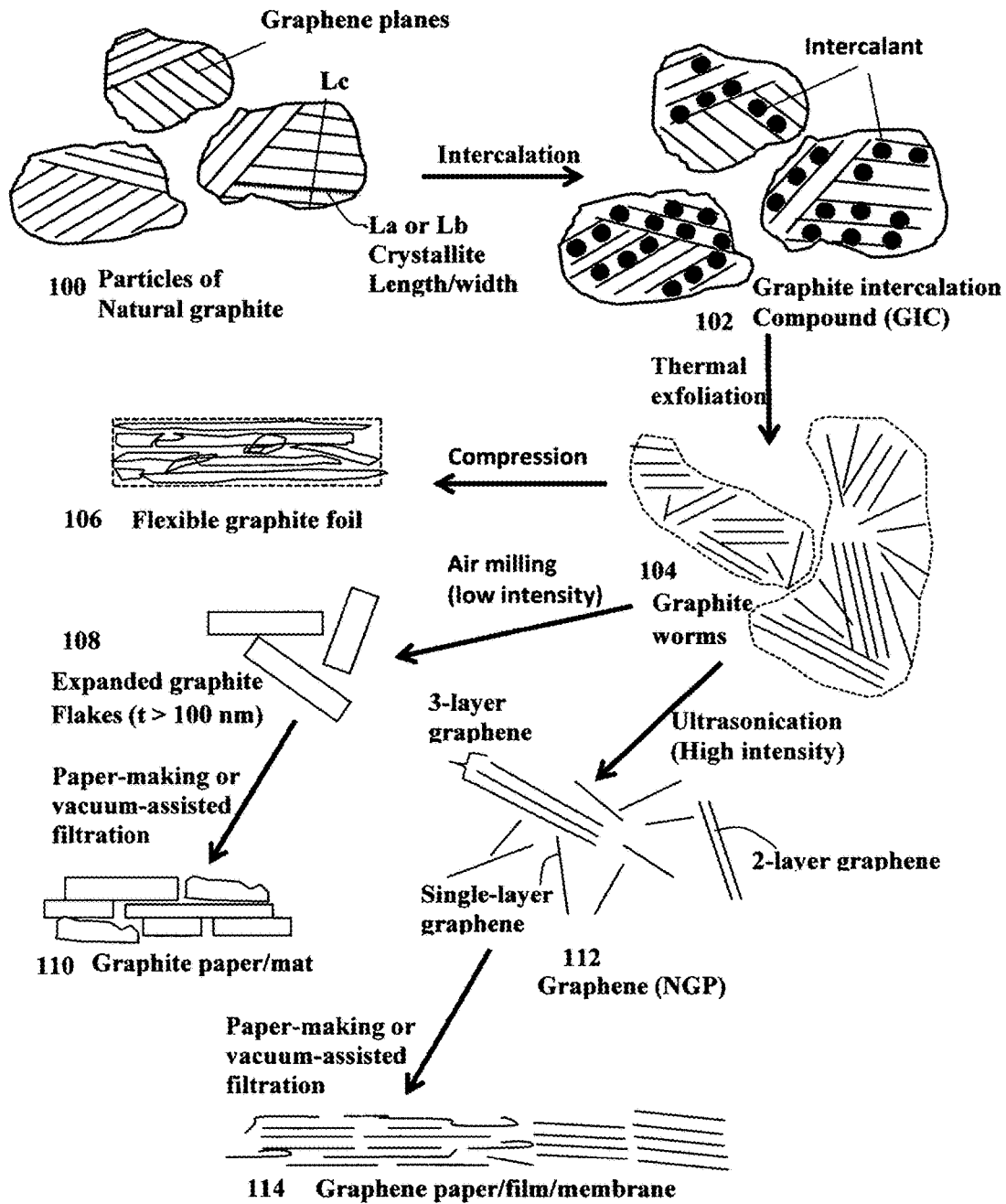
FIG. 4(B) Schematic drawing to illustrate the processes for producing exfoliated graphite, expanded graphite flakes, and graphene sheets.

In one process, graphene materials are obtained by intercalating natural graphite particles with a strong acid and/or an oxidizing agent to obtain a graphite intercalation compound (GIC) or graphite oxide (GO), as illustrated in FIG. 4(A) and FIG. 4(B) (schematic drawings). The presence of chemical species or functional groups in the interstitial spaces between graphene planes in a GIC or GO serves to increase the inter-graphene spacing ($d_{002}$, as determined by X-ray diffraction), thereby significantly reducing the van der Waals forces that otherwise hold graphene planes together along the c-axis direction. The GIC or GO is most often produced by immersing natural graphite powder (100 in FIG. 4(B)) in a mixture of sulfuric acid, nitric acid (an oxidizing agent), and another oxidizing agent (e.g. potassium permanganate or sodium perchlorate). The resulting GIC (102) is actually some type of graphite oxide (GO) particles if an oxidizing agent is present during the intercalation procedure. This GIC or GO is then repeatedly washed and rinsed in water to remove excess acids, resulting in a graphite oxide suspension or dispersion, which contains discrete and visually discernible graphite oxide particles dispersed in water. In order to produce graphene materials, one can follow one of the two processing routes after this rinsing step, briefly described below:

Route 1 involves removing water from the suspension to obtain "expandable graphite," which is essentially a mass of dried GIC or dried graphite oxide particles. Upon exposure of expandable graphite to a temperature in the range of typically 800-1,050° C. for approximately 30 seconds to 2 minutes, the GIC undergoes a rapid volume expansion by a factor of 30-300 to form "graphite worms" (104), which are each a collection of exfoliated, but largely un-separated graphite flakes that remain interconnected.

In Route 1A, these graphite worms (exfoliated graphite or "networks of interconnected/non-separated graphite flakes") can be re-compressed to obtain flexible graphite sheets or foils (106) that typically have a thickness in the range of 0.1 mm (100 μm)-0.5 mm (500 μm). Alternatively, one may choose to use a low-intensity air mill or shearing machine to simply break up the graphite worms for the purpose of producing the so-called "expanded graphite flakes" (108) which contain mostly graphite flakes or platelets thicker than 100 nm (hence, not a nano material by definition).

In Route 1B, the exfoliated graphite is subjected to high-intensity mechanical shearing (e.g. using an ultrasonicator, high-shear mixer, high-intensity air jet mill, or high-energy ball mill) to form separated single-layer and multi-layer graphene sheets (collectively called NGPs, 112), as disclosed in our U.S. application Ser. No. 10/858,814 (Jun. 3, 2004). Single-layer graphene can be as thin as 0.34 nm, while multi-layer graphene can have a thickness up to 100 nm, but more typically less than 10 nm (commonly referred to as few-layer graphene). Multiple graphene sheets or platelets may be made into a sheet of NGP paper using a paper-making process. This sheet of NGP paper is an example of the porous graphene structure layer utilized in the presently invented process.

Route 2 entails ultrasonicating the graphite oxide suspension (e.g. graphite oxide particles dispersed in water) for the purpose of separating/isolating individual graphene oxide sheets from graphite oxide particles. This is based on the notion that the inter-graphene plane separation bas been increased from 0.3354 nm in natural graphite to 0.6-1.1 nm in highly oxidized graphite oxide, significantly weakening the van der Waals forces that hold neighboring planes together. Ultrasonic power can be sufficient to further separate graphene plane sheets to form fully separated, isolated, or discrete graphene oxide (GO) sheets. These graphene oxide sheets can then be chemically or thermally reduced to obtain "reduced graphene oxides" (RGO) typically having an oxygen content of 0.001%-10% by weight, more typically 0.01%-5% by weight, most typically and preferably less than 2% by weight of oxygen.

For the purpose of defining the claims of the instant application, NGPs or graphene materials include discrete sheets/platelets of single-layer and multi-layer (typically less than 10 layers) pristine graphene, graphene oxide, reduced graphene oxide (RGO), graphene fluoride, graphene chloride, graphene bromide, graphene iodide, hydrogenated graphene, nitrogenated graphene, chemically functionalized graphene, doped graphene (e.g. doped by B or N). Pristine graphene has essentially 0% oxygen. RGO typically has an oxygen content of 0.001%-5% by weight. Graphene oxide (including RGO) can have 0.001%-50% by weight of oxygen. Other than pristine graphene, all the graphene materials have 0.001%-50% by weight of non-carbon elements (e.g. O, H, N, B, F, Cl, Br, I, etc.). These materials are herein referred to as non-pristine graphene materials.

Pristine graphene, in smaller discrete graphene sheets (typically 0.3 μm to 10 μm), may be produced by direct ultrasonication (also known as liquid phase exfoliation or production) or supercritical fluid exfoliation of graphite particles. These processes are well-known in the art.

The graphene oxide (GO) may be obtained by immersing powders or filaments of a starting graphitic material (e.g. natural graphite powder) in an oxidizing liquid medium (e.g. a mixture of sulfuric acid, nitric acid, and potassium permanganate) in a reaction vessel at a desired temperature for a period of time (typically from 0.5 to 96 hours, depending upon the nature of the starting material and the type of oxidizing agent used). As previously described above, the resulting graphite oxide particles may then be subjected to thermal exfoliation or ultrasonic wave-induced exfoliation to produce isolated GO sheets. These GO sheets can then be converted into various graphene materials by substituting —OH groups with other chemical groups (e.g. —Br, $NH_2$, etc.).

Fluorinated graphene or graphene fluoride is herein used as an example of the halogenated graphene material group. There are two different approaches that have been followed to produce fluorinated graphene: (1) fluorination of pre-synthesized graphene: This approach entails treating graphene prepared by mechanical exfoliation or by CVD growth with fluorinating agent such as $XeF_2$, or F-based plasmas; (2) Exfoliation of multilayered graphite fluorides: Both mechanical exfoliation and liquid phase exfoliation of graphite fluoride can be readily accomplished.

Interaction of $F_2$ with graphite at high temperature leads to covalent graphite fluorides $(CF)_n$ or $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules. The process of liquid phase exfoliation includes ultrasonic treatment of a graphite fluoride in a liquid medium.

The nitrogenation of graphene can be conducted by exposing a graphene material, such as graphene oxide, to ammonia at high temperatures (200-400° C.). Nitrogenated graphene could also be formed at lower temperatures by a hydrothermal method; e.g. by sealing GO and ammonia in an autoclave and then increased the temperature to 150-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

The aforementioned features are further described and explained in detail as follows: As illustrated in FIG. 4(B), a graphite particle (e.g. 100) is typically composed of multiple graphite crystallites or grains. A graphite crystallite is made up of layer planes of hexagonal networks of carbon atoms. These layer planes of hexagonally arranged carbon atoms are substantially flat and are oriented or ordered so as to be substantially parallel and equidistant to one another in a particular crystallite. These layers of hexagonal-structured carbon atoms, commonly referred to as graphene layers or basal planes, are weakly bonded together in their thickness direction (crystallographic c-axis direction) by weak van der Waals forces and groups of these graphene layers are arranged in crystallites. The graphite crystallite structure is usually characterized in terms of two axes or directions: the c-axis direction and the a-axis (or b-axis) direction. The c-axis is the direction perpendicular to the basal planes. The a- or b-axes are the directions parallel to the basal planes (perpendicular to the c-axis direction).

Due to the weak van der Waals forces holding the parallel graphene layers, natural graphite can be treated so that the spacing between the graphene layers can be appreciably opened up so as to provide a marked expansion in the c-axis direction, and thus form an expanded graphite structure in which the laminar character of the carbon layers is substantially retained. The process for manufacturing flexible graphite is well-known in the art. In general, flakes of natural graphite (e.g. 100 in FIG. 4(B)) are intercalated in an acid solution to produce graphite intercalation compounds (GICs, 102). The GICs are washed, dried, and then exfoliated by exposure to a high temperature for a short period of time. This causes the flakes to expand or exfoliate in the c-axis direction of the graphite up to 80-300 times of their original dimensions. The exfoliated graphite flakes are vermiform in appearance and, hence, are commonly referred to as graphite worms 104. These worms of graphite flakes which have been greatly expanded can be formed without the use of a binder into cohesive or integrated sheets of expanded graphite, e.g. webs, papers, strips, tapes, foils, mats or the like (typically referred to as "flexible graphite" 106) having a typical density of about 0.04-2.0 g/cm$^3$ for most applications.

Acids, such as sulfuric acid, are not the only type of intercalating agent (intercalant) that penetrate into spaces between graphene planes to obtain GICs. Many other types of intercalating agents, such as alkali metals (Li, K, Na, Cs, and their alloys or eutectics), can be used to intercalate graphite to stage 1, stage 2, stage 3, etc. Stage n implies one intercalant layer for every n graphene planes. For instance, a stage-1 potassium-intercalated GIC means there is one layer of K for every graphene plane; or, one can find one layer of K atoms inserted between two adjacent graphene planes in a G/K/G/K/G/KG . . . sequence, where G is a graphene plane and K is a potassium atom plane. A stage-2 GIC will have a sequence of GG/K/GG/K/GG/K/GG . . . and a stage-3 GIC will have a sequence of GGG/K/GGG/K/GGG . . . , etc. These GICs can then be brought in contact with water or water-alcohol mixture to produce exfoliated graphite and/or separated/isolated graphene sheets.

Exfoliated graphite worms may be subjected to high-intensity mechanical shearing/separation treatments using a high-intensity air jet mill, high-intensity ball mill, or ultrasonic device to produce separated nano graphene platelets (NGPs) with all the graphene platelets thinner than 100 nm, mostly thinner than 10 nm, and, in many cases, being single-layer graphene (also illustrated as 112 in FIG. 4(B)). An NGP is composed of a graphene sheet or a plurality of graphene sheets with each sheet being a two-dimensional, hexagonal structure of carbon atoms. A mass of multiple NGPs (including discrete sheets/platelets of single-layer and/or few-layer graphene or graphene oxide may be made into a porous graphene film (114 in FIG. 4(B)) using a film-making process. Alternatively, with a low-intensity shearing, graphite worms tend to be separated into the so-called expanded graphite flakes (108 in FIG. 4(B) having a thickness>100 nm. These flakes can be formed into graphite mat or nonwoven 106 using mat-making process, with or without a resin binder, to form an expanded graphite foam. Graphite foams can be made by graphitization of carbon foams as well.

There is no restriction on the types of anode active materials or cathode active materials that can be used in practicing the instant invention. Preferably, in the invented process, the anode active material absorbs alkali ions (e.g. lithium ions) at an electrochemical potential of less than 1.0 volt (preferably less than 0.7 volts) above the Li/Li$^+$ (i.e. relative to Li→Li$^+$+e$^-$ as the standard potential) the Na/Na$^+$ reference when the battery is charged. In one preferred embodiment, the anode active material is selected from the group consisting of: (a) Particles of natural graphite, artificial graphite, meso-carbon microbeads (MCMB), and carbon (including soft carbon, hard carbon, carbon nano-fiber, and carbon nano-tube); (b) Silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe), and cadmium (Cd); (Si, Ge, Al, and Sn are most desirable due to their high specific capacities.) (c) Alloys or intermetallic compounds of Si, Ge, Sn, Pb, Sb, Bi, Zn, Al, or Cd with other elements, wherein the alloys or compounds are stoichiometric or non-stoichiometric (e.g. SiAl, SiSn); (d) Oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites (e.g. SnO, $TiO_2$, $Co_3O_4$, etc.); (e) Pre-lithiated versions thereof (e.g. pre-lithiated $TiO_2$, which is lithium titanate); (f) Pre-lithiated graphene sheets; and combinations thereof.

In another preferred embodiment, the anode active material is a pre-sodiated or pre-potassiated version of graphene sheets selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof. The starting graphitic material for producing any one of the above graphene materials may be selected from natural graphite, artificial graphite, meso-phase carbon, meso-phase pitch, meso-carbon micro-bead, soft carbon, hard carbon, coke, carbon fiber, carbon nano-fiber, carbon nano-tube, or a combination thereof. Graphene materials are also a good conductive additive for both the anode and cathode active materials of an alkali metal battery.

In the rechargeable alkali metal battery, the anode may contain an alkali ion source selected from an alkali metal, an alkali metal alloy, a mixture of alkali metal or alkali metal alloy with an alkali intercalation compound, an alkali element-containing compound, or a combination thereof. Particularly desired is an anode active material that contains an alkali intercalation compound selected from petroleum coke, carbon black, amorphous carbon, hard carbon, templated carbon, hollow carbon nanowires, hollow carbon sphere, titanates, $NaTi_2(PO_4)_3$, $Na_2Ti_3O_7$ (Sodium titanate), $Na_2C_8H_4O_4$ (Disodium Terephthalate), $Na_2TP$ (Sodium Terephthalate), $TiO_2$, $Na_xTiO_2$ (x=0.2 to 1.0), carboxylate based materials, $C_8H_4Na_2O_4$, $C_8H_6O_4$, $C_8H_5NaO_4$, $C_8Na_2F_4O_4$, $C_{10}H_2Na_4O_8$, $C_{14}H_4O_6$, $C_{14}H_4Na_4O_8$, or a combination thereof.

In an embodiment, the anode may contain a mixture of 2 or 3 types of anode active materials (e.g. mixed particles of activated carbon+NaTi$_2$(PO$_4$)$_3$) and the cathode can be a sodium intercalation compound alone (e.g. Na$_x$MnO$_2$), an electric double layer capacitor-type cathode active material alone (e.g. activated carbon), a redox pair of λ-MnO$_2$/activated carbon for pseudo-capacitance.

A wide variety of cathode active materials can be used to practice the presently invented process. The cathode active material typically is an alkali metal intercalation compound or alkali metal-absorbing compound that is capable of storing alkali metal ions when the battery is discharged and releasing alkali metal ions into the electrolyte when recharged. The cathode active material may be selected from an inorganic material, an organic or polymeric material, a metal oxide/phosphate/sulfide (most desired types of inorganic cathode materials), or a combination thereof.

The group of metal oxide, metal phosphate, and metal sulfides consisting of lithium cobalt oxide, lithium nickel oxide, lithium manganese oxide, lithium vanadium oxide, lithium transition metal oxide, lithium-mixed metal oxide, lithium iron phosphate, lithium manganese phosphate, lithium vanadium phosphate, lithium mixed metal phosphates, transition metal sulfides, and combinations thereof. In particular, the lithium vanadium oxide may be selected from the group consisting of VO$_2$, Li$_x$VO$_2$, V$_2$O$_5$, Li$_x$V$_2$O$_5$, V$_3$O$_8$, Li$_x$V$_3$O$_8$, Li$_x$V$_3$O$_7$, V$_4$O$_9$, Li$_x$V$_4$O$_9$, V$_6$O$_{13}$, Li$_x$V$_6$O$_{13}$, their doped versions, their derivatives, and combinations thereof, wherein 0.1<x<5. Lithium transition metal oxide may be selected from a layered compound LiMO$_2$, spinel compound LiM$_2$O$_4$, olivine compound LiMPO$_4$, silicate compound Li$_2$MSiO$_4$, Tavorite compound LiMPO$_4$F, borate compound LiMBO$_3$, or a combination thereof, wherein M is a transition metal or a mixture of multiple transition metals.

In the alkali metal cell or alkali metal-ion cell, the cathode active material may contain a sodium intercalation compound (or their potassium counterparts) selected from NaFePO$_4$ (Sodium iron phosphate), Na$_{0.7}$FePO$_4$, Na$_{1.5}$VOPO$_4$F$_{0.5}$, Na$_3$V$_2$(PO$_4$)$_3$, Na$_3$V2(PO$_4$)$_2$F$_3$, Na$_2$FePO$_4$F, NaFeF$_3$, NaVPO$_4$F, Na$_3$V$_2$(PO$_4$)$_2$F$_3$, Na$_{1.5}$VOPO$_4$F$_{0.5}$, Na$_3$V$_2$(PO$_4$)$_3$, NaV$_6$O$_{15}$, Na$_x$VO$_2$, Na$_{0.33}$V$_2$O$_5$, Na$_x$CoO$_2$ (Sodium cobalt oxide), Na$_{2/3}$[Ni$_{1/3}$Mn$_{2/3}$]O$_2$, Na$_x$(Fe$_{1/2}$Mn$_{1/2}$)O$_2$, Na$_x$MnO$_2$ (Sodium manganese bronze), λ-MnO$_2$, Na$_{0.44}$MnO$_2$, Na$_{0.44}$MnO$_2$/C, Na$_4$Mn$_9$O$_{18}$, NaFe$_2$Mn(PO$_4$)$_3$, Na$_2$Ti$_3$O$_7$, Ni$_{1/3}$Mn$_{1/3}$Co$_{1/3}$O$_2$, Cu$_{0.56}$Ni$_{0.44}$HCF (Copper and nickel hexacyanoferrate), NiHCF (nickel hexacyanoferrate), Na$_x$CoO$_2$, NaCrO$_2$, Na$_3$Ti$_2$(PO$_4$)$_3$, NiCo$_2$O$_4$, Ni$_3$S$_2$/FeS$_2$, Sb$_2$O$_4$, Na$_4$Fe(CN)$_6$/C, NaV$_{1-x}$Cr$_x$PO$_4$F, Se$_y$S$_z$ (Selenium and Selenium/Sulfur, z/y from 0.01 to 100), Se (without S), Alluaudites, or a combination thereof.

Other inorganic materials for use as a cathode active material may be selected from sulfur, sulfur compound, lithium polysulfide, transition metal dichalcogenide, a transition metal trichalcogenide, or a combination thereof. In particular, the inorganic material is selected from TiS$_2$, TaS$_2$, MoS$_2$, NbSe$_3$, MnO$_2$, CoO$_2$, an iron oxide, a vanadium oxide, or a combination thereof. These will be further discussed later.

In particular, the inorganic material may be selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof.

Alternatively, the cathode active material may be selected from a functional material or nano-structured material having an alkali metal ion-capturing functional group or alkali metal ion-storing surface in direct contact with the electrolyte. Preferably, the functional group reversibly reacts with an alkali metal ion, forms a redox pair with an alkali metal ion, or forms a chemical complex with an alkali metal ion. The functional material or nano-structured material may be selected from the group consisting of (a) a nano-structured or porous disordered carbon material selected from a soft carbon, hard carbon, polymeric carbon or carbonized resin, meso-phase carbon, coke, carbonized pitch, carbon black, activated carbon, nano-cellular carbon foam or partially graphitized carbon; (b) a nano graphene platelet selected from a single-layer graphene sheet or multi-layer graphene platelet; (c) a carbon nanotube selected from a single-walled carbon nanotube or multi-walled carbon nanotube; (d) a carbon nano-fiber, nano-wire, metal oxide nano-wire or fiber, conductive polymer nano-fiber, or a combination thereof; (e) a carbonyl-containing organic or polymeric molecule; (f) a functional material containing a carbonyl, carboxylic, or amine group; and combinations thereof.

The functional material or nano-structured material may be selected from the group consisting of Poly(2,5-dihydroxy-1,4-benzoquinone-3,6-methylene), Na$_x$C$_6$O$_6$ (x=1-3), Na$_2$(C$_6$H$_2$O$_4$), Na$_2$C$_8$H$_4$O$_4$ (Na terephthalate), Na$_2$C$_6$H$_4$O$_4$ (Li trans-trans-muconate), 3,4,9,10-perylenetetracarboxylicacid-dianhydride (PTCDA) sulfide polymer, PTCDA, 1,4,5,8-naphthalene-tetracarboxylicacid-dianhydride (NTCDA), Benzene-1,2,4,5-tetracarboxylic dianhydride, 1,4,5,8-tetrahydroxy anthraquinon, Tetrahydroxy-p-benzoquinone, and combinations thereof. Desirably, the functional material or nano-structured material has a functional group selected from —COOH, =O, —NH$_2$, —OR, or —COOR, where R is a hydrocarbon radical.

The organic material or polymeric material may be selected from Poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, Quino(triazene), redox-active organic material, Tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ([(NPS$_2$)$_3$]n), lithiated 1,4,5,8-naphthalenetetraol formaldehyde polymer, Hexaazatrinaphthylene (HATN), Hexaazatriphenylene hexacarbonitrile (HAT(CN)$_6$), 5-Benzylidene hydantoin, Isatine lithium salt, Pyromellitic diimide lithium salt, tetrahydroxy-p-benzoquinone derivatives (THQLi$_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, Li$_4$C$_6$O$_6$, Li$_2$C$_6$O$_6$, Li$_6$C$_6$O$_6$, or a combination thereof.

The thioether polymer is selected from Poly[methanetetryl-tetra(thiomethylene)] (PMTTM), Poly(2,4-dithiopentanylene) (PDTP), a polymer containing Poly(ethene-1,1,2,2-tetrathiol) (PETT) as a main-chain thioether polymers, a side-chain thioether polymer having a main-chain consisting of conjugating aromatic moieties, and having a thioether side chain as a pendant, Poly(2-phenyl-1,3-dithiolane) (PPDT), Poly(1,4-di(1,3-dithiolan-2-yl)benzene) (PDDTB), poly(tetrahydrobenzodithiophene) (PTHBDT), poly[1,2,4, 5-tetrakis(propylthio)benzene] (PTKPTB, or poly[3,4(ethylenedithio)thiophene] (PEDTT).

The organic material may be selected from a phthalocyanine compound selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

The lithium intercalation compound or lithium-absorbing compound may be selected from a metal carbide, metal nitride, metal boride, metal dichalcogenide, or a combination thereof. Preferably, the lithium intercalation compound or lithium-absorbing compound is selected from an oxide, dichalcogenide, trichalcogenide, sulfide, selenide, or telluride of niobium, zirconium, molybdenum, hafnium, tantalum, tungsten, titanium, vanadium, chromium, cobalt, manganese, iron, or nickel in a nanowire, nano-disc, nano-ribbon, or nano platelet form.

We have discovered that a wide variety of two-dimensional (2D) inorganic materials can be used as a cathode active material in the presented invented lithium battery prepared by the invented direct active material-electrolyte injection process. Layered materials represent a diverse source of 2D systems that can exhibit unexpected electronic properties and good affinity to lithium ions. Although graphite is the best known layered material, transition metal dichalcogenides (TMDs), transition metal oxides (TMOs), and a broad array of other compounds, such as BN, $Bi_2Te_3$, and $Bi_2Se_3$, are also potential sources of 2D materials.

Preferably, the lithium intercalation compound or lithium-absorbing compound is selected from nano discs, nano platelets, nano-coating, or nano sheets of an inorganic material selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof; wherein the discs, platelets, or sheets have a thickness less than 100 nm. The lithium intercalation compound or lithium-absorbing compound may contain nano discs, nano platelets, nano-coating, or nano sheets of a compound selected from: (i) bismuth selenide or bismuth telluride, (ii) transition metal dichalcogenide or trichalcogenide, (iii) sulfide, selenide, or telluride of niobium, zirconium, molybdenum, hafnium, tantalum, tungsten, titanium, cobalt, manganese, iron, nickel, or a transition metal; (iv) boron nitride, or (v) a combination thereof, wherein the discs, platelets, coating, or sheets have a thickness less than 100 nm.

Non-graphene 2D nano materials, single-layer or few-layer (up to 20 layers), can be produced by several methods: mechanical cleavage, laser ablation (e.g. using laser pulses to ablate TMDs down to a single layer), liquid phase exfoliation, and synthesis by thin film techniques, such as PVD (e.g. sputtering), evaporation, vapor phase epitaxy, liquid phase epitaxy, chemical vapor epitaxy, molecular beam epitaxy (MBE), atomic layer epitaxy (ALE), and their plasma-assisted versions.

A wide range of electrolytes can be used for practicing the instant invention. Most preferred are non-aqueous organic and/or ionic liquid electrolytes. The non-aqueous electrolyte to be employed herein may be produced by dissolving an electrolytic salt in a non-aqueous solvent. Any known non-aqueous solvent which has been employed as a solvent for a lithium secondary battery can be employed. A non-aqueous solvent mainly consisting of a mixed solvent comprising ethylene carbonate (EC) and at least one kind of non-aqueous solvent whose melting point is lower than that of aforementioned ethylene carbonate and whose donor number is 18 or less (hereinafter referred to as a second solvent) may be preferably employed. This non-aqueous solvent is advantageous in that it is (a) stable against a negative electrode containing a carbonaceous material well developed in graphite structure; (b) effective in suppressing the reductive or oxidative decomposition of electrolyte; and (c) high in conductivity. A non-aqueous electrolyte solely composed of ethylene carbonate (EC) is advantageous in that it is relatively stable against decomposition through a reduction by a graphitized carbonaceous material. However, the melting point of EC is relatively high, 39 to 40° C., and the viscosity thereof is relatively high, so that the conductivity thereof is low, thus making EC alone unsuited for use as a secondary battery electrolyte to be operated at room temperature or lower. The second solvent to be used in a mixture with EC functions to make the viscosity of the solvent mixture lower than that of EC alone, thereby promoting the ion conductivity of the mixed solvent. Furthermore, when the second solvent having a donor number of 18 or less (the donor number of ethylene carbonate is 16.4) is employed, the aforementioned ethylene carbonate can be easily and selectively solvated with lithium ion, so that the reduction reaction of the second solvent with the carbonaceous material well developed in graphitization is assumed to be suppressed. Further, when the donor number of the second solvent is controlled to not more than 18, the oxidative decomposition potential to the lithium electrode can be easily increased to 4 V or more, so that it is possible to manufacture a lithium secondary battery of high voltage.

Preferable second solvents are dimethyl carbonate (DMC), methylethyl carbonate (MEC), diethyl carbonate (DEC), ethyl propionate, methyl propionate, propylene carbonate (PC), .gamma.-butyrolactone (.gamma.-BL), acetonitrile (AN), ethyl acetate (EA), propyl formate (PF), methyl formate (MF), toluene, xylene and methyl acetate (MA). These second solvents may be employed singly or in a combination of two or more. More desirably, this second solvent should be selected from those having a donor number of 16.5 or less. The viscosity of this second solvent should preferably be 28 cps or less at 25° C.

The mixing ratio of the aforementioned ethylene carbonate in the mixed solvent should preferably be 10 to 80% by volume. If the mixing ratio of the ethylene carbonate falls outside this range, the conductivity of the solvent may be lowered or the solvent tends to be more easily decomposed, thereby deteriorating the charge/discharge efficiency. More preferable mixing ratio of the ethylene carbonate is 20 to 75% by volume. When the mixing ratio of ethylene carbonate in a non-aqueous solvent is increased to 20% by volume or more, the solvating effect of ethylene carbonate to lithium ions will be facilitated and the solvent decomposition-inhibiting effect thereof can be improved.

Examples of preferred mixed solvent are a composition comprising EC and MEC; comprising EC, PC and MEC; comprising EC, MEC and DEC; comprising EC, MEC and DMC; and comprising EC, MEC, PC and DEC; with the volume ratio of MEC being controlled within the range of 30 to 80%. By selecting the volume ratio of MEC from the range of 30 to 80%, more preferably 40 to 70%, the conductivity of the solvent can be improved. With the purpose of suppressing the decomposition reaction of the solvent, an electrolyte having carbon dioxide dissolved therein may be employed, thereby effectively improving both the capacity and cycle life of the battery. The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$) and bis-trifluoromethyl sulfonylimide lithium [$LiN(CF_3SO_2)_2$]. Among them, $LiPF_6$, $LiBF_4$ and $LiN(CF_3SO_2)_2$ are preferred. The content of aforementioned electrolytic salts in the non-aqueous solvent is preferably 0.5 to 2.0 mol/l.

The ionic liquid is composed of ions only. Ionic liquids are low melting temperature salts that are in a molten or liquid state when above a desired temperature. For instance, a salt is considered as an ionic liquid if its melting point is below 100° C. If the melting temperature is equal to or lower than room temperature (25° C.), the salt is referred to as a room temperature ionic liquid (RTIL). The IL salts are characterized by weak interactions, due to the combination of a large cation and a charge-delocalized anion. This results in a low tendency to crystallize due to flexibility (anion) and asymmetry (cation).

A typical and well-known ionic liquid is formed by the combination of a 1-ethyl-3-methylimidazolium (EMI) cation and an N,N-bis(trifluoromethane)sulphonamide (TFSI) anion. This combination gives a fluid with an ionic conductivity comparable to many organic electrolyte solutions and a low decomposition propensity and low vapor pressure up to ~300-400° C. This implies a generally low volatility and non-flammability and, hence, a much safer electrolyte for batteries.

Ionic liquids are basically composed of organic ions that come in an essentially unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulphonyl) imide, bis(fluorosulphonyl)imide, and hexafluorophosphate as anions. Based on their compositions, ionic liquids come in different classes that basically include aprotic, protic and zwitterionic types, each one suitable for a specific application.

Common cations of room temperature ionic liquids (RTILs) include, but not limited to, tetraalkylammonium, di-, tri-, and tetra-alkylimidazolium, alkylpyridinium, dialkylpyrrolidinium, dialkylpiperidinium, tetraalkylphosphonium, and trialkylsulfonium. Common anions of RTILs include, but not limited to, $BF_4^-$, $B(CN)_4^-$, $CH_3BF_3^-$, $CH2CHBF_3^-$, $CF_3BF_3^-$, $C_2F_5BF_3^-$, $n\text{-}C_3F_7BF_3^-$, $n\text{-}C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{2.3}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte ingredient (a salt and/or a solvent) in a supercapacitor.

In what follows, we provide examples for a large number of different types of anode active materials, cathode active materials, and conductive porous layers (e.g. graphite foam, graphene foam, and metal foam) to illustrate the best mode of practicing the instant invention. Theses illustrative examples and other portions of instant specification and drawings, separately or in combinations, are more than adequate to enable a person of ordinary skill in the art to practice the instant invention. However, these examples should not be construed as limiting the scope of instant invention.

Example 1: Illustrative Examples of Electronically Conductive Porous Layers as a Porous Building Block for Current Collectors Various types of metal foams and fine metal webs/screens are commercially available for use as conductive porous layers in an anode or cathode (serving as a current collector); e.g. Ni foam, Cu foam, Al foam, Ti foam, Ni mesh/web, stainless steel fiber mesh, etc. Metal-coated polymer foams and carbon foams are also used as current collectors. The most desirable thickness ranges for these conductive porous layers are 50-1000 µm, preferably 100-800 µm, more preferably 200-600 µm.

Example 2: Ni Foam and CVD Graphene Foam-Based Porous Layers Supported on Ni Foam Templates The procedure for producing CVD graphene foam was adapted from that disclosed in open literature: Chen, Z. et al. "Three-dimensional flexible and conductive interconnected graphene networks grown by chemical vapor deposition," Nature Materials, 10, 424-428 (2011). Nickel foam, a porous structure with an interconnected 3D scaffold of nickel was chosen as a template for the growth of graphene foam. Briefly, carbon was introduced into a nickel foam by decomposing $CH_4$ at 1,000° C. under ambient pressure, and graphene films were then deposited on the surface of the nickel foam. Due to the difference in the thermal expansion coefficients between nickel and graphene, ripples and wrinkles were formed on the graphene films. Four types of foams made in this example were used as a current collector in the presently invented lithium batteries: Ni foam, CVD graphene-coated Ni form, CVD graphene foam (Ni being etched away), and conductive polymer bonded CVD graphene foam.

In order to recover (separate) graphene foam from the supporting Ni foam, Ni frame was etched away. In the procedure proposed by Chen, et al., before etching away the nickel skeleton by a hot HCl (or $FeCl_3$) solution, a thin layer of poly (methyl methacrylate) (PMMA) was deposited on the surface of the graphene films as a support to prevent the graphene network from collapsing during nickel etching. After the PMMA layer was carefully removed by hot acetone, a fragile graphene foam sample was obtained. The use of the PMMA support layer was considered critical to preparing a free-standing film of graphene foam. Instead, a conducting polymer was used as a binder resin to hold graphene together while Ni was etched away. The graphene foam or Ni foam thickness range was from 35 µm to 600 µm.

The layers of Ni foam or the CVD graphene foam used herein is intended as conductive porous layers (CPL) to accommodate the ingredients (anode or cathode active material+optional conductive additive+liquid electrolyte) for the anode or cathode or both. For instance, Si nano particles dispersed in an organic liquid electrolyte (e.g. 1-4.0 M of LiPF$_6$ dissolved in PC-EC) were made into gel-like mass, which was delivered to a porous surface of a Ni foam continuously fed from a feeder roller to make an anode electrode roller (as in Schematic A of FIG. 1(C)).

Graphene-supported LFP nano particles dispersed in the same liquid electrolyte were made into cathode slurry, which was sprayed over two porous surfaces of a continuous Ni foam layer to form a cathode electrode. The Si nano particle-based anode layer, a porous separator layer, and a LFP-based cathode layer were then stacked together to form a lithium-ion battery laminate.

Example 3: Graphitic Foam-Based Conductive Porous Layers from Pitch-Based Carbon Foams Pitch powder, granules, or pellets are placed in a aluminum mold with the desired final shape of the foam. Mitsubishi ARA-24 meso-phase pitch was utilized. The sample is evacuated to less than 1 torr and then heated to a temperature approximately 300° C. At this point, the vacuum was released to a nitrogen blanket and then a pressure of up to 1,000 psi was applied. The temperature of the system was then raised to 800° C. This was performed at a rate of 2 degree C./min. The temperature was held for at least 15 minutes to achieve a soak and then the furnace power was turned off and cooled to room temperature at a rate of approximately 1.5 degree C./min with release of pressure at a rate of approximately 2 psi/min. Final foam temperatures were 630° C. and 800° C. During the cooling cycle, pressure is released gradually to atmospheric conditions. The foam was then heat treated to 1050° C. (carbonized) under a nitrogen blanket and then heat treated in separate runs in a graphite crucible to 2500° C. and 2800° C. (graphitized) in Argon. The graphite foam layers are available in a thickness range of 75-500 μm.

Example 4: Preparation of Graphene Oxide (GO) and Reduced Graphene Oxide (RGO) Nano Sheets from Natural Graphite Powder Natural graphite from Huadong Graphite Co. (Qingdao, China) was used as the starting material. GO was obtained by following the well-known modified Hummers method, which involved two oxidation stages. In a typical procedure, the first oxidation was achieved in the following conditions: 1100 mg of graphite was placed in a 1000 mL boiling flask. Then, 20 g of $K_2S_2O_8$, 20 g of $P_2O_5$, and 400 mL of a concentrated aqueous solution of $H_2SO_4$ (96%) were added in the flask. The mixture was heated under reflux for 6 hours and then let without disturbing for 20 hours at room temperature. Oxidized graphite was filtered and rinsed with abundant distilled water until neutral pH. A wet cake-like material was recovered at the end of this first oxidation.

For the second oxidation process, the previously collected wet cake was placed in a boiling flask that contains 69 mL of a concentrated aqueous solution of $H_2SO_4$ (96%). The flask was kept in an ice bath as 9 g of $KMnO_4$ was slowly added. Care was taken to avoid overheating. The resulting mixture was stirred at 35° C. for 2 hours (the sample color turning dark green), followed by the addition of 140 mL of water. After 15 min, the reaction was halted by adding 420 mL of water and 15 mL of an aqueous solution of 30 wt % $H_2O_2$. The color of the sample at this stage turned bright yellow. To remove the metallic ions, the mixture was filtered and rinsed with a 1:10 HCl aqueous solution. The collected material was gently centrifuged at 2700 g and rinsed with deionized water. The final product was a wet cake that contained 1.4 wt % of GO, as estimated from dry extracts. Subsequently, liquid dispersions of GO platelets were obtained by lightly sonicating wet-cake materials, which were diluted in deionized water.

Surfactant-stabilized RGO (RGO-BS) was obtained by diluting the wet-cake in an aqueous solution of surfactants instead of pure water. A commercially available mixture of cholate sodium (50 wt. %) and deoxycholate sodium (50 wt. %) salts provided by Sigma Aldrich was used. The surfactant weight fraction was 0.5 wt. %. This fraction was kept constant for all samples. Sonication was performed using a Branson Sonifier S-250A equipped with a 13 mm step disruptor horn and a 3 mm tapered micro-tip, operating at a 20 kHz frequency. For instance, 10 mL of aqueous solutions containing 0.1 wt. % of GO was sonicated for 10 min and subsequently centrifuged at 2700 g for 30 min to remove any non-dissolved large particles, aggregates, and impurities. Chemical reduction of as-obtained GO to yield RGO was conducted by following the method, which involved placing 10 mL of a 0.1 wt. % GO aqueous solution in a boiling flask of 50 mL. Then, 10 μL of a 35 wt. % aqueous solution of $N_2H_4$ (hydrazine) and 70 mL of a 28 wt. % of an aqueous solution of $NH_4OH$ (ammonia) were added to the mixture, which was stabilized by surfactants. The solution was heated to 90° C. and refluxed for 1 h. The pH value measured after the reaction was approximately 9. The color of the sample turned dark black during the reduction reaction.

RGO was used as a conductive additive in either or both of the anode and cathode active material in certain lithium batteries presently invented. Pre-lithiated RGO (e.g. RGO+ lithium particles or RGO pre-deposited with lithium coating) was also used as an anode active material that was mixed with a liquid electrolyte to form wet anode active material mixtures for selected lithium-ion cells. Selected cathode active materials ($TiS_2$ nano particles and $LiCoO_2$ particles, respectively) and non-lithiated RGO sheets were dispersed in a liquid electrolyte to prepare wet cathode active material mixture. The wet anode active mixture and cathode active mixtures were delivered to surfaces of graphite foams for forming an anode layer and a cathode layer, respectively.

For comparison purposes, slurry coating and drying procedures were conducted to produce conventional electrodes. Electrodes and a separator disposed between two dried electrodes were then assembled and encased in an Al-plastic laminated packaging envelop, followed by liquid electrolyte injection to form a lithium battery cell.

Example 5: Preparation of Pristine Graphene Sheets (0% Oxygen)

Recognizing the possibility of the high defect population in GO sheets acting to reduce the conductivity of individual graphene plane, we decided to study if the use of pristine graphene sheets (non-oxidized and oxygen-free, non-halogenated and halogen-free, etc.) can lead to a conductive additive having a high electrical and thermal conductivity. Pre-lithiated pristine graphene and pre-sodiated pristine graphene were also used as an anode active material for a lithium-ion battery and a sodium-ion battery, respectively. Pristine graphene sheets were produced by using the direct ultrasonication or liquid-phase production process.

In a typical procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson 5450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free. Pristine graphene is essentially free from any non-carbon elements.

Pristine graphene sheets, as a conductive additive, along with an anode active material (or cathode active material in the cathode) were then incorporated in a battery using both the presently invented procedure and conventional procedure of slurry coating, drying and layer laminating. Both lithium-ion batteries and lithium metal batteries (impregnation into cathode only) were investigated. Sodium-ion cells were also studied.

Example 6: Preparation of Prelithiated and Pre-Sodiated Graphene Fluoride Sheets as an Anode Active Material of a Lithium-Ion Battery or Sodium-Ion Battery Several processes have been used by us to produce GF, but only one process is herein described as an example. In a typical procedure, highly exfoliated graphite (HEG) was prepared from intercalated compound $C_2F \cdot xClF_3$. HEG was further fluorinated by vapors of chlorine trifluoride to yield fluorinated highly exfoliated graphite (FHEG). Pre-cooled Teflon reactor was filled with 20-30 mL of liquid pre-cooled $ClF_3$, the reactor was closed and cooled to liquid nitrogen temperature. Then, no more than 1 g of HEG was put in a container with holes for $ClF_3$ gas to access and situated inside the reactor. In 7-10 days a gray-beige product with approximate formula $C_2F$ was formed.

Subsequently, a small amount of FHEG (approximately 0.5 mg) was mixed with 20-30 mL of an organic solvent (methanol and ethanol, separately) and subjected to an ultrasound treatment (280 W) for 30 min, leading to the formation of homogeneous yellowish dispersions. Upon removal of solvent, the dispersion became a brownish powder. The graphene fluoride powder was mixed with surface-stabilized lithium powder and in a liquid electrolyte, allowing for pre-lithiation to occur before or after impregnating into pores of an anode current collector. Pre-sodiation of graphene fluoride was conducted electrochemically using a procedure substantially similar to a plating procedure.

Example 7: Lithium Iron Phosphate (LFP) Cathode of a Lithium Metal Battery

LFP powder, un-coated or carbon-coated, is commercially available from several sources. A LFP target for sputtering was prepared by compacting and sintering LFP powders together. Sputtering of LFP was conducted on a graphene film and, separately, carbon nano-fiber (CNF) mat. The LFP-coated graphene film was then broken and pulverized to form LFP-coated graphene sheets.

Both carbon-coated LFP powder and graphene-supported LFP, separately, along with a liquid electrolyte, were then incorporated in a battery using both the presently invented procedure of impregnating and laminating alkali metal-ion battery structures and the conventional procedure of slurry coating, drying and layer laminating.

Example 8: Preparation of Disodium Terephthalate ($Na_2C_8H_4O_4$) as an Anode Active Material of a Sodium-Ion Battery Pure disodium terephthalate was obtained by the recrystallization method. An aqueous solution was prepared via the addition of terephthalic acid to an aqueous NaOH solution and then ethanol (EtOH) was added to the mixture to precipitate disodium terephthalate in a water/EtOH mixture. Because of resonance stabilization, terephtalic acid has relatively low pKa values, which allow easy deprotonation by NaOH, affording disodium terephthalate ($Na_2TP$) through the acid-base chemistry. In a typical procedure, terephthalic acid (3.00 g, 18.06 mmol) was treated with sodium hydroxide (1.517 g, 37.93 mmol) in EtOH (60 mL) at room temperature. After 24 h, the suspended reaction mixture was centrifuged and the supernatant solution was decanted. The precipitate was re-dispersed in EtOH and then centrifuged again. This procedure was repeated twice to yield a white solid. The product was dried in vacuum at 150° C. for 1 h. In a separate sample, GO was added to aqueous NaOH solution (5% by wt. of GO sheets) to prepare sheets of graphene-supported disodium terephthalate under comparable reaction conditions.

Both carbon-disodium terephthalate mixture powder and graphene-supported disodium terephthalate, separately, each along with a liquid electrolyte, were then incorporated in a battery using both the presently invented procedure of slurry impregnation into foam pores of an anode current collector and the conventional procedure of slurry coating, drying and layer laminating.

Example 9: $V_2O_5$ as an Example of a Transition Metal Oxide Cathode Active Material of a Lithium Battery $V_2O_5$ powder alone is commercially available. For the preparation of a graphene-supported $V_2O_5$ powder sample, in a typical experiment, vanadium pentoxide gels were obtained by mixing $V_2O_5$ in a LiCl aqueous solution. The $Li^+$-exchanged gels obtained by interaction with LiCl solution (the Li:V molar ratio was kept as 1:1) was mixed with a GO suspension and then placed in a Teflon-lined stainless steel 35 ml autoclave, sealed, and heated up to 180° C. for 12 h. After such a hydrothermal treatment, the green solids were collected, thoroughly washed, ultrasonicated for 2 minutes, and dried at 70° C. for 12 h followed by mixing with another 0.1% GO in water, ultrasonicating to break down nano-belt sizes, and then spray-drying at 200° C. to obtain graphene-embraced composite particulates.

Both $V_2O_5$ powder (with a carbon black powder as a conductive additive) and graphene-supported $V_2O_5$ powder, separately, along with a liquid electrolyte, were then incorporated in a battery using both the presently invented process and the conventional procedure of slurry coating, drying and layer laminating.

Example 10: $LiCoO_2$ as an Example of Lithium Transition Metal Oxide Cathode Active Material for a Lithium-Ion Battery Commercially available $LiCoO_2$ powder and carbon black powder were dispersed in a liquid electrolyte to form cathode active material mixtures, which were impregnated into Ni foam-based cathode current collector layers to form a cathode electrode. Graphite particle-liquid electrolyte (i.e. the anode active mixture) was impregnated into pores of Cu foam layers to form anode electrodes. Additionally, a mixture of graphene embraced Si nano particles and liquid electrolyte was impregnated into pores of Cu foam to obtain an anode electrode. An anode electrode, a porous separator layer, and a cathode electrode were assembled, compacted, and encased in a plastic-Al envelop to form a battery cell. The cell was then hermetically sealed.

On a separate basis, LiCoO$_2$ powder, carbon black powder, and PVDF resin binder were dispersed in NMP solvent to form a slurry, which was coated onto both sides of a AL foil current collector and then dried under vacuum to form a cathode layer. Graphite particles and PVDF resin binder were dispersed in NMP solvent to form a slurry, which was coated onto both sides of a Cu foil current collector and then dried under vacuum to form an anode layer. The anode layer, separator, cathode layer were then laminated and encased in an Al-plastic housing, which was injected with a liquid electrolyte to form a conventional lithium-ion battery.

Example 11: Cathode Active Materials Based on Mixed Transition Metal Oxides

As examples, for the synthesis of $Na_{1.0}Li_{0.2}Ni_{0.25}Mn_{0.75}O_\delta$, $Ni_{0.25}Mn_{0.75}CO_3$, or $Ni_{0.25}Mn_{0.75}(OH)_2$ cathode active material, $Na_2CO_3$, and $Li_2CO_3$ were used as starting compounds. Materials in appropriate mole ratios were ground together and heat-treated; first at 500° C. for 8 h in air, then finally at 800° C. for 8 h in air, and furnace cooled.

For electrode preparation using a conventional procedure, a sheet of aluminum foil was coated with N-methylpyrrolidinone (NMP) slurry of the cathode mixture. The electrode mixture is composed of 82 wt % active oxide material, 8 wt % conductive carbon black (Timcal Super-P), and 10 wt. % PVDF binder (Kynar). After casting, the electrode was initially dried at 70° C. for 2 h, followed by dynamic vacuum drying at 80° C. for at least 6 h. The sodium metal foil was cut from sodium chunks (Aldrich, 99%) that were cleaned of any oil using hexanes, then rolled and punched out. For the preparation of the presently invented slurry, NMP was replaced by a liquid electrolyte (propylene carbonate with 1 M of $NaClO_4$). Such a slurry was directly impregnated into the pores of a cathode current collector.

Both $Na_{1.0}Li_{0.2}Ni_{0.25}Mn_{0.75}O_\delta$ powder (with a carbon black powder as a conductive additive) and graphene-supported $Na_{1.0}Li_{0.2}Ni_{0.25}Mn_{0.75}O_\delta$ powder, separately, along with a liquid electrolyte, were then incorporated in a battery using both the presently invented procedure and the conventional procedure of slurry coating, drying and layer laminating.

The electrolyte was propylene carbonate with 1 M of $NaClO_4$ electrolyte salt (Aldrich, 99%). Pouch cells were galvanostatically cycled to a cutoff of 4.2 V vs. $Na/Na^+$ (15 mA/g) and then discharged at various current rates to a cutoff voltage of 2.0 V.

In all battery cells prepared, charge storage capacities were measured periodically and recorded as a function of the number of cycles. The specific discharge capacity herein referred to is the total charge inserted into the cathode during the discharge, per unit mass of the composite cathode (counting the weights of cathode active material, conductive additive or support, binder, and any optional additive combined, but excluding the current collector). The specific charge capacity refers to the amount of charges per unit mass of the composite cathode. The specific energy and specific power values presented in this section are based on the total cell weight for all pouch cells. The morphological or microstructural changes of selected samples after a desired number of repeated charging and recharging cycles were observed using both transmission electron microscopy (TEM) and scanning electron microscopy (SEM).

Example 12: $Na_3V_2(PO_4)_3/C$ and $Na_3V_2(PO_4)_3/$Graphene Cathodes

The $Na_3V_2(PO_4)_3/C$ sample was synthesized by a solid state reaction according to the following procedure: a stoichiometric mixture of $NaH_2PO_4.2H_2O$ (99.9%, Alpha) and $V_2O_3$ (99.9%, Alpha) powders was put in an agate jar as a precursor and then the precursor was ball-milled in a planetary ball mill at 400 rpm in a stainless steel vessel for 8 h. During ball milling, for the carbon coated sample, sugar (99.9%, Alpha) was also added as the carbon precursor and the reductive agent, which prevents the oxidation of $V^{3+}$. After ball milling, the mixture was pressed into a pellet and then heated at 900° C. for 24 h in Ar atmosphere. Separately, the $Na_3V_2(PO_4)_3/$Graphene cathode was prepared in a similar manner, but with sugar replaced by graphene oxide.

The cathode active materials were used in several Na metal cells containing 1 M of $NaPF_6$ salt in PC+DOL as the electrolyte. Both conventional NMP slurry coating process and the invented direct electrolyte impregnation into the pores of a conductive porous layer (current collector) were followed to produce Na metal cells.

Example 13: Organic Material ($Li_2C_6O_6$) as a Cathode Active Material of a Lithium Metal Battery In order to synthesize dilithium rhodizonate ($Li_2C_6O_6$), the rhodizonic acid dihydrate (species 1 in the following scheme) was used as a precursor. A basic lithium salt, $Li_2CO_3$ can be used in aqueous media to neutralize both enediolic acid functions. Strictly stoichiometric quantities of both reactants, rhodizonic acid and lithium carbonate, were allowed to react for 10 hours to achieve a yield of 90%. Dilithium rhodizonate (species 2) was readily soluble even in a small amount of water, implying that water molecules are present in species 2. Water was removed in a vacuum at 180° C. for 3 hours to obtain the anhydrous version (species 3).

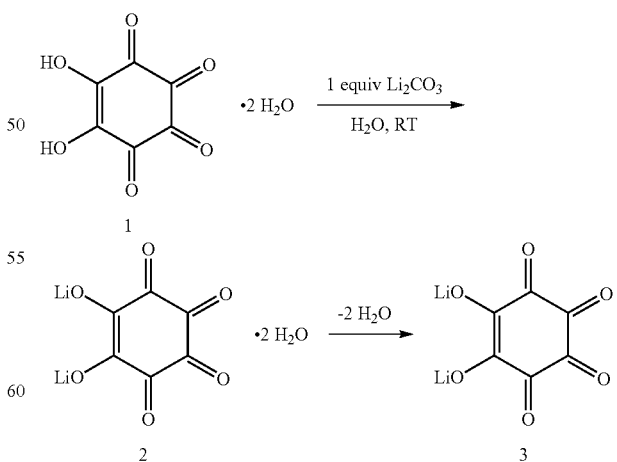

A mixture of a cathode active material ($Li_2C_6O_6$) and a conductive additive (carbon black, 15%) was ball-milled for 10 minutes and the resulting blend was grinded to produce composite particles. The electrolyte was 1M of lithium hexafluorophosphate (LiPF$_6$) in PC-EC.

It may be noted that the two Li atoms in the formula Li$_2$C$_6$O$_6$ are part of the fixed structure and they do not participate in reversible lithium ion storing and releasing. This implies that lithium ions must come from the anode side. Hence, there must be a lithium source (e.g. lithium metal or lithium metal alloy) at the anode. As illustrated in FIG. 1(E), the anode current collector (Cu foil) is deposited with a layer of lithium (e.g. via sputtering or electrochemical plating). This can be done prior to assembling the lithium-coated layer (or simply a lithium foil), a porous separator, and an impregnated cathode layer into a casing envelop. Under a compression force, the pores of the conductive porous layers are infiltrated with the cathode active material and conductive additive (Li$_2$C$_6$O$_6$/C composite particles) wetted with the liquid electrolyte. For comparison, the corresponding conventional Li metal cell was also fabricated by the conventional procedures of slurry coating, drying, laminating, packaging, and electrolyte injection.

Example 14: Organic Material (Na$_2$C$_6$O$_6$) as a Cathode Active Material of a Sodium Metal Battery In order to synthesize disodium rhodizonate (Na$_2$C$_6$O$_6$), the rhodizonic acid dihydrate (species 1 in the following scheme) was used as a precursor. A basic sodium salt, Na$_2$CO$_3$ can be used in aqueous media to neutralize both enediolic acid functions. Strictly stoichiometric quantities of both reactants, rhodizonic acid and sodium carbonate, were allowed to react for 10 hours to achieve a yield of 80%. Disodium rhodizonate (species 2) was readily soluble even in a small amount of water, implying that water molecules are present in species 2. Water was removed in a vacuum at 180° C. for 3 hours to obtain the anhydrous version (species 3).

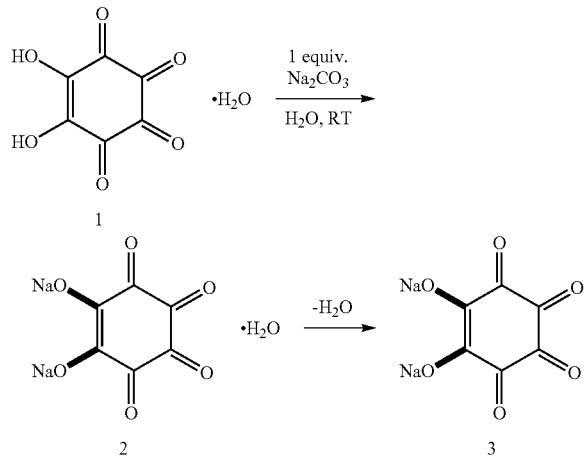

A mixture of a cathode active material (Na$_2$C$_6$O$_6$) and a conductive additive (carbon black, 15%) was ball-milled for 10 minutes and the resulting blend was grinded to produce composite particles. The electrolyte was 1M of sodium hexafluorophosphate (NaPF$_6$) in PC-EC.

The two Na atoms in the formula Na$_2$C$_6$O$_6$ are part of the fixed structure and they do not participate in reversible lithium ion storing and releasing. The sodium ions must come from the anode side. Hence, there must be a sodium source (e.g. sodium metal or sodium metal alloy) at the anode. As illustrated in FIG. 1(E), the anode current collector (Cu foil) is deposited with a layer of sodium (e.g. via sputtering or electrochemical plating). This can be done prior to assembling the sodium-coated layer or simply a sodium foil, a porous separator, and a foamed cathode current collector into a dry cell. The pores of the cathode current collector are them infiltrated with the suspension of cathode active material and conductive additive (Na$_2$C$_6$O$_6$/C composite particles) dispersed in the liquid electrolyte. For comparison, the corresponding conventional Na metal cell was also fabricated by the conventional procedures of slurry coating, drying, laminating, packaging, and electrolyte injection.

Example 15: Metal Naphthalocyanine-RGO Hybrid Cathode of a Lithium Metal Battery CuPc-coated graphene sheets were obtained by vaporizing CuPc in a chamber along with a graphene film (5 nm) prepared from spin coating of RGO-water suspension. The resulting coated film was cut and milled to produce CuPc-coated graphene sheets, which were used as a cathode active material in a lithium metal battery. This battery has a lithium metal foil as the anode active material and 1-3.6 M of LiClO$_4$ in propylene carbonate (PC) solution as the electrolyte.

Example 16: Preparation of MoS$_2$/RGO Hybrid Material as a Cathode Active Material of a Lithium Metal Battery A wide variety of inorganic materials were investigated in this example. For instance, an ultra-thin MoS$_2$/RGO hybrid was synthesized by a one-step solvothermal reaction of (NH$_4$)$_2$MoS$_4$ and hydrazine in an N,N-dimethylformamide (DMF) solution of oxidized graphene oxide (GO) at 200° C. In a typical procedure, 22 mg of (NH$_4$)$_2$MoS$_4$ was added to 10 mg of GO dispersed in 10 ml of DMF. The mixture was sonicated at room temperature for approximately 10 min until a clear and homogeneous solution was obtained. After that, 0.1 ml of N$_2$H$_4$.H$_2$O was added. The reaction solution was further sonicated for 30 min before being transferred to a 40 mL Teflon-lined autoclave. The system was heated in an oven at 200° C. for 10 h. Product was collected by centrifugation at 8000 rpm for 5 min, washed with DI water and recollected by centrifugation. The washing step was repeated for at least 5 times to ensure that most DMF was removed. Finally, product was dried, mixed with liquid electrolyte to produce active cathode mixture slurry for impregnation.

Example 17: Preparation of Two-Dimensional (2D) Layered Bi$_2$Se$_3$ Chalcogenide Nanoribbons The preparation of (2D) layered Bi$_2$Se$_3$ chalcogenide nanoribbons is well-known in the art. For instance, Bi$_2$Se$_3$ nanoribbons were grown using the vapor-liquid-solid (VLS) method. Nanoribbons herein produced are, on average, 30-55 nm thick with widths and lengths ranging from hundreds of nanometers to several micrometers. Larger nanoribbons were subjected to ball-milling for reducing the lateral dimensions (length and width) to below 200 nm. Nanoribbons prepared by these procedures (with or without the presence of graphene sheets or exfoliated graphite flakes) were used as a cathode active material of a lithium metal battery.

Example 18: MXenes Powder+Chemically Activated RGO

Selected MXenes, were produced by partially etching out certain elements from layered structures of metal carbides such as $Ti_3AlC_2$. For instance, an aqueous 1 M $NH_4HF_2$ was used at room temperature as the etchant for $Ti_3AlC_2$. Typically, MXene surfaces are terminated by O, OH, and/or F groups, which is why they are usually referred to as $M_{n+1}X_nT_x$, where M is an early transition metal, X is C and/or N, T represents terminating groups (O, OH, and/or F), n=1, 2, or 3, and x is the number of terminating groups. The MXene materials investigated include $Ti_2CT_x$, $Nb_2CT_x$, $V_2CT_x$, $Ti_3CNT_x$, and $Ta_4C_3T_x$. Typically, 35-95% MXene and 5-65% graphene sheets were mixed in a liquid electrolyte to form cathode active material mixture slurry.

Example 19: Preparation of Graphene-Supported $MnO_2$ Cathode Active Material The $MnO_2$ powder was synthesized by two methods (each with or without the presence of graphene sheets). In one method, a 0.1 mol/L $KMnO_4$ aqueous solution was prepared by dissolving potassium permanganate in deionized water. Meanwhile 13.32 g surfactant of high purity sodium bis(2-ethylhexyl) sulfosuccinate was added in 300 mL iso-octane (oil) and stirred well to get an optically transparent solution. Then, 32.4 mL of 0.1 mol/L $KMnO_4$ solution and selected amounts of GO solution were added in the solution, which was ultrasonicated for 30 min to prepare a dark brown precipitate. The product was separated, washed several times with distilled water and ethanol, and dried at 80° C. for 12 h. The sample is graphene-supported $MnO_2$ in a powder form, which was mixed in a liquid electrolyte to form cathode active material mixture slurry.

Example 20: Graphene-Enhanced Nano Silicon Fabricated from TEOS as an Anode Active Material of a Lithium-Ion Battery Dilute 1 wt. % N002-PS to 0.2 wt. % N002-PS by DI water, and place the diluted PS solution to the ultrasonic bath and ultrasonic process for 30 minutes. Gradually add TEOS (0.2 wt. % N002-PS:TEOS=5:2) while stirring the PS solution. Then, keep stirring for 24 hours to get a complete hydrolysis of TEOS. Dropwise add 10% $NH_3.H_2O$ till the formation of gel, and the gel can be called as TP gel. Grind the TP gel to tiny particles. Oven dries at 120° C. for 2 hours, at 150° C. for 4 hours. Mix the dried TP particles with Mg in a ratio of 10:7. Use 20 times amount of 7 mm SS balls and ball mill under Argon protection, gradually increase the rotating speed to 250 rpm. Put certain amount of TPM powders in Nickel crucible and heat treatment at 680° C. Prepare certain amount of 2M HCl solution. Then gradually add heat treated TPM powders to the acid solution. Keep the reaction for 2-24 hours, and then put the turbid liquid to the ultrasonic bath and ultrasonic process for 1 hour. Pour out the suspension to the filtration system. Discard the bottom large particles. Use DI water to rinse three times. Dry the yellow paste and blend the yellow paste to powders. The as-prepared nano particle has a SSA value range of 30 $m^2/g$ to 200 $m^2/g$ due to different ratio of graphene contents A certain amount of the dried TPM particles is then put into muffle furnace and calcined at 400° C.-600° C. for 2 hours under air purging to remove the carbon content from the nanocomposite, producing graphene-free yellow-color silicon nano powders. Both Si nano powder and graphene-wrapped Si nano particles were used as a high-capacity anode active material.

Example 21: Cobalt Oxide ($Co_3O_4$) Particulates as an Anode Active Material Although $LiCoO_2$ is a cathode active material, $Co_3O_4$ is an anode active material of a lithium-ion battery since $LiCoO_2$ is at an electrochemical potential of approximately +4.0 volts relative to $Li/Li^+$ and $Co_3O_4$ is at an electrochemical potential of approximately +0.8 volts relative to $Li/Li^+$.

An appropriate amount of inorganic salts $Co(NO_3)_2.6H_2O$ and, subsequently, ammonia solution ($NH_3.H_2O$, 25 wt %) were slowly added into a GO suspension. The resulting precursor suspension was stirred for several hours under an argon flow to ensure a complete reaction. The obtained $Co(OH)_2$/graphene precursor suspension was divided into two portions. One portion was filtered and dried under vacuum at 70° C. to obtain a $Co(OH)_2$/graphene composite precursor. This precursor was calcined at 450° C. in air for 2 h to form the layered $Co_3O_4$/graphene composites, which are characterized by having $Co_3O_4$-coated graphene sheets overlapping one another. These $Co_3O_4$-coated graphene sheets are another high-capacity anode active material.

Example 22: Graphene-Enhanced Tin Oxide Particulates as an Anode Active Material Tin oxide ($SnO_2$) nano particles, an anode active material, were obtained by the controlled hydrolysis of $SnCl_4.5H_2O$ with NaOH using the following procedure: $SnCl_4.5H_2O$ (0.95 g, 2.7 m-mol) and NaOH (0.212 g, 5.3 m-mol) were dissolved in 50 mL of distilled water each. The NaOH solution was added drop-wise under vigorous stirring to the tin chloride solution at a rate of 1 mL/min. This solution was homogenized by sonication for 5 min. Subsequently, the resulting hydrosol was reacted with the GO dispersion for 3 hours. To this mixed solution, few drops of 0.1 M of $H_2SO_4$ were added to flocculate the product. The precipitated solid was collected by centrifugation, washed with water and ethanol, and dried in vacuum. The dried product was heat-treated at 400° C. for 2 h under Ar atmosphere.

Example 23: Preparation of Graphene-Supported $MnO_2$ and $NaMnO_2$ Cathode Active Material The $MnO_2$ powder was synthesized by two methods (each with or without the presence of graphene sheets). In one method, a 0.1 mol/L $KMnO_4$ aqueous solution was prepared by dissolving potassium permanganate in deionized water. Meanwhile 13.32 g surfactant of high purity sodium bis(2-ethylhexyl) sulfosuccinate was added in 300 mL iso-octane (oil) and stirred well to get an optically transparent solution. Then, 32.4 mL of 0.1 mol/L $KMnO_4$ solution and selected amounts of GO solution were added in the solution, which was ultrasonicated for 30 min to prepare a dark brown precipitate. The product was separated, washed several times with distilled water and ethanol, and dried at 80° C. for 12 h. The sample is graphene-supported $MnO_2$ in a powder form, which was dispersed in a liquid electrolyte to form a slurry and impregnated into pores of a foamed current collector.

Additionally, $NaMnO_2$ and $NaMnO_2$/graphene composite were synthesized by ball-milling mixtures of $Na_2CO_3$ and $MnO_2$ (at a molar ratio of 1:2), with or without graphene sheets, for 12 h followed by heating at 870° C. for 10 h.

Example 24: Preparation of Electrodes for Potassium Metal Cells

A sheet of potassium-coated graphene film was used as the anode active material while a layer of PVDF-bonded reduced graphene oxide (RGO) sheets, supplied from Angstron Materials, Inc. (Dayton, Ohio), was used as the cathode active material. The electrolyte used was 1 M of $KClO_4$ salt dissolved in a mixture of propylene carbonate and DOL (1/1 ratio). Charge-discharge curves were obtained at several current densities (from 50 mA/g to 50 A/g), corresponding to different C rates, with the resulting energy density and power density data measured and calculated.

Example 25: Preparation and Electrochemical Testing of Various Alkali Metal Battery Cells For most of the anode and cathode active materials investigated, we prepared alkali metal-ion cells or alkali metal cells using both the presently invented method and the conventional method.

With the conventional method, a typical anode composition includes 85 wt. % active material (e.g., Si- or $Co_3O_4$-coated graphene sheets), 7 wt. % acetylene black (Super-P), and 8 wt. % polyvinylidene fluoride binder (PVDF, 5 wt. % solid content) dissolved in N-methyl-2-pyrrolidinoe (NMP). After coating the slurries on Cu foil, the electrodes were dried at 120° C. in vacuum for 2 h to remove the solvent. With the instant method, typically no binder resin is needed or used, saving 8% weight (reduced amount of non-active materials). Cathode layers are made in a similar manner (using Al foil as the cathode current collector) using the conventional slurry coating and drying procedures. An anode layer, separator layer (e.g. Celgard 2400 membrane), and a cathode layer are then laminated together and housed in a plastic-Al envelop. The cell is then injected with 1 M $LiPF_6$ electrolyte solution dissolved in a mixture of ethylene carbonate (EC) and diethyl carbonate (DEC) (EC-DEC, 1:1 v/v). In some cells, ionic liquids were used as the liquid electrolyte. The cell assemblies were made in an argon-filled glove-box.

In some examples of the presently invented process, we assembled typically 1-5 layers of pre-impregnated conductive porous structures (e.g. Cu foam) to form an anode electrode. Separately, we assembled typically 1-5 conductive porous layers (e.g. Al or graphite foam) pre-impregnated with a cathode active material mixture to form a cathode electrode. An anode electrode, a porous separator layer, and a cathode electrode were then laminated to form a battery assembly.

The cyclic voltarnmetry (CV) measurements were carried out using an Arbin electrochemical workstation at a typical scanning rate of 1 mV/s. In addition, the electrochemical performances of various cells were also evaluated by galvanostatic charge/discharge cycling at a current density of from 50 mA/g to 10 A/g. For long-term cycling tests, multi-channel battery testers manufactured by LAND were used.

In lithium-ion battery industry, it is a common practice to define the cycle life of a battery as the number of charge-discharge cycles that the battery suffers 20% decay in capacity based on the initial capacity measured after the required electrochemical formation.

Example 26: Representative Testing Results for Lithium Cells

Figure 5:
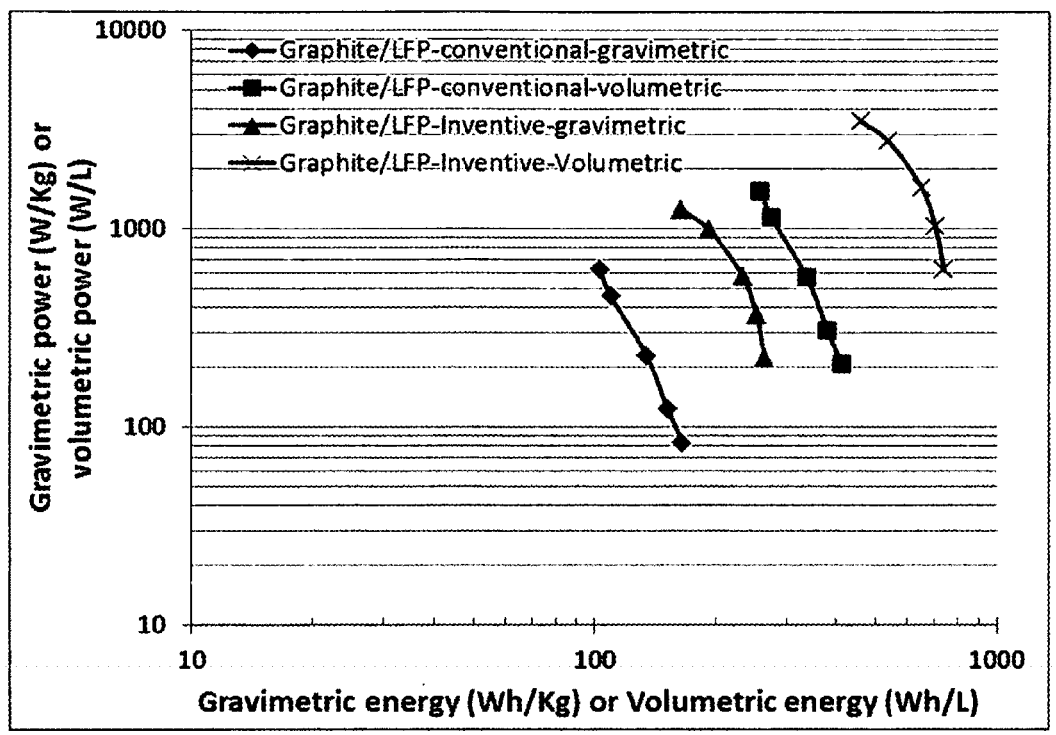
FIG. 5 Ragone plots (gravimetric and volumetric power density vs. energy density) of lithium-ion battery cells containing graphite particles as the anode active material and carbon-coated LFP particles as the cathode active materials. Two of the 4 data curves are for the cells prepared according to an embodiment of instant invention and the other two by the conventional slurry coating of electrodes (roll-coating).

For each sample, several current densities (representing charge/discharge rates) were imposed to determine the electrochemical responses, allowing for calculations of energy density and power density values required of the construction of a Ragone plot (power density vs. energy density). Shown in FIG. 5 are Ragone plots (gravimetric and volumetric power density vs. energy density) of lithium-ion battery cells containing graphite particles as the anode active material and carbon-coated LFP particles as the cathode active materials. Two of the 4 data curves are for the cells prepared according to an embodiment of instant invention and the other two by the conventional slurry coating of electrodes (roll-coating). Several significant observations can be made from these data:

Both the gravimetric and volumetric energy densities and power densities of the lithium-ion battery cells prepared by the presently invented method (denoted as "inventive" in the figure legend) are significantly higher than those of their counterparts prepared via the conventional roll-coating method (denoted as "conventional"). A change from an anode thickness of 160 µm (coated on a flat solid Cu foil) to a thickness of 215 µm (all accommodated in pores of a Ni foam having 85% porosity) and a corresponding change in the cathode to maintain a balanced capacity ratio results in a gravimetric energy density increase from 165 Wh/kg to 264 Wh/kg. Even more surprisingly, the volumetric energy density is increased from 412.5 Wh/L to 739 Wh/L. This latter value of 739 Wh/L has never been previously achieved with a lithium-ion battery using a graphite anode and a lithium iron phosphate cathode.

These huge differences cannot be simply ascribed to the increases in the electrode thickness and the mass loading alone. The differences are likely due to the significantly higher active material mass loading (not just mass loading) associated with the presently invented cells, reduced proportion of overhead (non-active) components relative to the active material weight/volume, no need to have a binder resin, surprisingly better utilization of the electrode active material (most, if not all, of the graphite particles and LFP particles contributing to the lithium ion storage capacity; no dry pockets or ineffective spots in the electrode, particularly under high charge/discharge rate conditions), and the surprising ability of the inventive method to more effectively pack active material particles in the pores of the porous conductive layer (foamed current collector). These have not been taught, suggested, or even slightly hinted in the art of lithium-ion battery. Furthermore, the maximum power density is increased from 621 W/kg to 1245 W/kg. This might have been due to significantly reduced internal resistance against electron transport and lithium ion transport.

Figure 6:
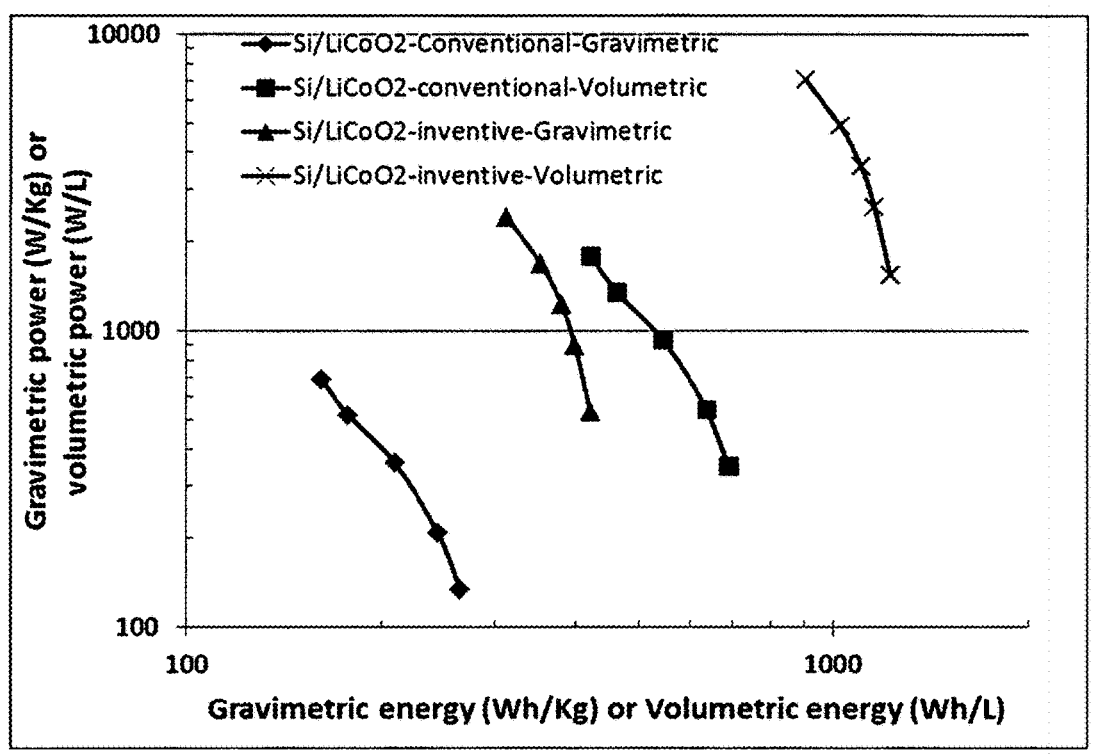
FIG. 6 Ragone plots (both gravimetric and volumetric power density vs. gravimetric and volumetric energy density) of two cells, both containing graphene-embraced Si nano particles as the anode active material and $LiCoO_2$ nano particles as the cathode active material. The experimental data were obtained from the Li-ion battery cells that were prepared by the presently invented method and those by the conventional slurry coating of electrodes.

FIG. 6 shows the Ragone plots (both gravimetric and volumetric power density vs. gravimetric and volumetric energy density) of two cells, both containing graphene-embraced Si nano particles as the anode active material and $LiCoO_2$ nano particles as the cathode active material. The experimental data were obtained from the Li-ion battery cells that were prepared by the presently invented method and those by the conventional slurry coating of electrodes.

These data indicate that both the gravimetric and volumetric energy densities and power densities of the battery cells prepared by the presently invented method are significantly higher than those of their counterparts prepared via the conventional method. Again, the differences are huge. The conventionally made cells exhibit a gravimetric energy density of 265 Wh/kg and volumetric energy density of 689 Wh/L, but the presently invented cells deliver 422 Wh/kg and 1,221 Wh/L, respectively. The cell-level energy density of 1,223 Wh/L has never been previously achieved with any rechargeable lithium battery. The power densities as high as 2422 W/kg and 7,024 W/L are also unprecedented for lithium-ion batteries. The power densities of the cells prepared via the presently invented process are always significantly higher than those of the corresponding cells prepared by conventional processes.

These energy density and power density differences are mainly due to the high active material mass loading (>25 mg/cm$^2$ in the anode and >45 mg/cm$^2$ in the cathode) associated with the presently invented cells, reduced proportion of overhead (non-active) components relative to the active material weight/volume, no need to have a binder resin, the ability of the inventive method to better utilize the active material particles (all particles being accessible to liquid electrolyte and fast ion and electron kinetics), and to more effectively pack active material particles in the pores of the foamed current collectors.

Figure 7:
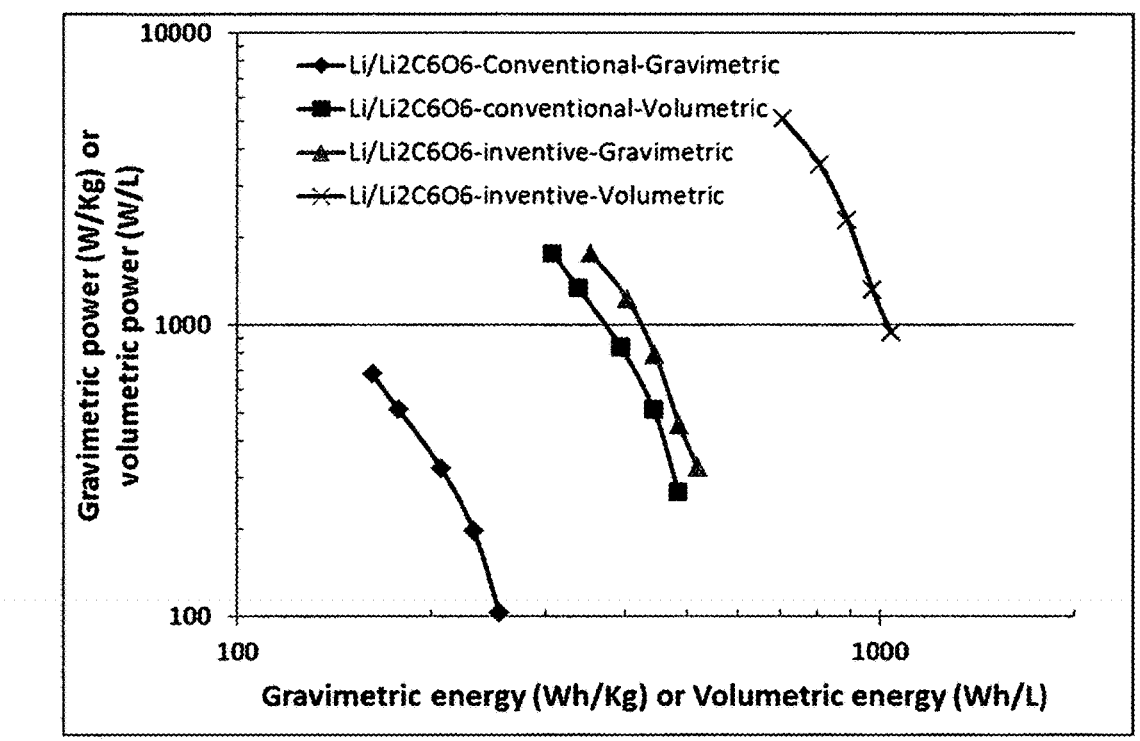
FIG. 7 Ragone plots of lithium metal batteries containing a lithium foil as the anode active material, dilithium rhodizonate ($Li_2C_6O_6$) as the cathode active material, and lithium salt ($LiPF_6$)-PC/DEC as organic liquid electrolyte. The data are for both lithium metal cells prepared by the presently invented method and those by the conventional slurry coating of electrodes.

Shown in FIG. 7 are Ragone plots of lithium metal batteries containing a lithium foil as the anode active material, dilithium rhodizonate ($Li_2C_6O_6$) as the cathode active material, and lithium salt ($LiPF_6$)-PC/DEC as organic liquid electrolyte. The data are for both lithium metal cells prepared by the presently invented method and those by the conventional slurry coating of electrodes. These data indicate that both the gravimetric and volumetric energy densities and power densities of the lithium metal cells prepared by the presently invented method are significantly higher than those of their counterparts prepared via the conventional method. Again, the differences are huge and are likely due to the significantly higher active material mass loading (not just mass loading) associated with the presently invented cells, reduced proportion of overhead (non-active) components relative to the active material weight/volume, no need to have a binder resin, surprisingly better utilization of the electrode active material (most, if not all, of the active material contributing to the lithium ion storage capacity; no dry pockets or ineffective spots in the electrode, particularly under high charge/discharge rate conditions), and the surprising ability of the inventive method to more effectively pack active material particles in the pores of the foamed current collector.

Quite noteworthy and unexpected is the observation that the gravimetric energy density of the presently invented lithium metal-organic cathode cell is as high as 520 Wh/kg, higher than those of all rechargeable lithium-metal or lithium-ion batteries ever reported (recall that current Li-ion batteries store 150-220 Wh/kg based on the total cell weight). Also quite astonishing is the observation that the volumetric energy density of such an organic cathode-based battery is as high as 1040 Wh/L, an unprecedentedly high value that tops those of all lithium-ion and lithium metal batteries ever reported. Furthermore, for organic cathode active material-based lithium batteries, a gravimetric power density of 1,752 W/kg and maximum volumetric power density of 5,080 W/L would have been un-thinkable.

It is of significance to point out that reporting the energy and power densities per weight of active material alone on a Ragone plot, as did by many researchers, may not give a realistic picture of the performance of the assembled supercapacitor cell. The weights of other device components also must be taken into account. These overhead components, including current collectors, electrolyte, separator, binder, connectors, and packaging, are non-active materials and do not contribute to the charge storage amounts. They only add weights and volumes to the device. Hence, it is desirable to reduce the relative proportion of overhead component weights and increase the active material proportion. However, it has not been possible to achieve this objective using conventional battery production processes. The present invention overcomes this long-standing, most serious problem in the art of lithium batteries.

In commercial lithium-ion batteries having an electrode thickness of 100-200 μm, the weight proportion of the anode active material (e.g. graphite or carbon) in a lithium-ion battery is typically from 12% to 17%, and that of the cathode active material (for inorganic material, such as $LiMn_2O_4$) from 22% to 41%, or from 10% to 15% for organic or polymeric. Hence, a factor of 3 to 4 is frequently used to extrapolate the energy or power densities of the device (cell) from the properties based on the active material weight alone. In most of the scientific papers, the properties reported are typically based on the active material weight alone and the electrodes are typically very thin (<<100 μm, and mostly <<50 μm). The active material weight is typically from 5% to 10% of the total device weight, which implies that the actual cell (device) energy or power densities may be obtained by dividing the corresponding active material weight-based values by a factor of 10 to 20. After this factor is taken into account, the properties reported in these papers do not really look any better than those of commercial batteries. Thus, one must be very careful when it comes to read and interpret the performance data of batteries reported in the scientific papers and patent applications.

Example 27: Achievable Electrode Thickness and its Effect on Electrochemical Performance of Lithium Battery Cells One might be tempted to think the electrode thickness of a lithium battery is a design parameter that can be freely adjusted for optimization of device performance. Contrary to this perception, in reality, the lithium battery electrode thickness is manufacturing-limited and one cannot produce electrodes of good structural integrity that exceed certain thickness level in a real industrial manufacturing environment (e.g. a roll-to-roll coating facility). The conventional battery electrode design is based on coating an electrode layer on a flat metal current collector, which has several major problems: (a) A thick coating on solid Cu foil or Al foil requires a long drying time (requiring a heating zone that is 30-100 meters long). (b) Thick electrodes tend to get delaminated or cracked upon drying and subsequent handling, and even with a resin binder proportion as high as 15-20% to hopefully improve the electrode integrity this problem remains a major limiting factor. Thus, such an industry practice of roll-coating of slurry on a solid flat current collector does not allow for high active material mass loadings. (c) A thick electrode prepared by coating, drying, and compression makes it difficult for electrolyte (injected into a cell after the cell is made) to permeate through the electrode and, as such, a thick electrode would mean many dry pockets or spots that are not wetted by the electrolyte. This would imply a poor utilization of the active materials. The instant invention solves these long-standing, critically important issues associated with lithium batteries.

Figure 8:
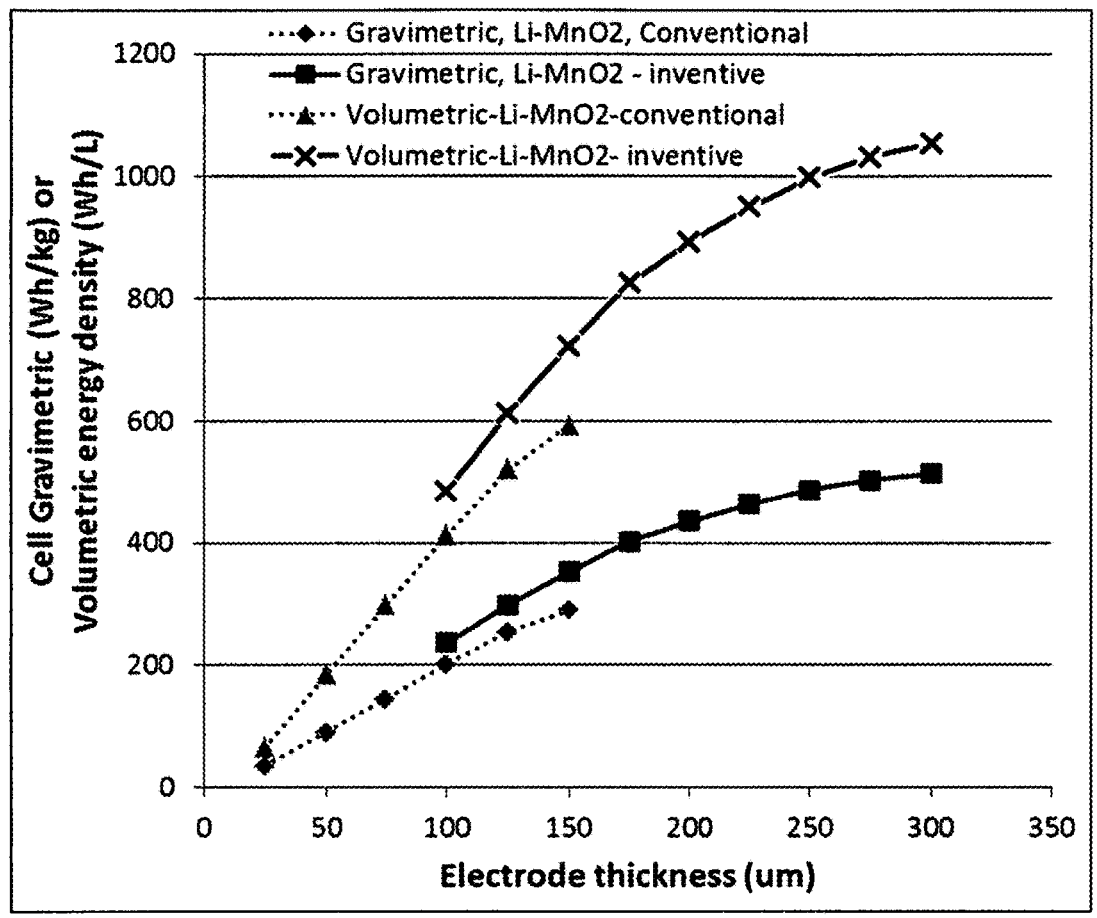
FIG. 8 The cell-level gravimetric (Wh/kg) and volumetric energy densities (Wh/L) of lithium metal cells plotted over the achievable cathode thickness range of the $MnO_2$/RGO cathode prepared via the conventional method without delamination and cracking and those by the presently invented method. In this figure, the data points are labelled as the gravimetric (♦) and volumetric (▲) energy density of the conventional Li—$MnO_2$/RGO batteries and the gravimetric (■) and volumetric (x) energy density of the presently invented ones.

Shown in FIG. 8 are the cell-level gravimetric (Wh/kg) and volumetric energy densities (Wh/L) of lithium metal cells plotted over the achievable cathode thickness range of the $MnO_2$/RGO cathode prepared via the conventional method without delamination and cracking and those by the presently invented method. In this figure, the data points are labelled as the gravimetric (♦) and volumetric (▲) energy density of the conventional Li—MnO$_2$/RGO batteries and the gravimetric (■) and volumetric (x) energy density of the presently invented ones.

The electrodes can be fabricated up to a thickness of 100-200 μm using the conventional slurry coating process. However, in contrast, there is no theoretical limit on the electrode thickness that can be achieved with the presently invented method. Typically, the practical electrode thickness is from 10 μm to 1000 μm, more typically from 100 μm to 800 μm, and most typically from 200 μm to 600 μm.

These data further confirm the surprising effectiveness of the presently invented method in producing ultra-thick lithium battery electrodes not previously achievable. These ultra-thick electrodes in lithium metal batteries lead to exceptionally high cathode active material mass loading, typically significantly >25 mg/cm$^2$ (more typically >30 mg/cm$^2$, further typically >40 mg/cm$^2$, often >50 mg/cm$^2$, and even >60 mg/cm$^2$) for an inorganic cathode active material. These high active material mass loadings have not been possible to obtain with conventional lithium batteries made by the slurry coating processes. These high active material mass loadings led to exceptionally high gravimetric and volumetric energy densities that otherwise have not been previously achieved (e.g. 514 Wh/kg and 1054 Wh/L of the presently invented lithium metal battery) given the same battery system.

Example 28: Achievable Active Material Weight Percentage in a Cell and its Effect on Electrochemical Performance of Lithium Battery Cells Because the weight of the anode and cathode active materials combined accounts for up to about 30%-50% of the total mass of the packaged commercial lithium batteries, a factor of 30%-50% must be used to extrapolate the energy or power densities of the device from the performance data of the active materials alone. Thus, the energy density of 500 Wh/kg of combined graphite and NMC (lithium nickel manganese cobalt oxide) weights will translate to about 150-250 Wh/kg of the packaged cell. However, this extrapolation is only valid for electrodes with thicknesses and densities similar to those of commercial electrodes (150 μm or about 15 mg/cm$^2$ of the graphite anode and 30 mg/cm$^2$ of NMC cathode). An electrode of the same active material that is thinner or lighter will mean an even lower energy or power density based on the cell weight. Thus, it would be desirable to produce a lithium-ion battery cell having a high active material proportion. Unfortunately, it has not been previously possible to achieve a total active material proportion greater than 45% by weight in most of the commercial lithium-ion batteries.

The presently invented method enables the lithium batteries to go well beyond these limits for all active materials investigated. As a matter of fact, the instant invention makes it possible to elevate the active material proportion above 90% if so desired; but typically from 45% to 85%, more typically from 40% to 80%, even more typically from 40% to 75%, and most typically from 50% to 70%.

Figure 9:
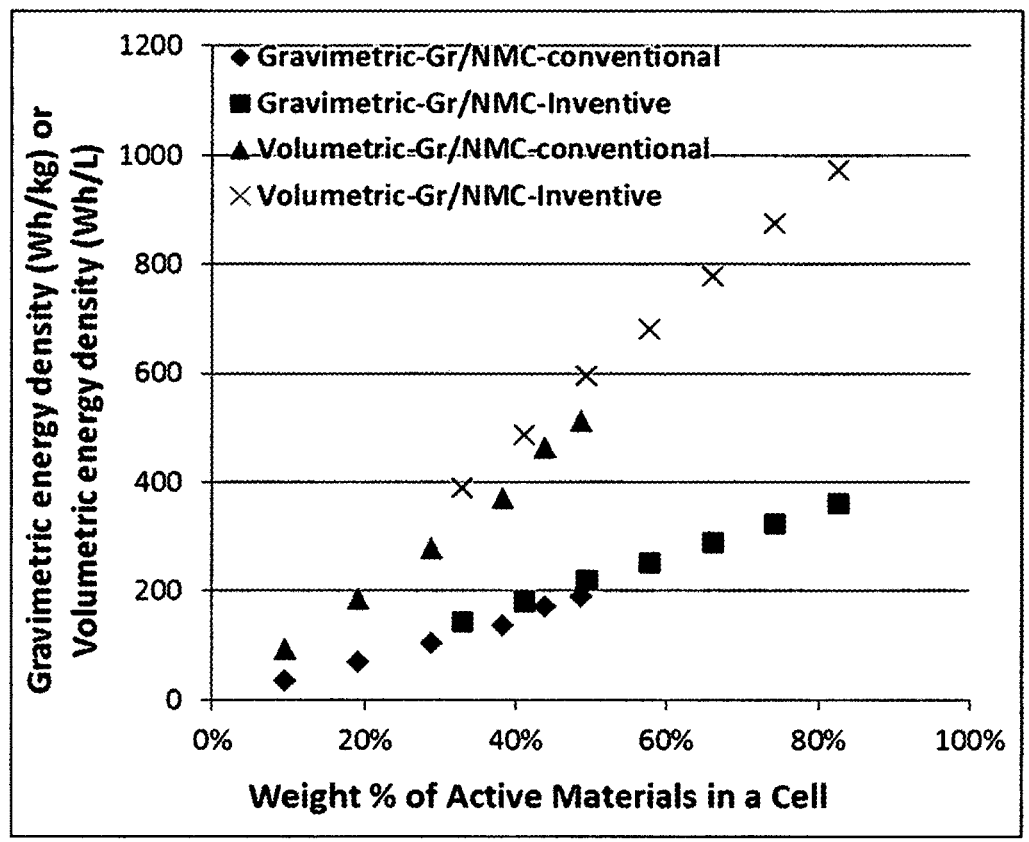
FIG. 9 The cell-level gravimetric and volumetric energy densities of the graphite/NMC cells prepared by the presently invented method and those by the conventional roll-coating method.

Shown in FIG. 9 are the cell-level gravimetric and volumetric energy densities of the graphite/NMC cells prepared by the presently invented method and the conventional roll-coating method. These data further demonstrate the implications of our ability to take the total active material mass beyond 50%, enabling the attainment of unexpectedly high gravimetric and volumetric energy densities that have not been previously possible given the same lithium battery system (e.g. elevated from 190 Wh/kg to 360 Wh/kg and from 510 Wh/L to 970 Wh/L).

Figure 10:
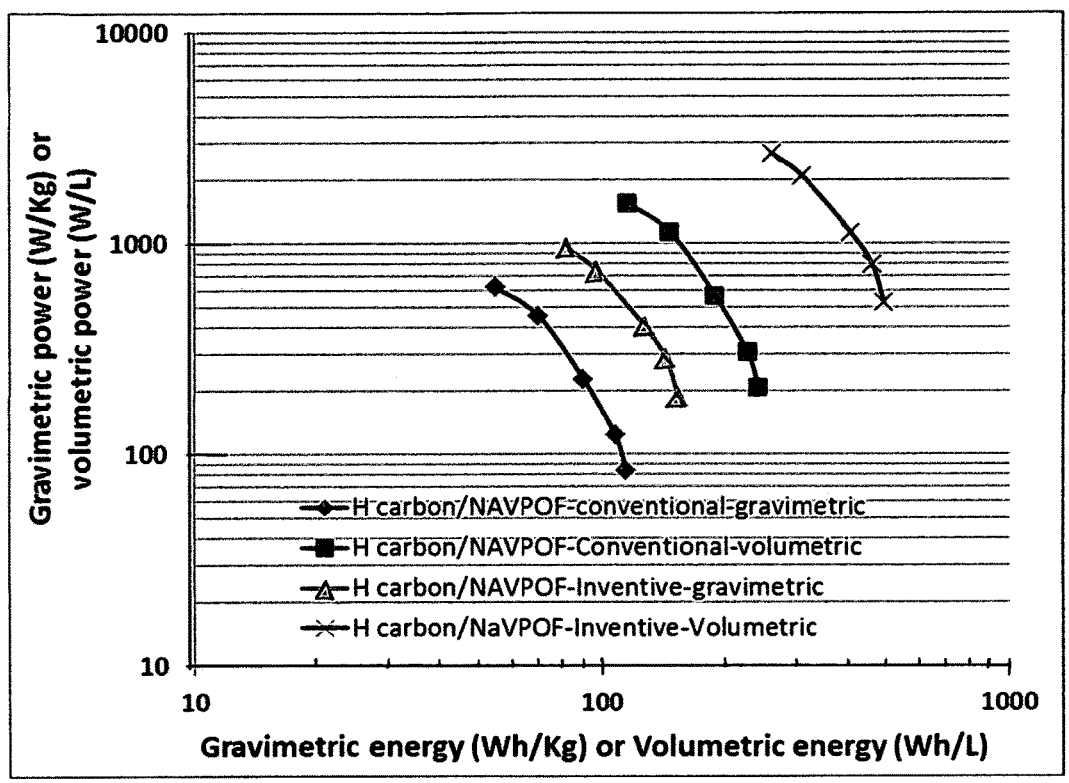
FIG. 10 Ragone plots (gravimetric and volumetric power density vs. energy density) of Na-ion battery cells containing hard carbon particles as the anode active material and carbon-coated $Na_3V_2(PO_4)_2F_3$ particles as the cathode active materials. Two of the 4 data curves are for the cells prepared according to an embodiment of instant invention and the other two by the conventional slurry coating of electrodes (roll-coating).

Example 29: Representative Testing Results of Sodium Metal and Potassium Metal Cells Shown in FIG. 10 are Ragone plots (gravimetric and volumetric power density vs. energy density) of Na-ion battery cells containing hard carbon particles as the anode active material and carbon-coated Na$_3$V$_2$(PO$_4$)$_2$F$_3$ particles as the cathode active materials. Two of the 4 data curves are for the cells prepared according to an embodiment of instant invention and the other two by the conventional slurry coating of electrodes (roll-coating). Several significant observations can be made from these data:

Both the gravimetric and volumetric energy densities and power densities of the sodium-ion battery cells prepared by the presently invented method (denoted as "inventive" in the figure legend) are significantly higher than those of their counterparts prepared via the conventional roll-coating method (denoted as "conventional"). A change from an anode thickness of 150 μm (coated on a flat solid Cu foil) to a thickness of 225 μm (all accommodated in pores of a Ni foam having 85% porosity) and a corresponding change in the cathode to maintain a balanced capacity ratio results in a gravimetric energy density increase from 115 Wh/kg to 154 Wh/kg. Even more surprisingly, the volumetric energy density is increased from 241 Wh/L to 493 Wh/L. This latter value of 493 Wh/L is exceptional for a sodium-ion battery using a hard carbon anode and a sodium transition metal phosphate-type cathode.

These huge differences cannot be simply ascribed to the increases in the electrode thickness and the mass loading. The differences are likely due to the significantly higher active material mass loading (relative to other materials) associated with the presently invented cells, reduced proportion of overhead (non-active) components relative to the active material weight/volume, no need to have a binder resin, surprisingly better utilization of the electrode active material (most, if not all, of the hard carbon particles and Na$_3$V$_2$(PO$_4$)$_2$F$_3$ particles contributing to the sodium ion storage capacity; no dry pockets or ineffective spots in the electrode, particularly under high charge/discharge rate conditions), and the surprising ability of the inventive method to more effectively pack active material particles in the pores of the conductive porous layers (foamed current collectors).

The presently invented sodium-ion cells also deliver significantly higher energy densities than those of conventional cells. This is also unexpected.

Figure 11:
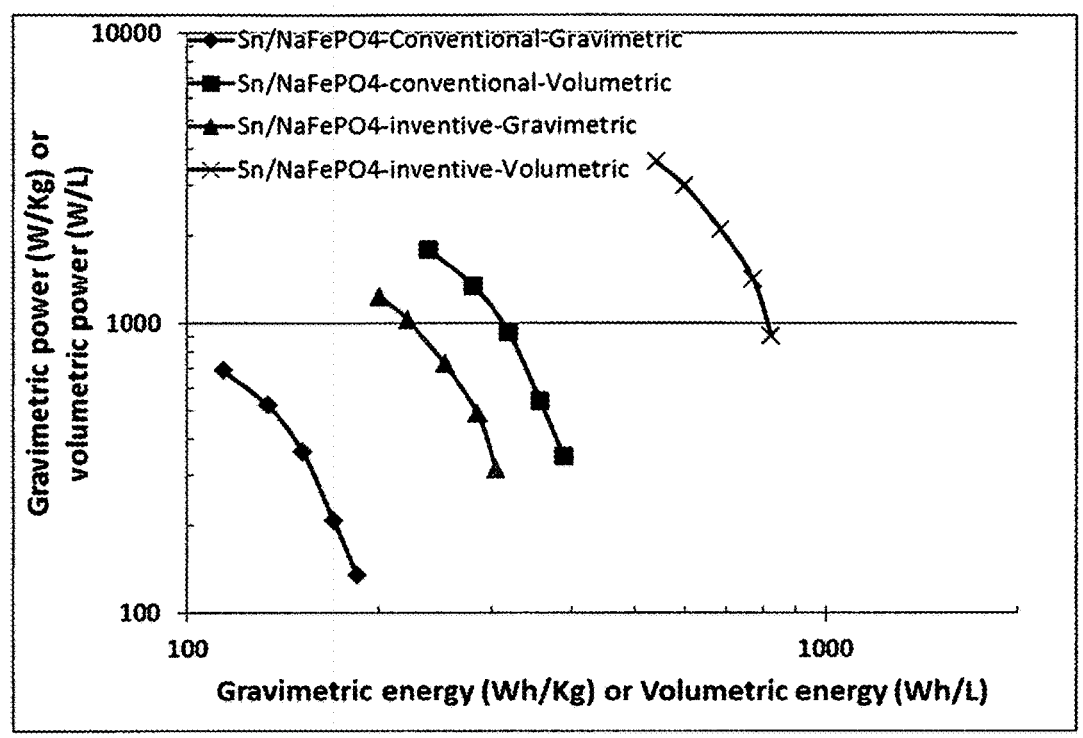
FIG. 11 Ragone plots (both gravimetric and volumetric power density vs. gravimetric and volumetric energy density) of two cells, both containing graphene-embraced Sn nano particles as the anode active material and $NaFePO_4$ nano particles as the cathode active material. The data are for both sodium-ion cells prepared by the presently invented method and those by the conventional slurry coating of electrodes.

FIG. 11 shows the Ragone plots (both gravimetric and volumetric power density vs. gravimetric and volumetric energy density) of two cells, both containing graphene-embraced Sn nano particles as the anode active material and NaFePO$_4$ nano particles as the cathode active material. The experimental data were obtained from the Na-ion battery cells that were prepared by the presently invented method and those by the conventional slurry coating of electrodes.

These data indicate that both the gravimetric and volumetric energy densities and power densities of the sodium battery cells prepared by the presently invented method are significantly higher than those of their counterparts prepared via the conventional method. Again, the differences are huge. The conventionally made cells exhibit a gravimetric energy density of 185 Wh/kg and volumetric energy density of 388 Wh/L, but the presently invented cells deliver 304 Wh/kg and 820 Wh/L, respectively. The cell-level volumetric energy density of 820 Wh/L has never been previously achieved with any rechargeable sodium batteries. In fact, even the state-of-the-art lithium-ion battery rarely exhibits a volumetric energy density higher than 750 Wh/L. The power densities as high as 1235 W/kg and 3,581 W/L are also unprecedented for typically higher-energy lithium-ion batteries, let alone for sodium-ion batteries.

These energy density and power density differences are mainly due to the high active material mass loading (>25 mg/cm$^2$ in the anode and >45 mg/cm$^2$ in the cathode) associated with the presently invented cells, reduced proportion of overhead (non-active) components relative to the active material weight/volume, no need to have a binder resin, the ability of the inventive method to better utilize the active material particles (all particles being accessible to liquid electrolyte and fast ion and electron kinetics), and to more effectively pack active material particles in the pores of the foamed current collectors.

Figure 12:
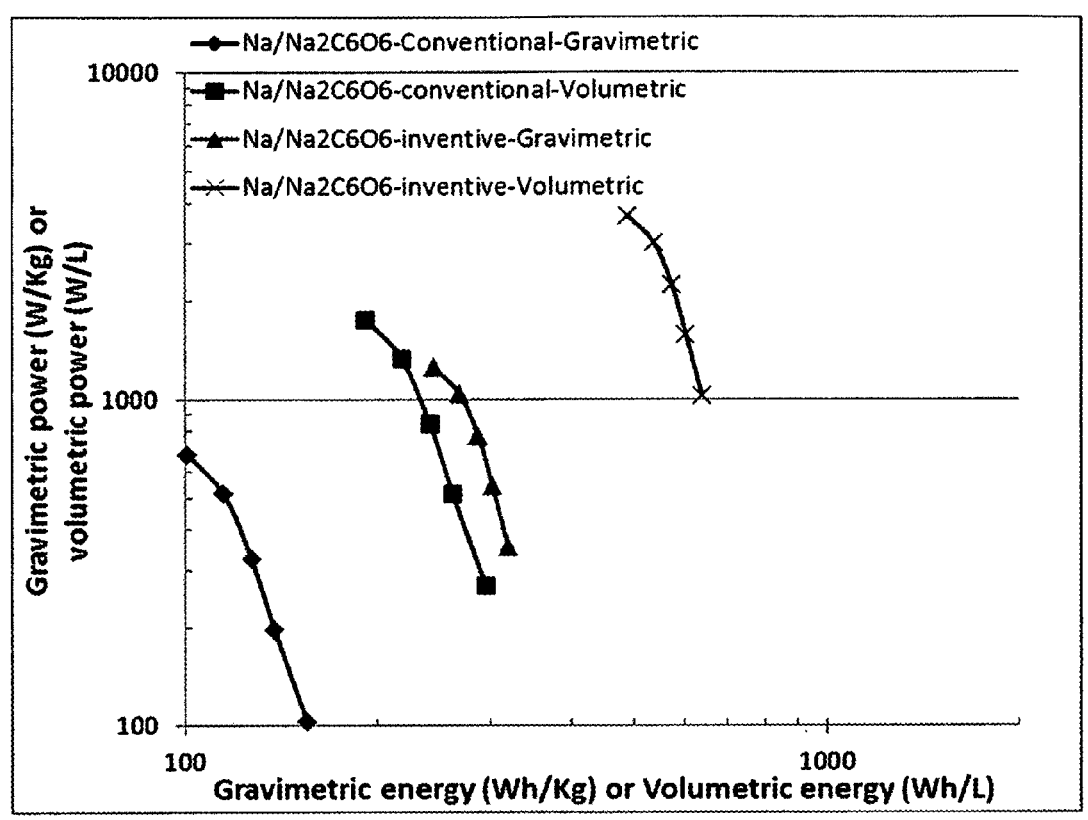
FIG. 12 Ragone plots of sodium metal batteries containing a graphene-supported sodium foil as the anode active material, disodium rhodizonate ($Na_2C_6O_6$) as the cathode active material, and sodium salt ($NaPF_6$)-PC/DEC as organic liquid electrolyte. The data are for both sodium metal cells prepared by the presently invented method and those by the conventional slurry coating of electrodes.

Shown in FIG. 12 are Ragone plots of sodium metal batteries containing a sodium foil as the anode active material, disodium rhodizonate ($Na_2C_6O_6$) as the cathode active material, and lithium salt ($NaPF_6$)-PC/DEC as organic liquid electrolyte. The data are for both sodium metal cells prepared by the presently invented method and those by the conventional slurry coating of electrodes. These data indicate that both the gravimetric and volumetric energy densities and power densities of the sodium metal cells prepared by the presently invented method are significantly higher than those of their counterparts prepared via the conventional method. Again, the differences are huge and are likely due to the significantly higher active material mass loading associated with the presently invented cells, reduced proportion of overhead (non-active) components relative to the active material weight/volume, no need to have a binder resin, surprisingly better utilization of the electrode active material (most, if not all, of the active material contributing to the sodium ion storage capacity; no dry pockets or ineffective spots in the electrode, particularly under high charge/discharge rate conditions), and the surprising ability of the inventive method to more effectively pack active material particles in the pores of the foamed current collector.

Quite noteworthy and unexpected is the observation that the gravimetric energy density of the presently invented sodium metal-organic cathode cell is as high as 322 Wh/kg, higher than those of all rechargeable sodium metal or sodium-ion batteries ever reported (recall that current Na-ion batteries typically store 100-150 Wh/kg based on the total cell weight). Furthermore, for organic cathode active material-based sodium batteries (even for corresponding lithium batteries), a gravimetric power density of 1,254 W/kg and volumetric power density of 3,636 W/L would have been un-thinkable.

It is of significance to point out that reporting the energy and power densities per weight of active material alone on a Ragone plot, as did by many researchers, may not give a realistic picture of the performance of the assembled battery cell. The weights of other device components also must be taken into account. These overhead components, including current collectors, electrolyte, separator, binder, connectors, and packaging, are non-active materials and do not contribute to the charge storage amounts. They only add weights and volumes to the device. Hence, it is desirable to reduce the relative proportion of overhead component weights and increase the active material proportion. However, it has not been possible to achieve this objective using conventional battery production processes. The present invention overcomes this long-standing, most serious problem in the art of lithium batteries.

In commercial lithium-ion batteries having an electrode thickness of 150 μm, the weight proportion of the anode active material (e.g. graphite or carbon) in a lithium-ion battery is typically from 12% to 17%, and that of the cathode active material (for inorganic material, such as $LiMn_2O_4$) from 22% to 41%, or from 10% to 15% for organic or polymeric. The corresponding weight fractions in Na-ion batteries are expected to be very similar since both the anode active materials and cathode active materials have similar physical densities between two types of batteries and the ratio of cathode specific capacity to the anode specific capacity is also similar. Hence, a factor of 3 to 4 may be used to extrapolate the energy or power densities of the sodium cell from the properties based on the active material weight alone. In most of the scientific papers, the properties reported are typically based on the active material weight alone and the electrodes are typically very thin (<<100 μm and mostly <<50 μm). The active material weight is typically from 5% to 10% of the total device weight, which implies that the actual cell (device) energy or power densities may be obtained by dividing the corresponding active material weight-based values by a factor of 10 to 20. After this factor is taken into account, the properties reported in these papers do not really look any better than those of commercial batteries. Thus, one must be very careful when it comes to read and interpret the performance data of batteries reported in the scientific papers and patent applications.

Figure 13:
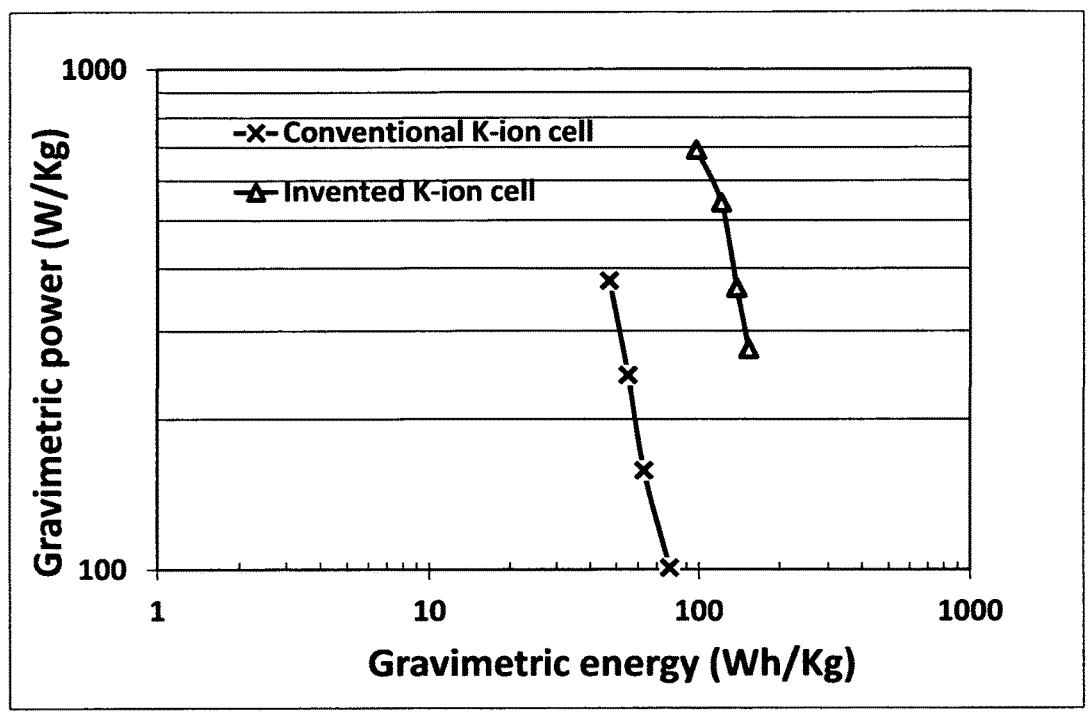
FIG. 13 Ragone plot of a series of K-ion cells prepared by the conventional slurry coating process and the Ragone plot of corresponding K-ion cells prepared by the presently invented process.

The Ragone plot of a series of K-ion cells prepared by the conventional slurry coating process and the Ragone plot of corresponding K-ion cells prepared by the presently invented process are summarized and contrasted in FIG. 13. These data again confirm that the presently invented process works well for making both Na and K metal batteries having ultra-high energy densities and power densities.

We claim:

1. A process for producing an alkali metal battery wherein said alkali metal is selected from Li, Na, K, or a combination thereof; said process comprising:
(A) continuously feeding an electrically conductive porous layer to a cathode material impregnation zone, wherein said conductive porous layer has two opposed porous surfaces and contains interconnected electron-conducting pathways;
(B) impregnating a wet cathode active material mixture into said electrically conductive porous layer from at least one of said two porous surfaces to form a cathode electrode without drying, wherein said wet cathode active material mixture contains a cathode active material mixed with a first liquid electrolyte;
(C) continuously feeding an electrically conductive porous layer to an anode material impregnation zone, wherein said conductive porous layer has two opposed porous surfaces and contains interconnected electron-conducting pathways;
(D) impregnating a wet anode active material mixture into said electrically conductive porous layer from at least one of said two porous surfaces to form an anode electrode without drying, wherein said wet anode active material mixture contains an anode active material mixed with a second liquid electrolyte; and
(E) stacking said anode electrode, a porous separator, and said cathode electrode to form said alkali metal battery, wherein said anode electrode and/or said cathode electrode has a thickness from 100 μm to 2 mm; said anode active material has a material mass loading from 20 mg/cm² to 35 mg/cm² in said anode electrode; and/or said cathode active material has a material mass loading from 15 mg/cm² to 60 mg/cm² for an organic or polymer material or from 30 mg/cm² to 60 mg/cm² for an inorganic and non-polymer material in said cathode electrode.

2. The process of claim 1, wherein step (A) and step (B) include delivering continuously said wet cathode active material mixture to said at least one porous surface through spraying, printing, coating, casting, conveyor film delivery, and/or roller surface delivery; and/or wherein step (C) and step (D) include delivering, continuously, said wet anode active material mixture to said at least one porous surface through spraying, printing, coating, casting, conveyor film delivery, and/or roller surface delivery.

3. The process of claim 1, wherein said alkali metal battery is a lithium-ion battery and said anode active material is selected from the group consisting of:
(a) particles of natural graphite, artificial graphite, mesocarbon microbeads (MCMB), and carbon;
(b) silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe), and cadmium (Cd);
(c) alloys or intermetallic compounds of Si, Ge, Sn, Pb, Sb, Bi, Zn, Al, or Cd with other elements, wherein said alloys or compounds are stoichiometric or non-stoichiometric;
(d) oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites;
(e) pre-lithiated versions thereof;
(f) pre-lithiated graphene sheets; and
combinations thereof.

4. The process of claim 1, wherein said alkali metal battery is a sodium-ion battery and said anode active material contains an alkali intercalation compound selected from petroleum coke, carbon black, amorphous carbon, activated carbon, hard carbon, soft carbon, templated carbon, hollow carbon nanowires, hollow carbon sphere, titanates, $NaTi_2(PO_4)_3$, $Na_2Ti_3O_7$, $Na_2C_8H_4O_4$, $Na_2TP$, $Na_xTiO_2$ (x=0.2 to 1.0), $Na_2C_8H_4O_4$, carboxylate based materials, $C_8H_4Na_2O_4$, $C_8H_6O_4$, $C_8H_5NaO_4$, $C_8Na_2F_4O_4$, $C_{10}H_2Na_4O_8$, $C_{14}H_4O_6$, $C_{14}H_4Na_4O_8$, or a combination thereof.

5. The process of claim 1, wherein the alkali metal battery is a sodium-ion battery and said anode active material contains an alkali intercalation compound selected from the following groups of materials:
(a) sodium- or potassium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof;
(b) sodium- or potassium-containing alloys or intermetallic compounds of Si, Ge, Sn, Pb, Sb, Bi, Zn, Al, Ti, Co, Ni, Mn, Cd, and their mixtures;
(c) sodium- or potassium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof;
(d) sodium or potassium salts; and
(e) graphene sheets pre-loaded with sodium or potassium.

6. The process of claim 1, wherein said cathode active material contains a lithium intercalation compound or lithium absorbing compound selected from the group consisting of lithium cobalt oxide, doped lithium cobalt oxide, lithium nickel oxide, doped lithium nickel oxide, lithium manganese oxide, doped lithium manganese oxide, lithium vanadium oxide, doped lithium vanadium oxide, lithium mixed-metal oxides, lithium iron phosphate, lithium vanadium phosphate, lithium manganese phosphate, lithium mixed-metal phosphates, metal sulfides, lithium polysulfide, and combinations thereof.

7. The process of claim 1, wherein said cathode active material contains a sodium intercalation compound or a potassium intercalation compound selected from $NaFePO_4$, $Na_{(1-x)}K_xPO_4$, $KFePO_4$, $Na_{0.7}FePO_4$, $Na_{1.5}VOPO_4F_{0.5}$, $Na_3V_2(PO_4)_3$, $Na_3V_2(PO_4)_2F_3$, $Na_2FePO_4F$, $NaFeF_3$, $NaVPO_4F$, $KVPO_4F$, $Na_3V_2(PO_4)_2F_3$, $Na_{1.5}VOPO_4F_{0.5}$, $Na_3V_2(PO_4)_3$, $NaV_6O_{15}$, $Na_xVO_2$, $Na_{0.33}V_2O_5$, $Na_xCoO_2$, $Na_{2/3}[Ni_{1/3}Mn_{2/3}]O_2$, $Na_x(Fe_{1/2}Mn_{1/2})O_2$, $Na_xMnO_2$, $\lambda-MnO_2$, $Na_xK_{(1-x)}MnO_2$, $Na_{0.44}MnO_2$, $Na_{0.44}MnO_2/C$, $Na_4Mn_9O_{18}$, $NaFe_2Mn(PO_4)_3$, $Na_2Ti_3O_7$, $Ni_{1/3}Mn_{1/3}Co_{1/3}O_2$, $Cu_{0.56}Ni_{0.44}HCF$, NiHCF, $Na_xMnO_2$, $NaCrO_2$, $KCrO_2$, $Na_3Ti_2(PO_4)_3$, $NiCo_2O_4$, $Ni_3S_2/FeS_2$, $Sb_2O_4$, $Na_4Fe(CN)_6/C$, $NaV_{1-x}Cr_xPO_4F$, $Se_zS_y$, y/z=0.01 to 100, Se, sodium polysulfide, sulfur, Alluaudites, or a combination thereof, wherein x is from 0.1 to 1.0.

8. The process of claim 1, wherein said first liquid electrolyte and/or said second liquid electrolyte contains a lithium salt or sodium salt dissolved in a liquid solvent and wherein said liquid solvent is water, an organic solvent, an ionic liquid, or a mixture of an organic solvent and an ionic liquid.

9. The process of claim 1, wherein said electrically conductive porous layer has at least 85% by volume of pores, said anode electrode and/or said cathode electrode has a thickness from 100 μm to 2 mm, said anode active material has a mass loading no less than 25 mg/cm² and/or occupies from 25% to 35% by weight or by volume of the entire battery cell, and/or the cathode active material has a mass loading from 20 mg/cm² to 60 mg/cm² for an organic or polymer material or from 40 mg/cm² to 60 mg/cm² for an inorganic and non-polymer material in said cathode and/or occupies at least 40% by weight or by volume of the entire battery cell.

10. The process of claim 1, wherein said electrically conductive porous layer has at least 90% by volume of pores, said anode electrode and/or said cathode electrode has a thickness from 300 μm to 2 mm, and/or said anode active material has a mass loading from 30 mg/cm² to 60 mg/cm² and/or occupies from 30% by weight or by volume of the entire battery cell, and/or the cathode active material has a mass loading from 25 mg/cm² to 60 mg/cm² for an organic or polymer material or from 50 mg/cm² to 60 mg/cm² for an inorganic and non-polymer material in said cathode and/or occupies from 50% by weight or by volume of the entire battery cell.

11. The process of claim 1, wherein said electrically conductive porous layer has at least 95% by volume of pores, said anode electrode and/or said cathode electrode has a thickness from 400 μm to 2 mm, and/or said anode active material has a mass loading no less than 35 mg/cm² and/or occupies at least 35% by weight or by volume of the entire battery cell, and/or the cathode active material has a mass loading no less than 30 mg/cm² for an organic or polymer material or no less than 55 mg/cm² for an inorganic and non-polymer material in said cathode and/or occupies at least 55% by weight or by volume of the entire battery cell.

12. The process of claim 1, wherein said electrically conductive porous layer is selected from metal foam, metal web or screen, perforated metal sheet-based structure, metal fiber mat, metal nanowire mat, conductive polymer nanofiber mat, conductive polymer foam, conductive polymer-coated fiber foam, carbon foam, graphite foam, carbon aerogel, carbon xerogel, graphene foam, graphene oxide foam, reduced graphene oxide foam, carbon fiber foam, graphite fiber foam, exfoliated graphite foam, or a combination thereof.

13. The process of claim 3, wherein said pre-lithiated graphene sheets are selected from pre-lithiated versions of pristine graphene, graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, a physically or chemically activated or etched version thereof, or a combination thereof.

14. The process of claim 1, wherein said cathode active material comprises an alkali metal intercalation compound or alkali metal-absorbing compound selected from an inorganic material, an organic or polymeric material, a metal oxide/phosphate/sulfide, or a combination thereof.

15. The process of claim 14, wherein said metal oxide/phosphate/sulfide is selected from a lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphate, transition metal sulfide, or a combination thereof.

16. The process of claim 14, wherein said inorganic material is selected from sulfur, sulfur compound, lithium polysulfide, transition metal dichalcogenide, a transition metal trichalcogenide, or a combination thereof.

17. The process of claim 14, wherein said inorganic material is selected from $TiS_2$, $TaS_2$, $MoS_2$, $NbSe_3$, $MnO_2$, $CoO_2$, an iron oxide, a vanadium oxide, or a combination thereof.

18. The process of claim 14, wherein said metal oxide/phosphate/sulfide contains a vanadium oxide selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein $0.1<x<5$.

19. The process of claim 14, wherein said metal oxide/phosphate/sulfide is selected from a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

20. The process of claim 14, wherein said inorganic material is selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof.

21. The process of claim 14, wherein said organic material or polymeric material is selected from Poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, Quino(triazene), redox-active organic material, Tetracyanoquino-dimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ([(NPS_2)_3]n), lithiated 1,4,5,8-naphthalenetetraol formaldehyde polymer, Hexaazatrinaphthylene (HATN), Hexaazatriphenylene hexacarbonitrile (HAT(CN)_6), 5-Benzylidene hydantoin, Isatine lithium salt, Pyromellitic diimide lithium salt, tetrahydroxy-p-benzoquinone derivatives (THQLi_4), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, $Li_4C_6O_6$, $Li_2C_6O_6$, $Li_6C_6O_6$, or a combination thereof.

22. The process of claim 21, wherein said thioether polymer is selected from Poly[methanetetryl-tetra(thiomethylene)] (PMTTM), Poly(2,4-dithiopentanylene) (PDTP), a polymer containing Poly(ethene-1,1,2,2-tetrathiol) (PETT) as a main-chain thioether polymers, a side-chain thioether polymer having a main-chain consisting of conjugating aromatic moieties, and having a thioether side chain as a pendant, Poly(2-phenyl-1,3-dithiolane) (PPDT), Poly(1,4-di(1,3-dithiolan-2-yl)benzene) (PDDTB), poly(tetrahydrobenzodithiophene) (PTHBDT), poly[1,2,4,5-tetrakis(propylthio)benzene] (PTKPTB, or poly[3,4(ethylenedithio)thiophene] (PEDTT).

23. The process of claim 14, wherein said organic material contains a phthalocyanine compound selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

24. The process of claim 1, wherein said cathode active material contains an alkali metal intercalation compound or alkali metal-absorbing compound selected from an oxide, dichalcogenide, trichalcogenide, sulfide, selenide, or telluride of niobium, zirconium, molybdenum, hafnium, tantalum, tungsten, titanium, vanadium, chromium, cobalt, manganese, iron, or nickel in a nanowire, nanodisc, nanoribbon, or nanoplatelet form.

* * * * *